US012639192B2

(12) United States Patent
Stevens

(10) Patent No.: US 12,639,192 B2
(45) Date of Patent: *May 26, 2026

(54) INTEGRATED AI-DRIVEN SYSTEM FOR AUTOMATING IT AND CYBERSECURITY OPERATIONS

(71) Applicant: Augstra LLC, Dover, DE (US)

(72) Inventor: Albert Stevens, St. Augustine, FL (US)

(73) Assignee: Augstra LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/293,744

(22) Filed: Aug. 7, 2025

(65) Prior Publication Data

US 2025/0363035 A1      Nov. 27, 2025

Related U.S. Application Data

(63) Continuation of application No. 19/022,083, filed on Jan. 15, 2025, which is a continuation of application No. PCT/US2023/085667, filed on Dec. 22, 2023.

(60) Provisional application No. 63/548,187, filed on Nov. 11, 2023, provisional application No. 63/543,095, filed on Oct. 8, 2023, provisional application No. 63/540,345, filed on Sep. 25, 2023, provisional application No. 63/538,842, filed on Sep. 17, 2023, provisional application No. 63/439,854, filed on Jan. 18, 2023, provisional application No. 63/436,528, filed on Dec. 31, 2022, provisional application No. 63/435,315, filed on Dec. 26, 2022.

(51) Int. Cl.
  *G06F 9/44* (2018.01)
  *G06F 11/3604* (2025.01)
(52) U.S. Cl.
  CPC ............................... *G06F 11/3612* (2013.01)
(58) Field of Classification Search
  CPC ................................................... G06F 11/3612
  See application file for complete search history.

(56) References Cited

U.S. PATENT DOCUMENTS

2024/0403428 A1 * 12/2024 Lal ........................ G06F 21/566

* cited by examiner

*Primary Examiner* — Hang Pan
(74) *Attorney, Agent, or Firm* — Blueshift IP; Robert Plotkin

(57) ABSTRACT

A system for automating information technology software actions using advanced AI techniques including a processing system, storage medium, a communications interface, a user interface, a natural language processing model or neural network, operable to interface with at least one of an embedded prompt or chatbot prompt and hosted on a control node which communicates with one or more nodes comprised by a node network via the communications interface, and program instructions on storage medium that direct the processing system to receive an instruction from the user interface, process the instruction using the one or more natural language processing model or neural network, along with one or more AI agents, and execute the instruction one of locally or on a node of the node network via the communications interface.

30 Claims, 29 Drawing Sheets

200

RECEIVE NATURAL LANGUAGE INSTRUCTION

201

TRANSLATE INSTRUCTION INTO INSTRUCTION STEPS

202

DELIVER INSTRUCTION STEPS TO NODE

203

TRANSLATE INSTRUCTION STEPS INTO MACHINE LEVEL CODE

204

EXECUTE MACHINE LEVEL CODE

205

COMMUNICATE EXECUTION STATUS

RECEIVE EXECUTION STATUS FAILURE RESULT FROM NODE    210

PROCESS FAILURE RESULT VIA NLP MODEL/NEURAL NETWORK    211

GENERATE INSTRUCTION STEPS TO RESOLVE FAILURE    212

DELIVER INSTRUCTION STEPS TO NODE    202

230

EXECUTE COMPLIANCE SCANNING OR REMEDIATION INSTRUCTIONS

231

RECEIVE SYSTEM ERROR OR UNEXPECTED RESULT OUTPUT

232

DELIVER OUTPUT DETAILS TO COMPLIANCE SYSTEM/SERVICE

233

GENERATE FIX INSTRUCTION STEPS

234

DELIVER FIX INSTRUCTION STEPS TO NODE

235

EXECUTE FIX INSTRUCTION STEPS

_236_

RECEIVE ANTI-TAMPER ALERT

_237_

ANALYZE ANTI-TAMPER ALERT

_238_

IF ANTI-TAMPER ALERT INDICATES SECURITY INCIDENT

_239_

EXECUTE ANTI-TAMPER RESPONSE MECHANISMS

RECEIVE AUDIT LOG ALERT — 240

ANALYZE AUDIT LOG ALERT — 241

IF AUDIT LOG ALERT INDICATES SECURITY INCIDENT — 242

EXECUTE INCIDENT RESPONSE PLAYBOOK — 243

GENERATE SECURITY INCIDENT REPORT — 244

RECEIVE OFFENSIVE ATTACK REQUEST _245_

ANALYZE AND DERIVE OFFENSIVE ATTACK WORKFLOW _246_

EXECUTE OFFENSIVE ATTACK _247_

GENERATE OFFENSIVE ATTACK REPORT _248_

_250_

RECEIVE SYSTEMS ENGINEERING ARTIFACT REQUEST

_251_

ANALYZE SYSTEM DATA

_252_

GENERATE DIAGRAM, DATA FLOW, ATTACK TREE, OR DOCUMENT

COMPLIANCE STORE 130

| FIELD 902 | TYPE 903 | DESCRIPTION 904 |
|---|---|---|
| CompID | Integer | Unique identifier for each system node |
| HostName | String | Name assigned to the system node |
| IP | String | IP address assigned to the system node |
| OS | String | Operating system running on the node |
| ScanType | Blob | Type of scan (e.g., STIG, Nessus) |
| ScanFile | String | Scan file (.ckl, .Nessus) |
| ScanStatus | Datetime | Date & time of last scan |
| ReportType | String | Type of report (e.g., POA&M, SSP) |
| ReportFile | Blob | Report File (.xlsx, .pdf) |
| LogData | Text | Audit log data |
| PatchLevel | String | Current patch level of the system |
| VulnCount | Integer | Total number of vulnerabilities found |
| CVE | String | Associated CVE identifiers |
| Fixes | Text | Script(s) for remediation of findings |

AI ACTION STORE 135

| ACTION ID 905 | ACCESS 906 | SCRIPTS 907 | CODE 908 | MODELS 909 | ACTIONS 910 |
|---|---|---|---|---|---|
| 1 | API_Token_1 | Script_1A | Repo_Link1 | Model_A | Block_IP |
| 2 | API_Token_2 | Script_2B | Repo_Link2 | Model_B | Alert_User |
| 3 | API_Token_3 | Script_3C | Repo_Link3 | NeuralNet_A | Encrypt_DB |

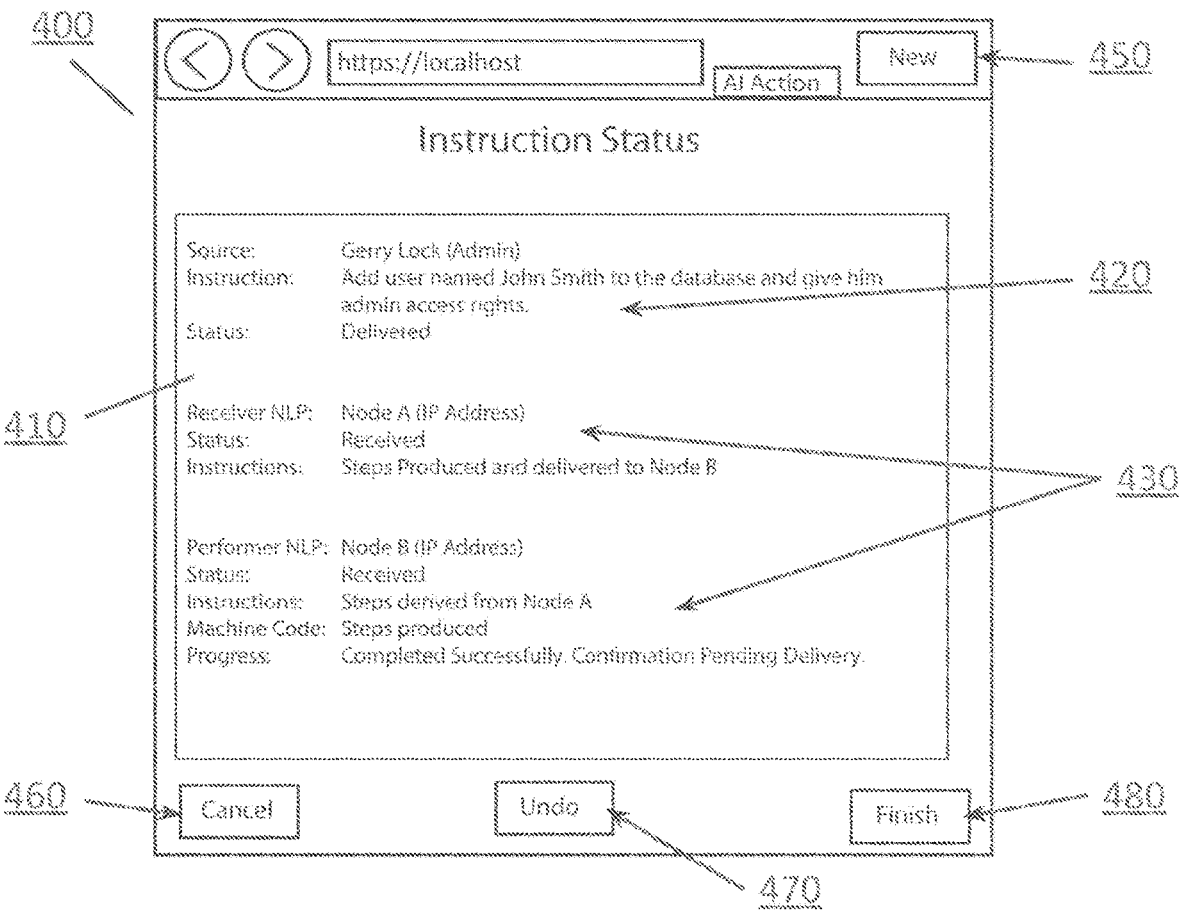

Instruction Status

Source:          Gerry Lock (Admin)
Instruction:     Add user named John Smith to the database and give him
                 admin access rights.
Status:          Delivered Receiver NLP:    Node A (IP Address)
Status:          Received
Instructions:    Steps Produced and delivered to Node B Performer NLP:   Node B (IP Address)
Status:          Received
Instructions:    Steps derived from Node A
Machine Code:    Steps produced
Progress:        Completed Successfully. Confirmation Pending Delivery.

400
450
420
410
430
460   Cancel
470   Undo
480   Finish

RECEIVE PROMPT EXECUTION REQUEST

266

SEGREGATE INSTRUCTION STEPS AND EXECUTION CODE

267

INITIATE PROMPT AND EXECUTE INITIAL INSTRUCTION STEP

268

SAVE PROMPT OUTPUT AND COMMAND HISTORY

269

INITIATE NEW PROMPT

270

LOAD SAVED OUTPUT AND COMMAND HISTORY FROM PREVIOUS STEP

271

EXECUTE NEXT INSTRUCTION STEP

RECEIVE EMAIL, PROMPT, TICKET, ALERT, LOG, OR VOICEMAIL DATA VIA API _275_

TRANSLATE DATA INTO I.T. RELATED INSTRUCTION STEPS VIA NLP _276_

TRANSLATE INSTRUCTION STEPS INTO EXECUTEABLE CODE VIA INTERPRETER _277_

EXECUTE CODE VIA AI AGENTS WITH PRIVILEGED ACCESS _278_

GENERATE AND DELIVER ACTION REPORT VIA NLP, AI AGENTS, AND API _279_

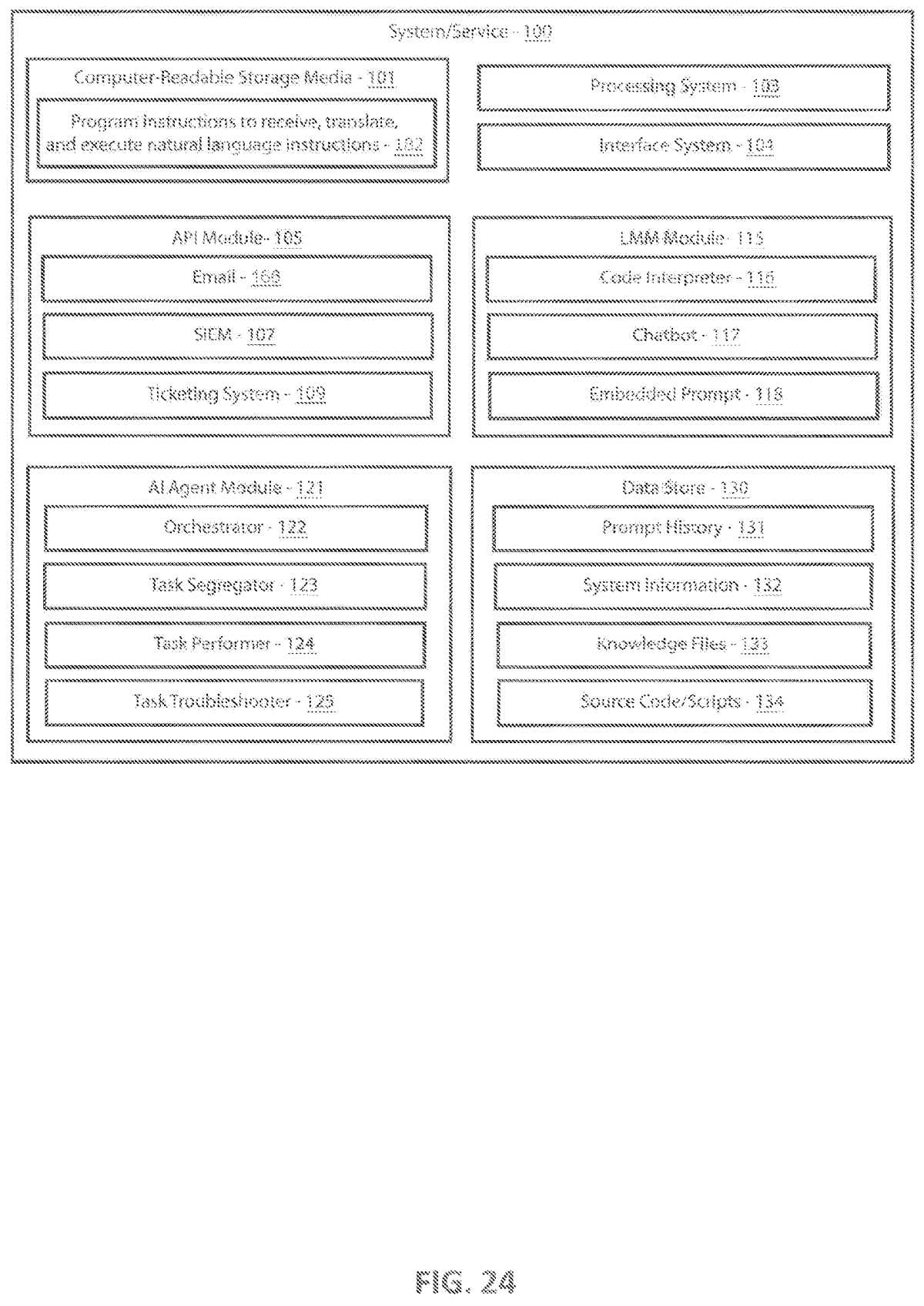

System/Service - 100

Computer-Readable Storage Media - 101

Program instructions to receive, translate, and execute natural language instructions - 102

Processing System - 103

Interface System - 104

API Module - 105

Email - 166

SIEM - 107

Ticketing System - 109

LMM Module - 115

Code Interpreter - 116

Chatbot - 117

Embedded Prompt - 118

AI Agent Module - 121

Orchestrator - 122

Task Segregator - 123

Task Performer - 124

Task Troubleshooter - 125

Data Store - 130

Prompt History - 131

System Information - 132

Knowledge Files - 133

Source Code/Scripts - 134

FIG. 24

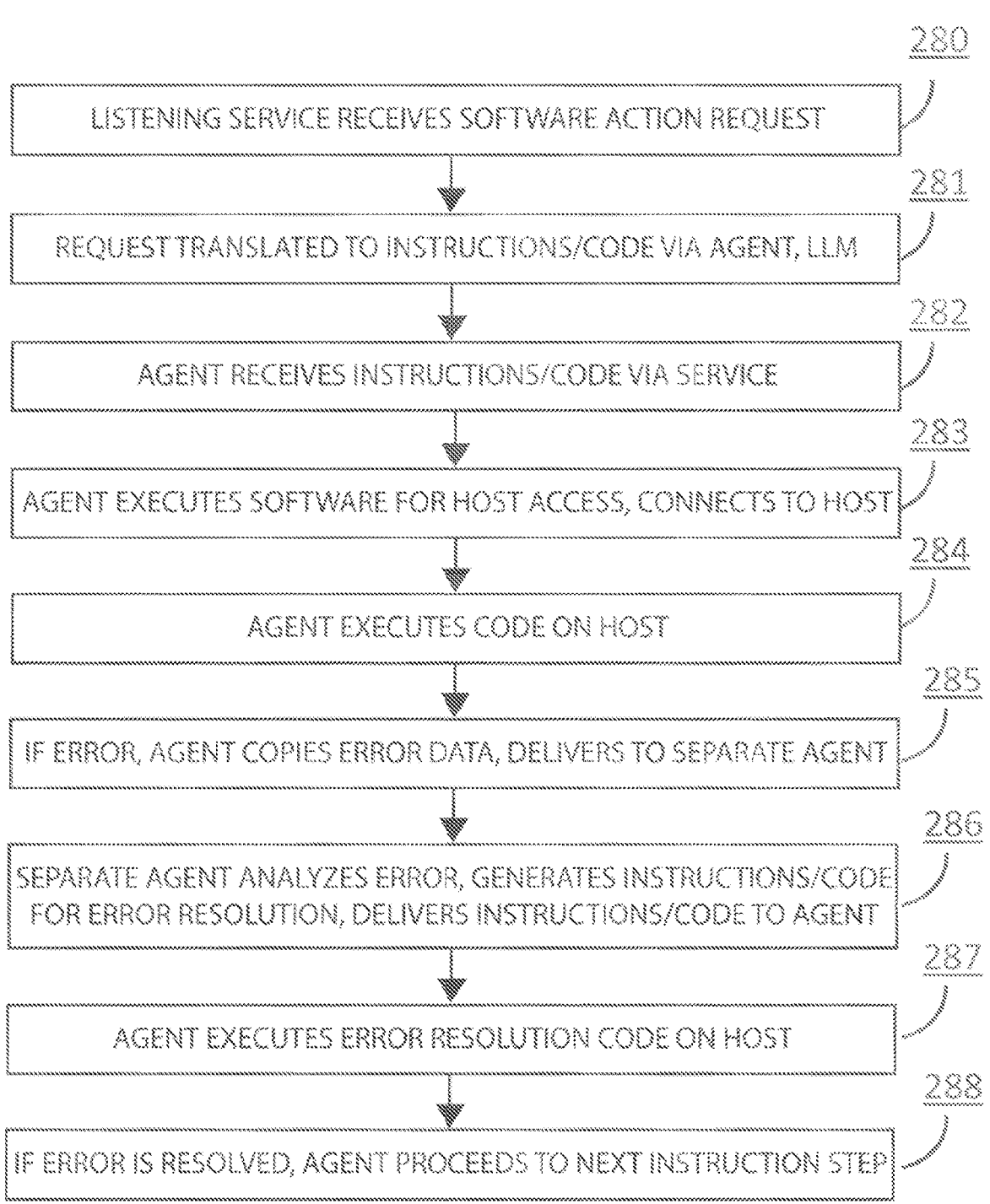

_280_

LISTENING SERVICE RECEIVES SOFTWARE ACTION REQUEST

_281_

REQUEST TRANSLATED TO INSTRUCTIONS/CODE VIA AGENT, LLM

_282_

AGENT RECEIVES INSTRUCTIONS/CODE VIA SERVICE

_283_

AGENT EXECUTES SOFTWARE FOR HOST ACCESS, CONNECTS TO HOST

_284_

AGENT EXECUTES CODE ON HOST

_285_

IF ERROR, AGENT COPIES ERROR DATA, DELIVERS TO SEPARATE AGENT

_286_

SEPARATE AGENT ANALYZES ERROR, GENERATES INSTRUCTIONS/CODE FOR ERROR RESOLUTION, DELIVERS INSTRUCTIONS/CODE TO AGENT

_287_

AGENT EXECUTES ERROR RESOLUTION CODE ON HOST

_288_

IF ERROR IS RESOLVED, AGENT PROCEEDS TO NEXT INSTRUCTION STEP

RECEIVE SYSTEM DATA VIA FILE UPLOAD AND/OR USER INPUT

_291_

ANALYZE SYSTEM DATA VIA LLM

_292_

INITIATE TTE CHATBOT WITH EMBEDDED ATTACK PROMPTS

_293_

RECEIVE ATTACK INPUT VIA CHATBOT AND/OR USER INPUT

_294_

OUTPUT ATTACK EXPLOITABILITY OR SYSTEM PROTECTION

INTEGRATED AI-DRIVEN SYSTEM FOR AUTOMATING IT AND CYBERSECURITY OPERATIONS

CROSS-REFERENCE TO RELATED APPLICATIONS

This application is a continuation of U.S. patent application Ser. No. 19/022,083, filed on Jan. 15, 2025, entitled, "Integrated AI-Driven System for Automating IT and Cybersecurity Operations," which is a continuation application of and claims priority under 35 U.S.C. § 120 of PCT Patent Application Serial No. PCT/US2023/085667, filed on Dec. 22, 2023 and entitled "An Integrated AI-Driven System for Automating IT and Cybersecurity Operations," which in turn claims priority under 35 U.S.C. § 119 (c) of U.S. Provisional Patent Application Ser. No. 63/548,187, filed on Nov. 11, 2023 and entitled "A System for Automating Software Actions Using Advanced AI Techniques"; U.S. Provisional Patent Application Ser. No. 63/543,095 filed on Oct. 8, 2023 and entitled "A System for Automating Cybersecurity Software Actions Using Advanced AI Techniques"; U.S. Provisional Patent Application Ser. No. 63/540,345, filed on Sep. 25, 2023 and entitled "A System for Automating Cybersecurity Software Actions Using Advanced AI Techniques"; U.S. Provisional Patent Application Ser. No. 63/538,842, filed on Sep. 17, 2023 and entitled "A System For Automating Cybersecurity Software Actions Using Advanced AI"; U.S. Provisional Patent Application Ser. No. 63/439,854, filed on Jan. 18, 2023 and entitled, "AI System For Translating Written Instructions Into Software Actions"; U.S. Provisional Patent Application Ser. No. 63/436,528, filed on Dec. 31, 2022 and entitled "A System And Method For Automating Cyber Security Compliance Operations"; U.S. Provisional Patent Application Ser. No. 63/435,315, filed on Dec. 26, 2022 and entitled "AI System For Translating Written Instructions Into Software Actions." All of these applications are incorporated herein by reference.

FIELD OF INVENTION

This invention relates to the field of information technology, including cybersecurity, more specifically to systems that utilize advanced artificial intelligence techniques to automate various cybersecurity software actions, thereby enhancing security operations and effectiveness.

BACKGROUND OF THE INVENTION

Traditional information technology and cybersecurity operations often require manual interventions, leading to potential delays in response, increased risks, and operational inefficiencies. Automating these actions using artificial intelligence can expedite responses, minimize human errors, and increase the overall efficiency of the system.

BRIEF DESCRIPTION OF THE INVENTION

This invention presents a multifaceted system that integrates advanced artificial intelligence techniques, primarily neural networks and natural language processing, to automate an array of information technology and cybersecurity actions. Through an intuitive interface, including chatbot prompts, the system can receive instructions, process them, and activate corresponding cybersecurity tasks. It also incorporates a variety of report generation, system isolation, simulation environments, and other advanced features tailored for robust cybersecurity operations.

An embodiment of the invention is directed to a system for automating cybersecurity software actions using advanced AI techniques is disclosed. The system 100 enables the capability of software action automation. The system includes a natural language processing (NLP) module for receiving written instructions in natural language and translating the written instructions into software actions or machine code. The system further includes an automated software process for executing the software actions or machine code. The NLP module may use either rule-based processing or machine learning algorithms to identify the actions to be performed. Examples of software actions that can be automated with this system include but are not limited to system administration, system integration, software development, software testing, data entry, data analytics, word processing, accounting, communications, modeling, and design. Specific examples detailed within pertain to the cybersecurity domain.

Another embodiment of the invention is directed to a system for automating cybersecurity software actions using advanced AI techniques, comprising a processing system; computer-readable storage media; an interface system, including a communications interface; a graphical user interface or command line interface; one or more natural language processing model or neural network, wherein the one or more natural language processing model or neural network can be interfaced with an embedded prompt or chatbot prompt, and is hosted on one node, which communicates with one or more node via communications interface; and program instructions stored on the computer-readable storage media that, when executed by the processing system, direct the processing system to: in response to the system receiving a written or verbal instruction via embedded prompt or chatbot prompt: the one or more natural language processing model or neural network processes the written or verbal instruction, generates a list of each step required to perform the instruction, translates instruction steps into executable software actions or machine code, executes the software actions locally or on a separate node via communications interface, and receives software action result data.

The system further comprises an agent, user, service, software application, configuration management application, or neural network or model located on each network node, wherein the agent, user, service, software application, configuration management application, or neural network or model is capable of communicating with the one or more natural language processing model or neural network hosted on the control node.

This Brief Summary is provided to introduce a selection of concepts in a simplified form that are further described below in the Detailed Description. The Brief Summary is not intended to identify key features or essential features of the claimed subject matter, nor is it intended to be used to limit the scope of the claimed subject matter.

BRIEF DESCRIPTION OF THE DRAWINGS

FIG. 17A shows an example data store that houses exemplary data to support a system for automating cyber security software actions.

FIG. 17B shows another example data store that houses exemplary data to support a system for automating cyber security and Information Technology software actions.

FIG. 18 shows an example user interface that can deliver instructions to the natural language processing model or neural network.

FIG. 24 is a block diagram illustrating the system's architecture, highlighting its key components.

FIG. 27 illustrates a process flow depicting the collaboration of AI agents with LLMs or LMMs to execute software action requests.

DETAILED DESCRIPTION

Figure 1:
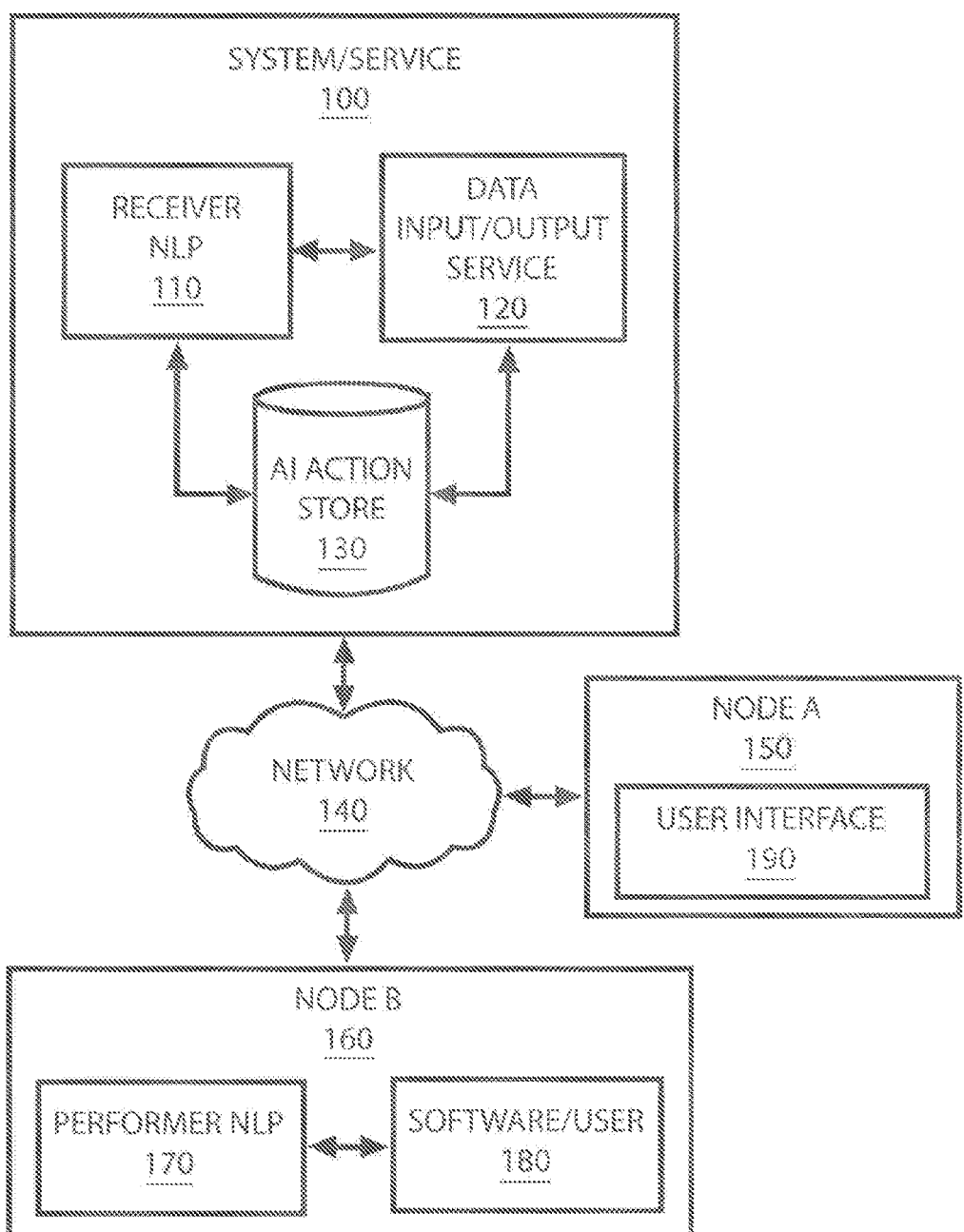
FIG. 1 shows an embodiment of system/component environment in which some implementations of systems and techniques for automating cyber security and Information Technology actions can be carried out.

Throughout the description of this invention, references to "cyber security" may be understood to refer to all types of information technology (IT) operations, of which cyber security is just one category of actions. All categories of IT operations and actions are contemplated and included within the scope of the invention.

A system and method for automating cyber security operations are disclosed. The system includes a natural language processing (NLP) module for processing written instructions in natural language into machine level code in order to execute operations associated with cyber security operations. The system also includes a service or agent program for executing the identified actions. The NLP module may use either rule-based processing or machine learning algorithms to identify and translate the actions to be performed. Examples of cyber security and information technology operations that can be automated with this system include scanning, remediation, report generation, auditing, requirement generation, and diagram generation.

Embodiments of the present disclosure relate to systems and methods for automating cyber security and information technology (IT) operations. In some embodiments, the system includes a natural language processing (NLP) module for processing written instructions in natural language into machine level code in order to execute operations associated with cyber security and IT operations. The system may also include a service or agent program for executing the identified actions. The NLP module may use either rule-based processing or machine learning algorithms to identify and translate the actions to be performed.

In some embodiments, the system and method may be used to automate various cyber security and IT operations, such as scanning, remediation, report generation, auditing, requirement generation, and diagram generation. The system and method may be used to automate cyber security and IT operations for various types of systems, including but not limited to: networks, servers, workstations, and mobile devices.

The NLP module can use either rule-based processing or machine learning algorithms. This ensures versatility in addressing various cybersecurity compliance operations, which can range from scanning, remediation, report generation, auditing, to more intricate processes like requirement generation and diagram production.

Workflow: In one embodiment, upon receiving a cyber scanning request, the system activates the compliance natural language processing model or neural network to obtain and process cybersecurity verification instructions. Post-processing, these instructions are translated into a structured set of cyber security or IT scanning steps. This structured set is then relayed to the compliance AI model or neural network, which subsequently performs the cybersecurity scanning. Upon completion, the system generates a comprehensive cybersecurity compliance report.

Another embodiment involves the system responding to a cyber remediation request. The system obtains cybersecurity remediation data that includes detailed natural language instructions about the remediation process. These instructions are processed via the compliance natural language processing model or neural network, which subsequently sends a remediation instruction set to the compliance AI model or neural network. The AI model then performs the remediation, after which a detailed report is generated. This report provides insights into the changes made to the system during the remediation process.

Figure 2:
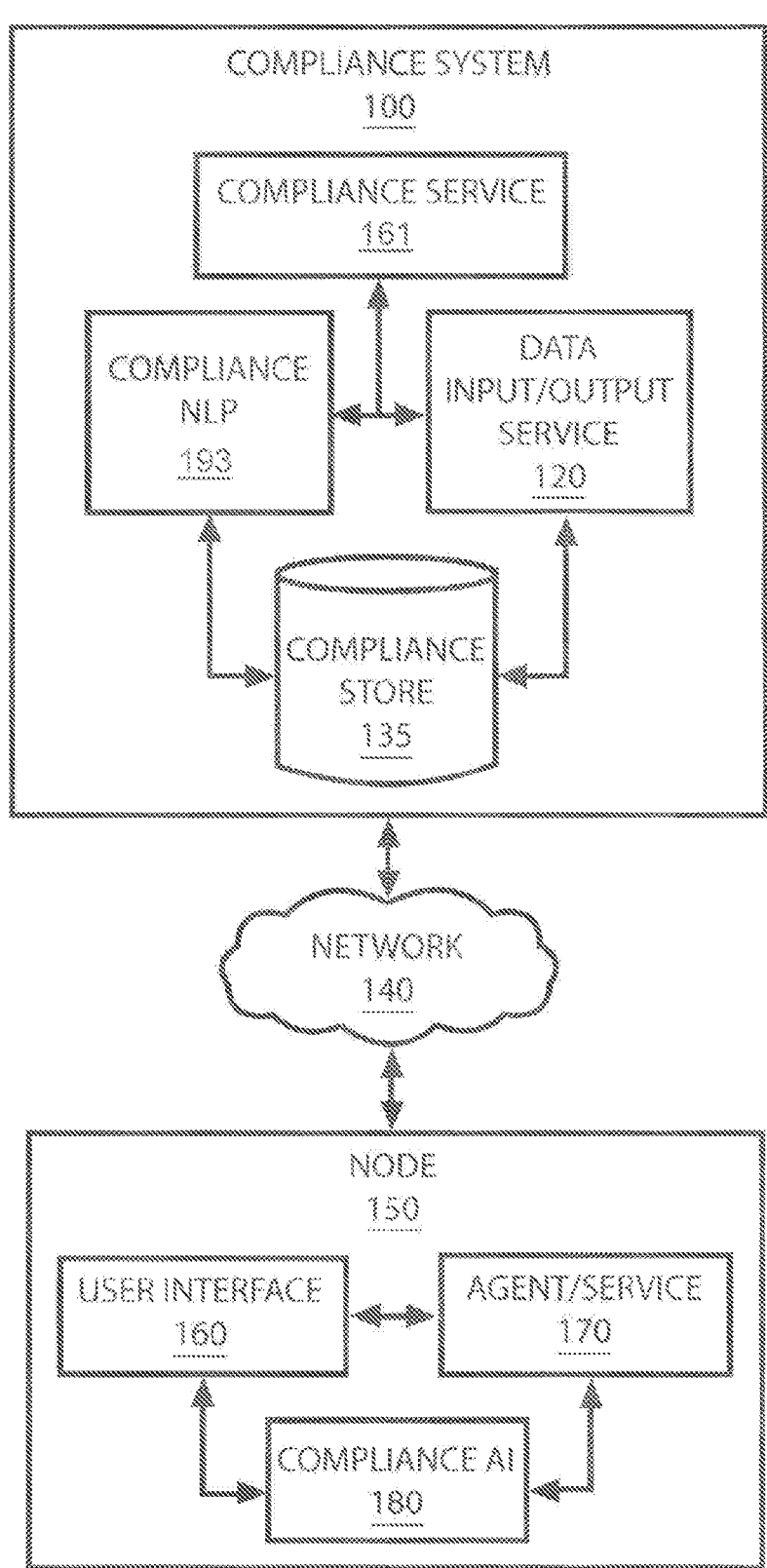
FIG. 2 shows an embodiment of system/component environment in which some implementations of systems and techniques for automating cyber security actions can be carried out.
Figure 3:
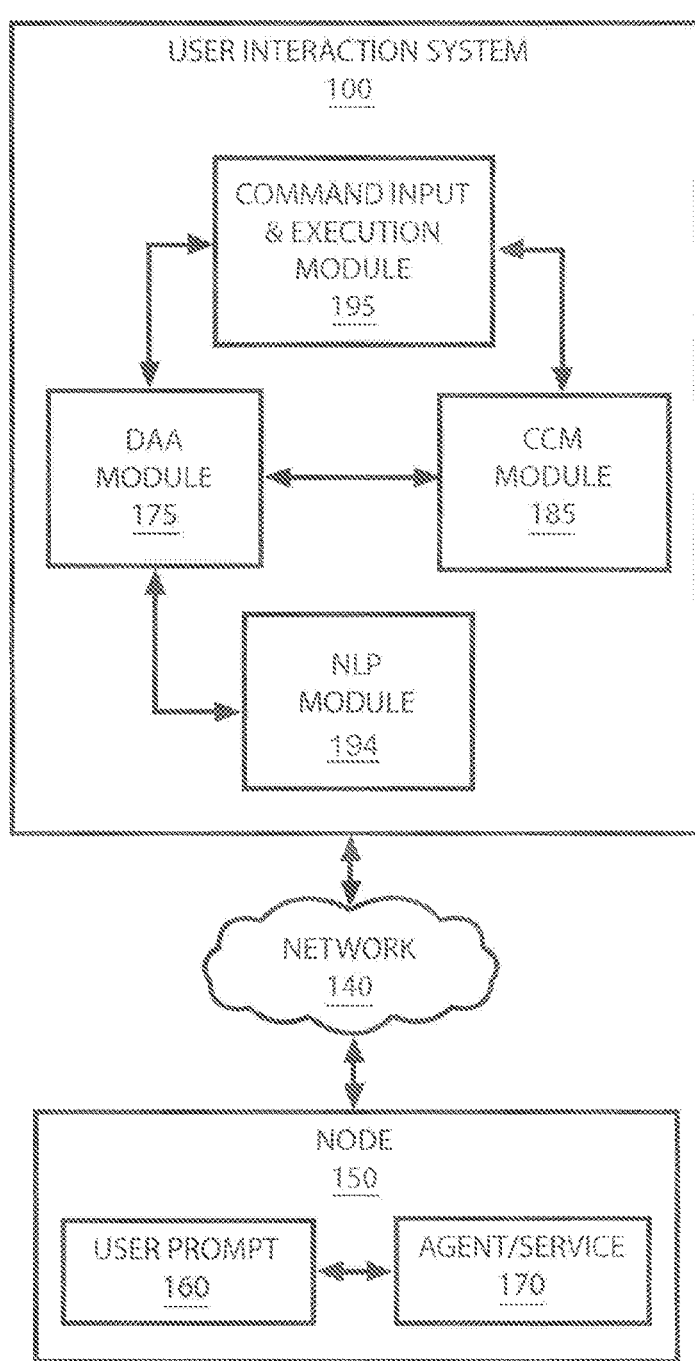
FIG. 3 shows an embodiment of system/component environment in which some implementations of systems and techniques for automating cyber security and Information Technology actions can be carried out.

System Architecture: As depicted in FIGS. 1-3, the system 100 designed for automating cybersecurity compliance operations includes multiple components. A processing system, such as a microprocessor, CPU, FPGA, or the like, constitutes the core, assisted by computer-readable storage media and an interface system. The interface system can include a communications interface, which enables seamless interaction with external systems and devices.

For effective natural language processing and action generation, the system 100 comprises a compliance natural language processing model or neural network 193 and a compliance AI model or neural network 180. Additionally, program instructions stored in the computer-readable storage media 101 dictate the operations of the processing system. The inclusion of a user interface ensures real-time interaction with end-users, allowing them to input instructions and view outputs seamlessly.

Operational Dynamics: When the compliance natural language processing model or neural network receives user input in natural language, it employs NLP techniques to interpret these instructions. Post-interpretation, it generates machine-level instructions that are dispatched to the compliance AI model or neural network. The AI model, based on the instructions, performs actions ranging from database queries to device-specific commands.

Output Generation: The compliance AI model or neural network can generate output data as a result of executing the received instructions. This data can be in various formats, such as reports, log files, etc. The generated output is sent to the compliance natural language processing model or neural network for further processing, if required, and is then presented to the user.

Advanced Features: Some embodiments of the system can include AI agents on nodes. These agents facilitate real-time communication between the compliance natural language processing model or neural network and the compliance AI model or neural network. By continuously monitoring communication, they ensure synchronized and effective information and instruction exchange between the various system components.

The present invention aims to leverage advanced artificial intelligence techniques, focusing on integrating generative AI models such as Llama™, ChatGPT™, BARD™, and Claude™, to automate and augment the functionality of cybersecurity operations. The described invention draws inspiration from applications like ChatGPT, yet it incorporates broader functionalities that cater specifically to cyber-security operations. By using a mix of agentless techniques and agent technologies, users have the flexibility to perform system 100 functions either through config management applications, user accounts, software applications, or neural networks.

Central to the system 100 is the distinction between rule-based and machine learning algorithms for Natural Language Processing (NLP) and action automation. Rule-based systems utilize pre-defined patterns and responses, while machine learning algorithms adapt and learn from data, providing dynamic and contextually aware responses.

The invention's versatility is evident in its deployment capability, either on-premises or cloud-based. On-premises, or air-gapped systems, offer heightened security, ensuring no external communications, which might be preferred for highly sensitive operations. In contrast, cloud-based systems offer scalability, reduced operational costs, and ease of integration with other cloud services.

One of the system's 100 significant innovations is the continuous modification capability. The AI can modify the source code of applications, scripts, or operating systems, as well as kernel code, dynamically, automating tasks as instructed by an end user.

To enhance the system's 100 understanding, a multimodal neural network is incorporated, capable of processing text, images, video, and audio. This is particularly useful in analyzing documents like system diagrams and data flows, providing a richer context for decision-making.

Recognizing the importance of hands-on training, the system 100 facilitates a simulated environment for tabletop exercises. Users can simulate attacks on their virtual networks, guided by prompt-based interactions, to identify vulnerabilities and system weak points.

For enhanced visibility into system components, the system 100 generates and analyzes software lists, comparing software with available Security Technical Implementation Guides (STIGs) and cross-referencing software versions with Common Vulnerabilities and Exposures (CVEs) and other online cybersecurity resources. Furthermore, the system 100 can analyze software vendor documentation, providing a holistic understanding of potential vulnerabilities.

This system 100 provides an array of reporting capabilities, from Anti-Tamper reports that detail attack trees and vulnerabilities to Plan of Action and Milestones (POA&M) reports that are dynamic, AI-enhanced, and integrable with platforms that facilitate cross-platform integration.

Responding to potential threats swiftly is essential. The system 100 automates log alert responses, integrating with Security Orchestration, Automation, and Response (SOAR) systems, manipulating Access Control Lists (ACLs), and firewalls to isolate and protect threatened components. Enhancing integration capabilities, the system 100 provides access to application APIs, especially SIEM and SOAR applications, for seamless playbook executions. Moreover, the system 100 is compatible with APIs for endpoint management applications, facilitating real-time management of networked devices.

Anti-Tamper measures are critical in today's dynamic threat landscape. The system 100 offers automation for handling Anti-Tamper alerts, employing strategies such as system isolation, encryption, and data removal to safeguard valuable data.

This system's 100 potential applications are vast, spanning public and private sectors, from government and military operations to banking and healthcare. Its modular architecture ensures case of updates, ensuring it remains relevant in the ever-evolving cybersecurity landscape.

The system 100 may be used in a variety of applications, including chatbots, voice assistants, code generation systems, and automation systems. The effectiveness of the system 100 in generating cybersecurity software actions will depend on the quality of the user-operator prompt input as well as the AI model or neural network training data.

FIG. 1 shows an embodiment of a system/component environment in which some implementations of systems and techniques for generating cybersecurity software actions. In brief, the system 100 has underlying services, databases, and NLP modules including the data input/output service 120 and the cost service, that work collaboratively to send and receive data to and computing system nodes 150, 160, a user interface 190, an AI action store 130, and a receiver NLP module 110. The receiver NLP 110 also contains programming instructions used to identify and translate written instructions into software actions. The system 100 stores all of this data within data stores including an AI action store 130. More or less data store can be used in other embodiments and the data stores mentioned herein are used for exemplary purposes. The user interface 190 allows users system access to view historical data related to past software action requests along with inputting new software action requests to be performed. Any node existing within the system can connect to one another along with connecting to the system 100 via network 140. The AI action store 130 contains all data related to any given software action request, including the specific actions, the action output results, the users associated with said actions, and the computing systems in which the actions were performed on. The data input/output service 120 sends and receives data from the data store, the receiver NLP 110, the user interface 190, the software/user 180, or any node 150, 160 connected to the system. The performer NLP 170 receives instruction steps derived from the receiver NLP 110, translates said instructions into machine mode, performs software actions including operating system or software actions, and relays the output data from said actions back to the System 100. The software/user 180 represents any system user account or service that can be utilized by the performer NLP 170 to execute software actions.

FIG. 1 presents a block diagram delineating the architecture of an exemplary system implementation. This depiction shares a foundational structure with that illustrated in FIG. 2, but introduces several distinctive elements and modifications to illustrate an alternative configuration. Within this variant, the foundational block, analogous to the main service block in FIG. 2, undergoes a slight modification. Notably absent is the sub-service element, streamlining the structure and centralizing the functional components. In place of the Compliance Data Store 135 depicted in FIG. 2, FIG. 1 introduces an AI Action Store 130. This component serves as a specialized repository, housing data pertinent to AI actions, thereby facilitating the storage and retrieval of AI-generated instructions and responses.

The Compliance NLP Module 193 in FIG. 2 evolves into two distinct entities within FIG. 1: a Receiver NLP 110 located in the main service and a Performer NLP 170 situated within the node. The Receiver NLP 110 specializes in interpreting and processing incoming natural language instructions, serving as the system's primary point of communication intake. Meanwhile, the Performer NLP 170, residing within the node 160, focuses on translating these instructions into executable tasks, showcasing the system's ability to distribute functionalities across different components.

A notable addition to the architecture in FIG. 1 is the introduction of an additional node A 150 hosting a User Interface 190. This User Interface 190 is an optional component, offering flexibility in the system's configuration. It can be hosted on any node within a network, including those nodes accommodating the main system/service 100, thereby providing users with diverse access points to interact with the system 100. This flexibility underscores the system's adaptability and user-centric design, aiming to accommodate varied user preferences and operational requirements.

In some embodiments, the system connects to a software application via a user account or service dedicated to accessing said software application, performing actions, and retrieving output data from said actions. In other embodiments, the system connects to a software application via the software applications application protocol interface (API).

Network 140 can include, but is not limited to, a cellular network (e.g., wireless phone), a point-to-point dial up connection, a satellite network, the Internet, a local area network (LAN), a wide area network (WAN), a Wi-Fi network, an ad hoc network, a Bluetooth network, or a combination thereof. Such networks are widely used to connect various types of network elements, such as hubs, bridges, routers, switches, servers, and gateways. The network 140 may include one or more connected networks (e.g., a multi-network environment) including public networks, such as the Internet, and/or private networks such as a virtual private network or secure enterprise private network. Access to the network 140 may be provided via one or more wired or wireless access networks as will be understood by those skilled in the art. The system 100 and any system node 150, 160 may connect to network 140 by employing one or more elements of a communications interface. Computing system and device components supporting network connectivity via a communications interface are described in detail with respect to FIG. 1.

A communications interface may be used to provide communications between systems, for example over a wired or wireless network 140 (e.g., Ethernet, WiFi, a personal area network, a wired area network, an intranet, the Internet, Bluetooth, etc.). The communications interface may be composed of several components, such as networking cards or modules, wiring and connectors of various types, antennae, and the like. Synchronized tablets may communicate over a wireless network such as via Bluetooth, Wi-Fi, or cellular.

It should be noted that, while sub-components of system 100 are depicted in FIG. 1, this arrangement of the system 100 into components is exemplary only; other logical arrangements of the system 100 capable of performing the operational aspects of the disclosed techniques are possible. Various types of physical or virtual computing systems may be used to implement the system 100 such as server computers, desktop computers, cloud compute server environments, laptop computers, tablet computers, or any other suitable computing appliance. When implemented using a server computer, any of a variety of servers may be used including, but not limited to, application servers, database servers, mail servers, rack servers, blade servers, tower servers, virtualized servers, or any other type of server, variation of server, or combination thereof.

A computing system or device may be used in some environments to implement a system 100. Further, it should be noted that aspects of the system 100 may be implemented on more than one device.

In conclusion, FIG. 1 offers a nuanced perspective on the system's architecture, introducing modifications and additions to the structure depicted in FIG. 2. The detailed block diagram elucidates the adaptive and flexible nature of the system, highlighting its capacity to evolve and accommodate different functionalities and user interaction paradigms.

FIG. 2 portrays a block diagram that illuminates the structure of an exemplary system implementation, specifically focusing on compliance aspects of the service. In this illustrated embodiment, the system is comprised of a principal service that houses a variety of components including a Compliance Service 161, a Compliance NLP Model 193, a Data Input/Output Service 120, and a Compliance Data Store 135, each playing a pivotal role in ensuring the system's 100 integrity and functionality.

At the heart of this system 100 lies the Compliance Service 161, acting as the central hub for managing and orchestrating compliance-related operations. It forms integral connections with the Data Input/Output Service 120 and the Compliance NLP Model 193, facilitating seamless interaction and data exchange. Furthermore, the Compliance Service 161 extends its connectivity to nodes within the network 140, enhancing the system's 100 reach and interaction capabilities.

Each node 150 within the network 140 is equipped with an Agent/Service 170, Compliance AI 180, and User Interface 160, which could be accessed on a single node, various nodes or system 100. These components within the node 150 are interconnected, enabling them to communicate and collaborate, thereby fostering a conducive environment for executing compliance tasks and user interactions. The presence of Compliance AI model 180 within the node 150 underscores the system's commitment to leveraging artificial intelligence for enhancing compliance operations.

The Data Input/Output Service 120 serves as a critical conduit for managing data flow within the system. It establishes connections with the Compliance Data Store 135, Compliance NLP Model 193, and Compliance Service 161, ensuring that data is appropriately stored, retrieved, and communicated amongst the various components. The presence of this service accentuates the importance of managing data effectively for optimal system performance.

The Compliance NLP Model 193, specializing in natural language processing, forms a nexus of communication within the main service block. It connects with each component housed within the system 100, enabling the interpretation and processing of natural language instructions related to compliance. This module's connectivity highlights its central role in understanding user inputs and translating them into actionable tasks within the system.

Additionally, the Compliance Data Store 135 is integral for housing compliance-related data, acting as a repository that supports the storage and retrieval of information used in the system's 100 operations. Its connection with the Data Input/Output Service 120 ensures that data is accessible and manageable, supporting the various components in their compliance endeavors.

FIG. 2 illustrates a system 100 for automating cyber security and IT compliance operations in accordance with an embodiment of the present disclosure. The system 100 includes a processing system 102, computer-readable storage media 101, an interface system 104, a compliance natural language processing (NLP) model or neural network 193, a compliance AI model or neural network 180, and program instructions 112 stored on the computer-readable storage media 101. 'The system 100 may also include a user interface 114 for receiving input from a user and displaying output to the user.

The processing system 102 may include one or more processors, memory, and other components for executing instructions and performing various operations. The computer-readable storage media 101 may include one or more storage devices for storing data and instructions, such as hard drives, solid state drives, and other storage devices. The interface system 104 may include one or more interfaces for communicating with other devices and systems, such as a network interface for communicating over a network, a user interface for receiving input from a user, and other interfaces.

The compliance NLP model or neural network 193 is configured to process written instructions in natural language into machine level code in order to execute operations associated with cyber security and IT compliance operations. The compliance NLP model or neural network 193 may use either rule-based processing or machine learning algorithms to identify and translate the actions to be performed.

In some embodiments, the compliance natural language processing model or neural network may be configured to receive user input in the form of natural language instructions. The model or neural network may then use NLP techniques to parse and interpret the instructions, and may generate a series of machine level instructions based on the interpreted natural language instructions. These machine level instructions may be sent to the compliance AI model or neural network for execution.

In some embodiments, the compliance AI model or neural network may be configured to execute the received machine level instructions by interacting with one or more systems or devices. For example, the compliance AI model or neural network may be configured to access a database and retrieve specific data based on the received instructions. As another example, the compliance AI model or neural network may be configured to send commands to a device or system in order to perform a specific action, such as shutting down a device or initiating a scan.

In some embodiments, the compliance AI model or neural network may be configured to generate output data based on the execution of the received instructions. This output data may be in the form of a report, log file, or other data. The output data may be sent back to the compliance natural language processing model or neural network, and may be used to generate a report or other output for a user.

In some embodiments, the compliance natural language processing model or neural network may be configured to receive input in the form of natural language instructions from a user. The model or neural network may then use NLP techniques to parse and interpret the instructions, and may generate a series of machine level instructions based on the interpreted natural language instructions. These machine level instructions may be sent to the compliance AI model or neural network for execution.

In some embodiments, the compliance AI model or neural network may be configured to execute the received machine level instructions by interacting with one or more systems or devices. For example, the compliance AI model or neural network may be configured to access a database and retrieve specific data based on the received instructions. As another example, the compliance AI model or neural network may be configured to send commands to a device or system in order to perform a specific action, such as shutting down a device or initiating a scan.

In some embodiments, the compliance AI model or neural network may be configured to generate output data based on the execution of the received instructions. This output data may be in the form of a report, log file, or other data. The output data may be sent back to the compliance natural language processing model or neural network, and may be used to generate a report or other output for a user.

In some embodiments, the system may further comprise AI agents on nodes that aid in cross-communication between the compliance natural language processing model or neural network and the compliance AI model or neural network. The AI agents may be configured to continuously monitor for communication between the models or networks, and may facilitate the exchange of information and instructions between the models or networks.

In conclusion, FIG. 2 provides a comprehensive visualization of an example system implementation, emphasizing the interconnections and communications between various components focused on compliance. The detailed block diagram underscores the system's cohesive and intelligent structure, designed to manage and execute compliance-related tasks efficiently through a network of interconnected services and modules.

FIG. 3 presents a block diagram that delineates an exemplary system implementation, showcasing the intricate interconnections and communications amongst various modules to facilitate comprehensive functionality. In this illustrative implementation, the system comprises a service, enveloping several integral modules, namely the Command Input & Execution Module, the CCM Module, the DAA Module, and the NLP Module.

The Command Input & Execution Module serves as the crux of initiating and executing the instructions, facilitating the conversion of user inputs into actionable tasks within the system. It works in conjunction with the CCM Module, a central coordinating entity, managing and orchestrating the interactions between various modules to ensure seamless operation.

Positioned as an intermediary, the CCM Module engages in bidirectional communication with both the DAA Module and the Command Input & Execution Module, fostering a collaborative environment for data exchange and process synchronization. This interplay ensures that the system remains harmonious, with each module receiving the requisite information to perform its respective tasks effectively.

Adding a layer of intelligence to the system, the NLP Module is specialized in processing and understanding natural language, enabling the system to interpret user instructions accurately. The NLP Module establishes connections with the DAA Module and engages with other nodes connected via the network. This intercommunication is facilitated through agents/services hosted on the respective nodes, allowing for diverse and widespread interaction across the network.

Users interact with the system through a user prompt, which can be hosted either on the node or the service, providing flexibility and accessibility for varied user engagement. The user prompt establishes a connection with the agent/service, forming a bridge for user input to traverse into the system.

Furthermore, the DAA Module exhibits a pivotal role by connecting with the NLP Module, CCM Module, and Command Input & Execution Module. This central connectivity ensures that the DAA Module is well-positioned to distribute and receive information, acting as a hub for data exchange and module coordination.

In summary, FIG. 3 offers a detailed visualization of an example system implementation, highlighting the harmonious interplay and communication between diverse modules. The intricate connections, represented by the various communication links, underline the system's capability to interpret, manage, and execute user instructions through a well-coordinated and intelligent network of modules.

FIG. 3 elucidates a user interaction system 100 meticulously designed to process user interactions, extending its functionality across a myriad of applications. This system is characterized by an intricate architectural structure, integrating several modules, each tailored for specific functionalities, yet synchronized to operate cohesively.

At the forefront of this system is the Natural Language Processing (NLP) module 194. This integral component is adept at receiving user commands articulated in natural language and seamlessly converting them into machine-readable code or commands, serving as the initial interaction point for users and a cornerstone for subsequent processes.

Subsequently, the machine-readable commands are channeled to the Dynamic Action Automation (DAA) module 175, which is operatively connected to the NLP module 194. The DAA module 175 stands as a testament to the system's interpretative prowess. It leverages a sophisticated blend of rule-based algorithms and machine learning to interpret the machine-readable commands. This nuanced approach enables the DAA module 175 to activate the corresponding software tasks or functions based on the interpreted commands, showcasing the system's adaptability and responsiveness.

Progressing further, the system features a Continuous Code Modification (CCM) module 185. This module, operatively connected to the DAA module 175, dynamically adjusts or modifies the source code of applications or scripts based on the user inputs and requirements received. The ability of this module to modify source code introduces a level of adaptability and responsiveness that facilitates catering to diverse IT scenarios, reflecting the system's versatility.

Finally, ensuring the coherent operation of the aforementioned modules is the Command Input and Execution module 195. This module forms a *nexus*, connecting to the CCM module 185, the DAA module 175, and the NLP module 194. Its role is multifaceted; it receives commands or instructions from the user, processes, and interprets them, and subsequently executes the corresponding software actions or tasks based on the interpreted instructions. The incorporation of this module underscores the system's commitment to providing a seamless and integrated user experience.

The proposed system commences with a Frontend Interface, implemented as a Web Application. The interface utilizes a renowned framework known for its component-based architecture, enabling dynamic UI updates based on feedback from the Natural Language Processing (NLP) module 194. Additionally, libraries are integrated to facilitate API calls and manage the state of the application.

Subsequent to the frontend interface is the Backend Framework, employed to manage HTTP requests, serve the frontend, and offer APIs for functionalities such as NLP processing, dynamic action automation, and code modification. This framework is recognized for its efficiency in handling asynchronous operations and scalability.

Essential to the system is the Natural Language Processing (NLP) Module 194. This module incorporates general-purpose NLP libraries and advanced transformer-based models for command intent recognition. Additionally, integration with platforms specialized in natural language understanding enhances the module's proficiency in processing natural language.

For Dynamic Action Automation, the system incorporates general-purpose machine learning frameworks along with libraries suitable for simpler rule-based tasks. These tools facilitate the training and serving of machine learning models, enabling the system to interpret and act on user commands effectively.

The Continuous Code Modification feature of the system utilizes version control tools to track code modifications and libraries designed for manipulating source code based on user instructions. This ensures adaptability and responsiveness to user requirements.

In terms of data management, the system employs databases that can be selected based on preference for NoSQL or SQL approaches. Additionally, tools are incorporated for logging and providing real-time search functionality, ensuring efficient data retrieval and storage.

The Command Input & Execution Module of the system utilizes tools for scheduling, queuing, and executing tasks based on processed user inputs. Containerization technologies are employed to ensure task isolation and environment consistency, enhancing the reliability of the system.

Middleware and APIs are employed for facilitating communication between the frontend and backend and enabling modular interaction with various parts of the system. This ensures seamless interaction and data exchange within the system.

Addressing security and session management, the system integrates technologies for user authentication, session management, and third-party integrations and permissions. This safeguards the integrity of user data and system operations.

For Continuous Integration and Deployment (CI/CD), tools are utilized to automate testing and deployment tasks, ensuring that the system remains up-to-date and robust.

Lastly, the system leverages cloud hosting platforms for scalable hosting, storage, and machine learning services. Orchestration tools for containerized applications are also employed, facilitating the management and deployment of the system in a cloud environment.

In this software stack, a user interacts with the frontend, entering commands or instructions which are processed by the backend using the NLP module 194. This module interfaces with the dynamic action automation system, and continuous code modifications are performed as needed. Executed tasks are managed by the command input and execution module, with all actions being logged and stored in the databases. The entire system is scalable and deployable using CI/CD pipelines in a cloud environment.

In some embodiments, prompt engineering can be adeptly integrated to refine the functioning of embedded prompts, ensuring that they yield outputs of specific quality. Prompt engineering involves crafting and manipulating input queries or statements to steer the model's responses towards the desired quality and specificity. In these embodiments, users can have the luxury to interact with the system through user-friendly interfaces, where clicking on designated buttons can activate actions that would initiate the execution of embedded prompts.

For instance, a user could interact with a graphical user interface comprising multiple buttons, each labeled with a distinct action. Upon clicking a specific button, a predefined embedded prompt, engineered for that particular action, is activated. This prompt is designed to convey clear and specific instructions or queries to the system, thereby directing it to generate precise and quality output results. The user receives these results in a format that is easily understandable and actionable, ensuring that the system's response aligns with the user's expectations and requirements.

Such an approach of combining prompt engineering with user-interactive elements can significantly enhance user experience and system efficiency. The embedded prompts, meticulously engineered, can cater to a variety of tasks, from generating detailed reports to executing complex computational tasks, thus offering a versatile solution to users. Additionally, the case of activating these prompts through simple button clicks makes the system accessible and user-friendly, appealing to users with varied levels of technical proficiency.

This method of integrating prompt engineering with clickable actions can find applications across numerous domains, such as data analytics, cybersecurity, healthcare, and more, allowing users to harness the power of advanced AI models through intuitive and straightforward interactions. By tailoring the embedded prompts to the specific needs of the task at hand, this embodiment ensures the generation of results that are not only of high quality but also contextually relevant and accurate, thereby expanding the utility and applicability of the system.

Figure 4:
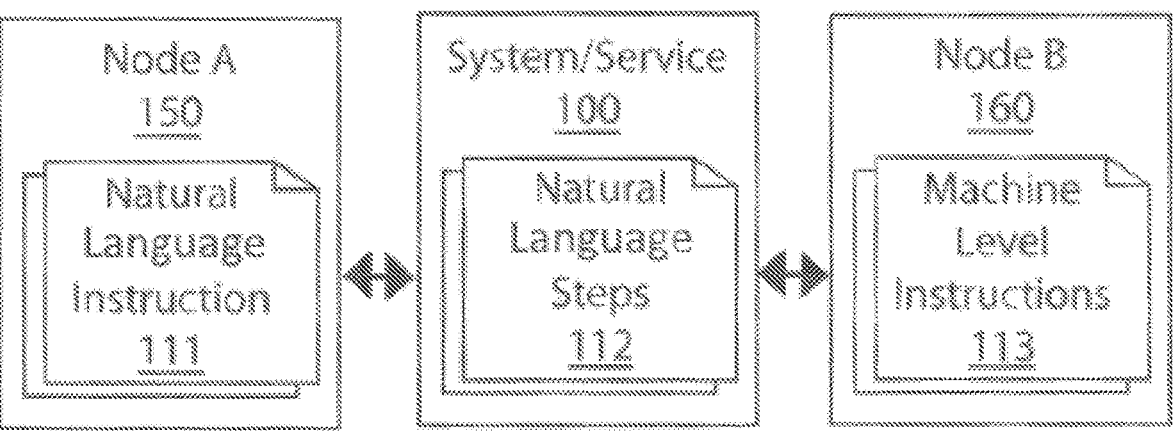
FIG. 4 shows an example high-level data flow for activities related to automating cyber security and Information Technology software actions.

FIG. 4 shows an example data flow for processes related to translating written instructions into software actions. In this example, a user on node A 150 wants to perform some software action on node B 160. The process is accomplished as follows: Node A 150 delivers a natural language instruction 111 to the system 100. The natural language instruction 111 is translated to natural language steps 112, which are software actions to be performed. The natural language steps 112 are then delivered to node B 160 where the natural language steps 112 are translated to machine level instructions 113. The written instructions are now translated into software actions that can be performed on node B 160. Any output from said instructions can be sent back to node A 150 or the system 100.

FIG. 4 illustrates a high-level data flow diagram, representing the seamless transition from natural language instructions to executable machine-level commands. The diagram comprises three principal blocks, each delineating a significant phase of the process, effectively demonstrating the system's capability to bridge human communication and machine execution.

The initial block represents the entry point of the user's natural language instruction into the system. This phase is critical as it captures the user's intent in a linguistically comprehensible form. The instruction is meticulously received and parsed, ensuring that every element of the directive is ready for subsequent translation. This block exemplifies the system's ability to understand and interpret human language, laying the foundation for the subsequent steps in the process.

Following the reception of the natural language instruction, the flow progresses to the second block, representing a service equipped with AI capabilities. Within this block, the core translation process occurs. The AI, utilizing advanced natural language processing and understanding techniques, translates the user's human-readable instructions into a format suitable for software execution. The service is designed to ensure accuracy and precision in translation, mapping each element of the instruction to corresponding software actions, ensuring that the user's intent is accurately encapsulated in executable form.

Upon successful translation, the software actions are then dispatched to the third node in the diagram. This node is representative of the execution environment where the translated instructions are brought to life at the machine level. The commands are executed with diligence, and the system's state is altered in accordance with the user's original directive. This execution phase is monitored for anomalies and deviations, ensuring alignment with the user's intent and addressing any discrepancies that may arise.

In conclusion, FIG. 4 offers a concise yet comprehensive visualization of the system's high-level data flow, demonstrating the transformation of natural language instructions into machine-level executions. It highlights the pivotal role of the AI-enabled service in translating human intent into actionable software commands, and the subsequent execution of these commands in the designated environment, showcasing the system's proficiency in bridging the gap between human communication and machine operation.

In some embodiments, the natural language instruction 111 can be immediately converted to machine-level code as opposed to initially translating the natural language instruction 111 into natural language steps 112.

Figure 5:
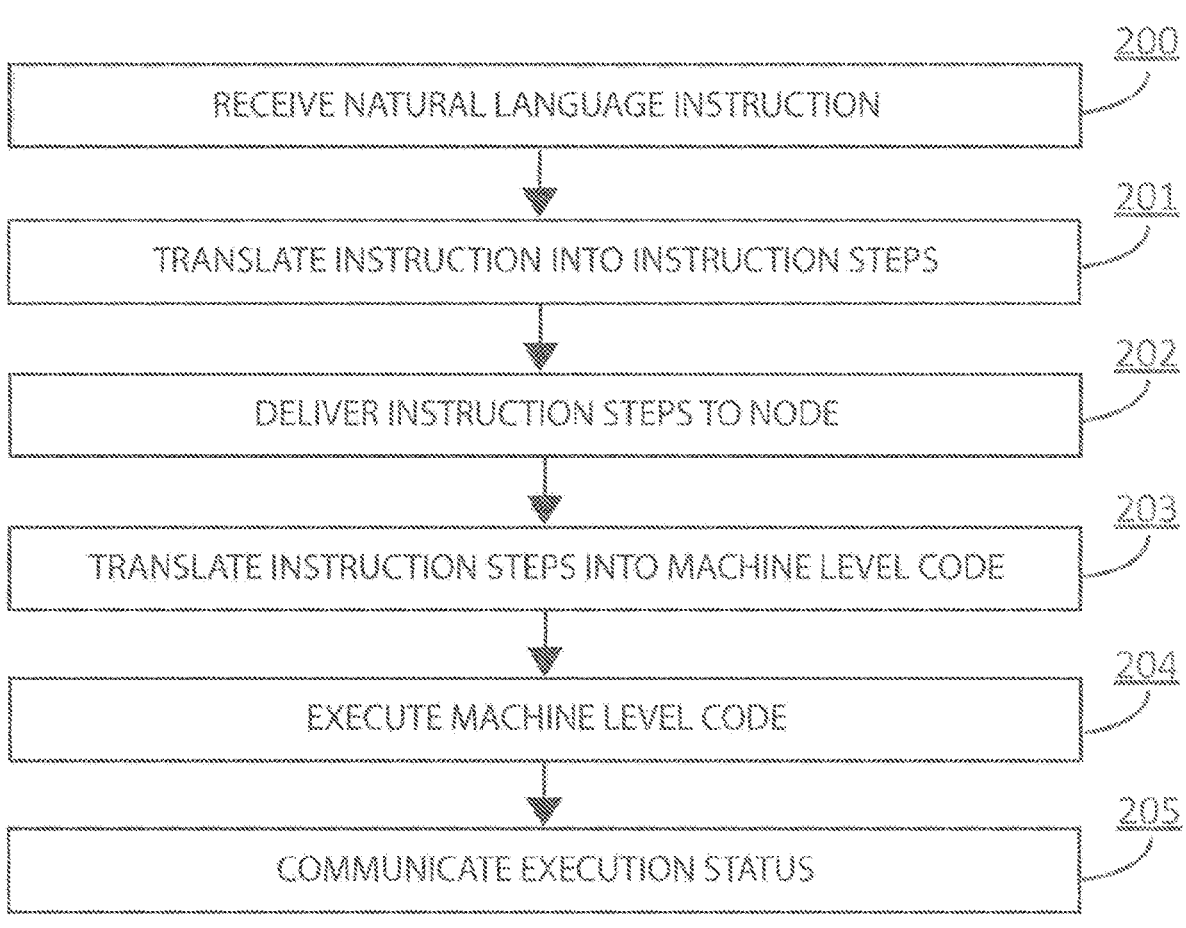
FIG. 5 shows an example process flow for activities related to natural language processing models or neural networks communicating with one another.

FIG. 5 shows an example process flow demonstrating a method to translate written instructions into software actions. First, the system 100 receives a natural language instruction 200. Next, the receiver NLP 110 translates the natural language instruction into natural language instruction steps 201. After that, the data input/output service 120 delivers the instruction steps to a node 202 in which the instruction steps need to be performed on. After the node receives the instruction steps via the agent, user, or service 180, the performer NLP 170 module translates the instruction steps into machine level code 203. Additionally, the combination of the agent, user, or service 180 and the performer NLP 170 module execute the machine level code 204 to perform the software action(s). Finally, the agent, user, or service 180 communicates the execution status 205 of the software actions that were performed to the system 100, via network 140.

FIG. 5 elucidates a central process flow that stands as the cornerstone of the described system, depicting a methodology not confined to cybersecurity, but expansive enough to incorporate any IT-related action. This figure systematically unfolds the procedure where a natural language instruction is received, translated into executable software actions, executed accordingly, and subsequently, the outcome of the actions is communicated back.

At the commencement of the process, the system is designed to receive instructions articulated in natural language, making it accessible and user-friendly. The linguistic constructs of the instructions are parsed and analyzed meticulously, ensuring a comprehensive understanding of the user's intent and the tasks to be performed. This initial step is pivotal, as it sets the tone for the entire operation, necessitating precision in interpreting the user's directives.

Following the receipt and understanding of the natural language instruction, the system then embarks on translating this human-readable directive into executable software actions. This translation process is nuanced and intricate, involving the mapping of linguistic elements to corresponding software functions and parameters. It is during this phase that the system demonstrates its adeptness in bridging the gap between human communication and machine execution, ensuring that the user's intent is accurately represented in the software domain.

Once the translation is successfully accomplished, the system proceeds to execute the delineated software actions. This step is marked by the activation of the appropriate software modules, scripts, or applications, effectively carrying out the tasks as per the translated instructions. The execution is monitored closely, and any deviations or anomalies are logged for further analysis, ensuring that the actions align with the user's original directive.

Post-execution, the system is committed to communicating the outcome of the actions back to the user. This communication is comprehensive, detailing not only the success or failure of the tasks but also providing insights into any challenges encountered and the steps taken during execution. The feedback mechanism is designed to be transparent and informative, fostering user awareness and understanding of the system's operations.

In essence, FIG. 5 is a vivid portrayal of the system's core functionality, demonstrating how it seamlessly integrates natural language processing, translation, execution, and communication to perform a diverse array of IT-related actions. This figure emphasizes the system's versatility and adaptability, highlighting its capability to transcend the boundaries of cybersecurity and offer solutions across a spectrum of IT domains.

Figure 6:
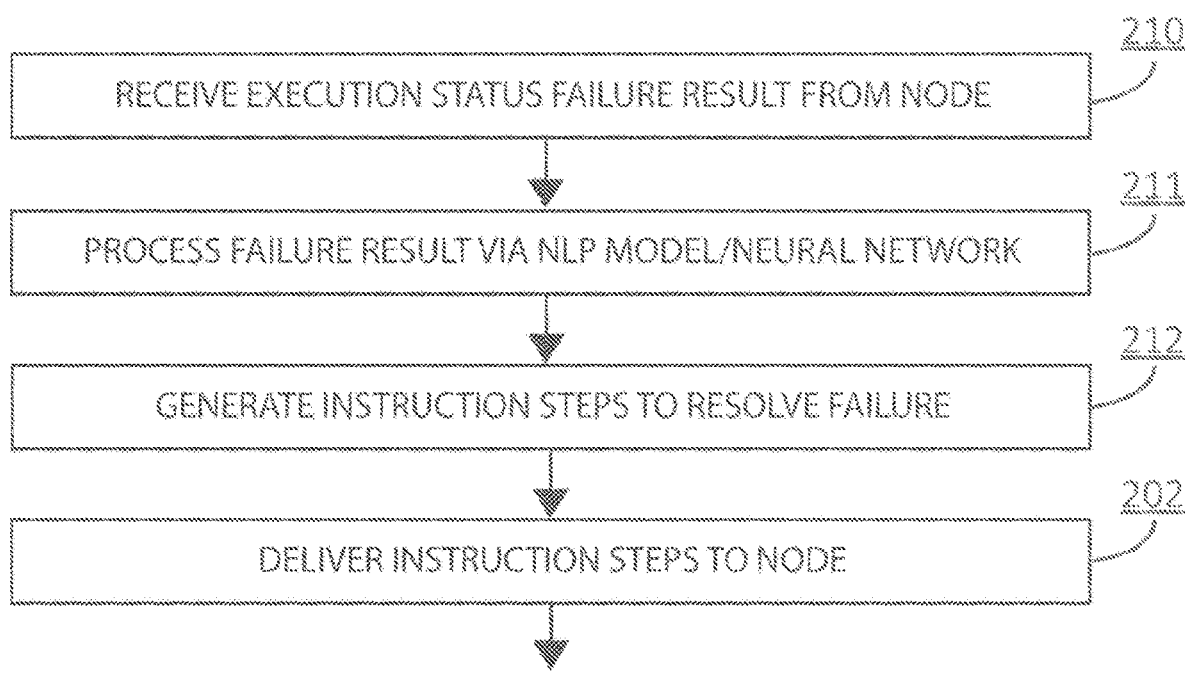
FIG. 6 shows an example process flow for activities related to natural language processing models or neural networks communicating with one another.

FIG. 6 shows an exemplary process flow for which the system 100 performs troubleshooting techniques when software actions don't execute properly. First, the system 100 receives an execution status failure result from a node 210, wherein the result includes command operation and output details. Next, the system 100 processes the failure result via NLP model/neural network 211, wherein the NLP model/ neural network is the receiver NLP 110. After that, the receiver NLP 110 generates instruction steps to resolve the failure 212. Finally, the data input/output service 120 delivers the instruction steps to the node 202. This back and forth process would continue until the task was completed successfully.

FIG. 6 delineates a structured process flow, underscoring the automation of a system designed to facilitate communication between AI models for troubleshooting failures in tasks, distinguishing itself by its applicability to general tasks, notably administrative, as opposed to being restricted to cyber operations. This illustration provides a comprehensive depiction of how iterative cycles of AI-driven analysis and instruction execution converge to resolve task failures effectively.

The process is initiated when the first block receives notification of a failure in the execution status of an automated action. This notification serves as a catalyst, prompting the system to undertake immediate troubleshooting measures. The nature of the failure, be it related to system glitches, execution errors, or other anomalies, is meticulously analyzed by the AI model. The AI employs advanced analytical algorithms to diagnose the root cause of the failure, evaluating multiple facets of the task execution to identify discrepancies and potential solutions.

Subsequent to the AI's in-depth analysis, a set of tailored instructions is generated to address and rectify the identified failure. These instructions are meticulously crafted, leveraging the insights derived from the AI's analysis, to ensure a targeted approach to resolving the specific issues at hand. The formulated instructions are then dispatched to the respective node for immediate execution, marking a critical step towards mitigating the failure.

Unique to this process flow is the iterative nature of the troubleshooting cycle. If the initial set of instructions does not lead to the resolution of the failure, the system is designed to reinitiate the cycle, undergoing further AI analysis and instruction generation until a successful resolution is achieved. This iterative approach underscores the system's commitment to achieving task success and ensuring the continuity of operations, irrespective of the nature of the tasks involved.

FIG. 6 distinguishes itself by its broad applicability to a variety of tasks beyond the realm of cybersecurity. While similar figures may depict troubleshooting processes specific to cyber operations, FIG. 6 emphasizes its versatility in addressing failures in general tasks, including administrative functions, thereby expanding its utility across diverse operational domains.

In conclusion, FIG. 6 offers a detailed depiction of a versatile and iterative automated troubleshooting system, utilizing AI models' communicative abilities to analyze and rectify task failures, with a distinctive focus on general, non-cyber-specific tasks, showcasing its wide-ranging applicability in various operational spheres.

In some embodiments, the cyber security and IT system 100 is capable of generating or auditing STIGs, SRGs, system security plans, POA&Ms, software lists, ports, protocols, and service matrix, STIG applicability matrix, security controls & traceability matrix, and many other cyber security and IT compliance reports, documentation, or scans.

In some embodiments, the cyber security and IT system 100 can automatically generate mitigation statements for vulnerabilities derived from compliance scans. The mitigation statements would be held within a POA&M and listed as an accepted risk. The mitigation statement would be derived from compliance report analysis. System protections would be identified and cross-referenced against vulnerability details such as fix text or resolutions. This data could be included within the mitigation statement.

In some embodiments, the cyber security and IT system 100 can analyze system documents and artifacts including a ports, protocols, and services matrix, data flows, and software lists to determine which software applications, packages, and libraries are unneeded. This functionality will allow administrators and developers to remove unneeded applications, packages, and libraries to further harden their systems to reduce the attack surface of said systems.

Figure 7:
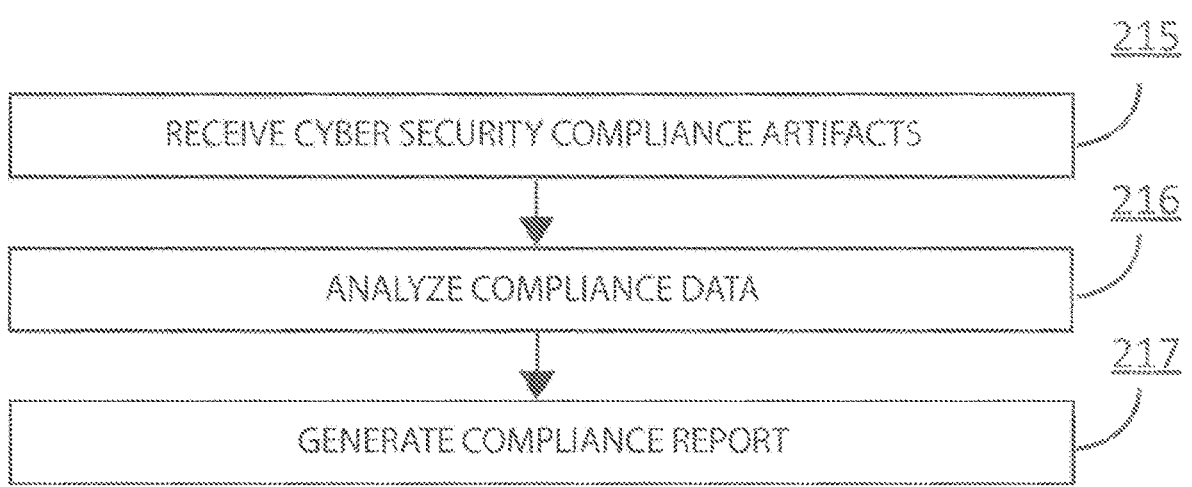
FIG. 7 shows an example high-level process flow for activities related to automating cyber security reporting actions.

FIG. 7 shows an example process flow demonstrating a method to automatically generate a cyber security and/or IT compliance report. First, the cyber security and IT system 100 receives cyber security or IT compliance artifacts 215, wherein the cyber security or IT compliance artifacts could include scan results, cyber security or IT policies, cyber security or IT documentation, or other cyber security or IT artifacts. Next, either the compliance NLP 193 or compliance AI 180 analyzes the cyber security or IT compliance data 216 for compliance and non-compliance. After that, either the compliance NLP 193 or compliance AI 180 generates a compliance report 217 that details compliance data derived from the analysis of the cyber security or IT artifacts.

FIG. 7 illustrates a systematic process flow focused on the automation of cyber reporting operations, highlighting the integration of varied cyber artifacts and the pivotal role of Artificial Intelligence (AI) in generating insightful cyber reports. This figure outlines a strategic approach to consolidating diverse data types to formulate comprehensive reports, thereby enhancing the understanding and management of cybersecurity landscapes.

The process is initiated with the first block, which is tasked with receiving a multitude of cyber artifacts. These artifacts can span a wide range of categories, including but not limited to, scan data revealing system vulnerabilities, previously generated cyber report data offering historical perspectives, system diagrams detailing architectural configurations, and CONOPs (Concepts of Operations) outlining operational strategies and methodologies. The collection of such diverse artifacts serves as the foundational base, enabling a multifaceted analysis of the cybersecurity environment.

Following the accumulation of cyber artifacts, the system leverages the capabilities of an advanced AI model to perform a thorough analysis of the gathered data. The AI model, equipped with sophisticated analytical tools, scrutinizes the diverse artifacts to identify patterns, correlations, anomalies, and potential areas of concern. This analysis is pivotal in extracting meaningful insights from the amassed data, ensuring that the resultant cyber report is both accurate and informative.

Culminating the depicted process, a detailed cyber report is automatically generated based on the AI's analysis of the cyber artifacts. This report encapsulates a wealth of information and insights gleaned from the diverse data sources, providing a comprehensive overview of the cybersecurity status, potential vulnerabilities, and recommended mitigative strategies. The generated report serves as a valuable resource for cybersecurity professionals and stakeholders, aiding in informed decision-making and proactive cyber defense strategies.

In summary, FIG. 7 presents a coherent process flow for automating cyber reporting operations, from the initial receipt of varied cyber artifacts through meticulous AI-driven analysis to the generation of an informative cyber report, thereby contributing to enhanced cybersecurity awareness and management.

In some embodiments, the cyber security and IT system 100 is capable of generating or auditing STIGs, SRGs, system security plans, POA&Ms, software lists, ports, protocols, and service matrix, STIG applicability matrix, security controls & traceability matrix, and many other cyber security or IT compliance reports, documentation, or scans.

In some embodiments, the cyber security and IT system 100 can automatically generate mitigation statements for vulnerabilities derived from compliance scans. The mitigation statements would be held within a POA&M and listed as an accepted risk. The mitigation statement would be derived from compliance report analysis. System protections would be identified and cross-referenced against vulnerability details such as fix text or resolutions. This data could be included within the mitigation statement.

In some embodiments, the cyber security and IT system 100 can analyze system documents and artifacts including a ports, protocols, and services matrix, data flows, and software lists to determine which software applications, packages, and libraries are unneeded. This functionality will allow administrators and developers to remove unneeded applications, packages, and libraries to further harden their systems to reduce the attack surface of said systems.

Figure 8:
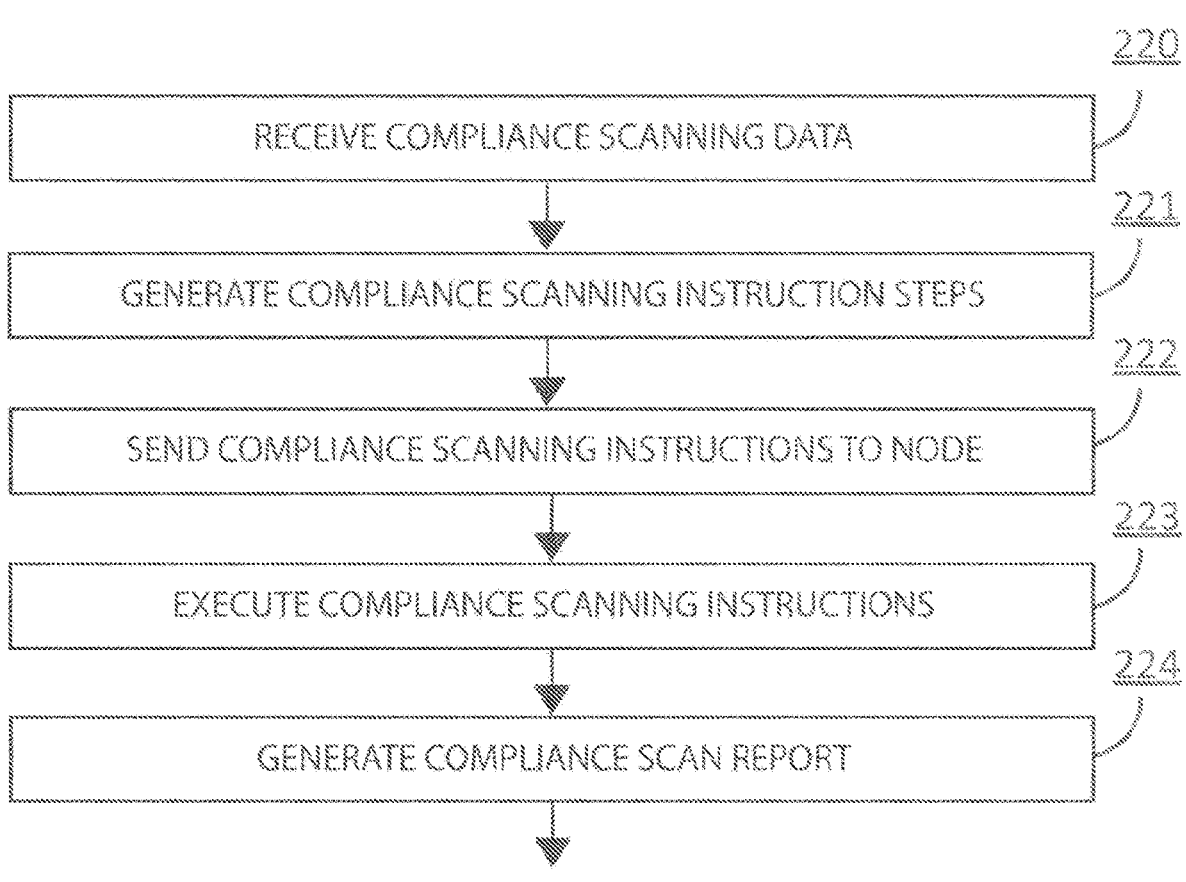
FIG. 8 shows an example high-level process flow for activities related to automating cyber security scanning actions.

FIG. 8 shows an exemplary process flow for which cyber security or IT compliance scanning operations can be automated. First, the system 100 receives compliance scanning data 220. Scanning data could include security technical implementation guides (STIG), security requirements guide, security requirements guide (SRG), checklists, manual, software lists, vulnerability lists, or any other cyber security or IT document or process that contains information about a cyber security or IT vulnerability or compliance configuration. Next, the cyber security and IT system 100 would work collaboratively with the compliance NLP 193 to generate compliance scanning instruction steps 221 based off of the scanning data analyzed by the compliance NLP 193. After that, the system 100 would send the compliance scanning instructions to a node 222 that needs to be scanned for compliance. Then, the compliance AI 180 and the agent/service 170 would work collaboratively to execute the compliance scanning instructions 223 on the node 150. Finally, either the compliance AI 180, compliance NLP 193, or the combination of both, would generate a compliance scan report 224, wherein the compliance report contained information about the node's 150 compliance status.

FIG. 8 delineates a streamlined process flow dedicated to the automation of cyber scanning operations, incorporating a variety of scanning types such as compliance, vulnerability, source code (including static and dynamic code analysis), and Ports, Protocols, and Services (PPS) scanning. This versatile approach ensures a comprehensive scanning scope, catering to diverse cyber security or IT requirements and standards.

The process commences with the initial block receiving scanning data, which is inclusive of targets designated for scanning and the requisite scanning resources. These resources encompass access to scanning applications via API, checklists for compliance assessment, source code for analysis, and other pertinent data, thereby facilitating a thorough and accurate scanning process.

Subsequent to the receipt of scanning data, an advanced Artificial Intelligence (AI) model is employed to process the accumulated data meticulously. The AI model, with its analytical capabilities, synthesizes the information and generates detailed scanning instructions, customized to the specificities of the targets and the nature of the scanning operation. This exemplifies the system's ability to adapt and tailor its operations to varying scanning contexts and requirements.

Following the generation of scanning instructions, these directives are dispatched to the respective node for execution. This stage materializes the scanning operation, applying the instructions to interrogate and assess the designated targets, thereby identifying potential vulnerabilities, compliance deviations, or other areas of concern.

Concluding the depicted process, a comprehensive scan report is generated, encapsulating the findings and results of the scanning operation. This report serves as a pivotal document, providing stakeholders with insights into the security posture of the scanned targets, highlighting vulnerabilities, and offering a basis for subsequent remediation actions.

In essence, FIG. 8 unveils a robust and adaptable process for automating cyber scanning operations, from the initial receipt of scanning data, through the AI-driven generation of scanning instructions, to the execution of the scan and the culmination in a detailed scan report, catering to a wide spectrum of scanning types and cyber security or IT needs.

In some embodiments, the compliance NLP 193 would generate the machine-level code, from the compliance scanning data, for the compliance AI 180 to perform collaboratively with the agent/service 170 on the node A 150. In other embodiments, the compliance NLP 193 gencrates both natural language compliance scanning instruction steps and machine-level code compliance scanning instruction steps. In even more embodiments, the compliance AI 180 generates machine-level code from the natural language compliance scanning instruction steps.

In some embodiments, the compliance NLP 193, compliance AI 180, compliance service 161, and agent/service 170 work collaboratively to automate cyber security or IT compliance scanning operations. In other embodiments, any singular component or variant of components have the capability to automate cyber security or IT compliance scanning operations.

In some embodiments the system 100 is capable of working collaboratively with other cyber security or IT compliance scanning applications or protocols such as Nessus or Security Compliance Application Protocol (SCAP). In other embodiments, the system 100 can run operating system or application commands that will generate the same output that a cyber security or IT application would otherwise generate.

Figure 9:
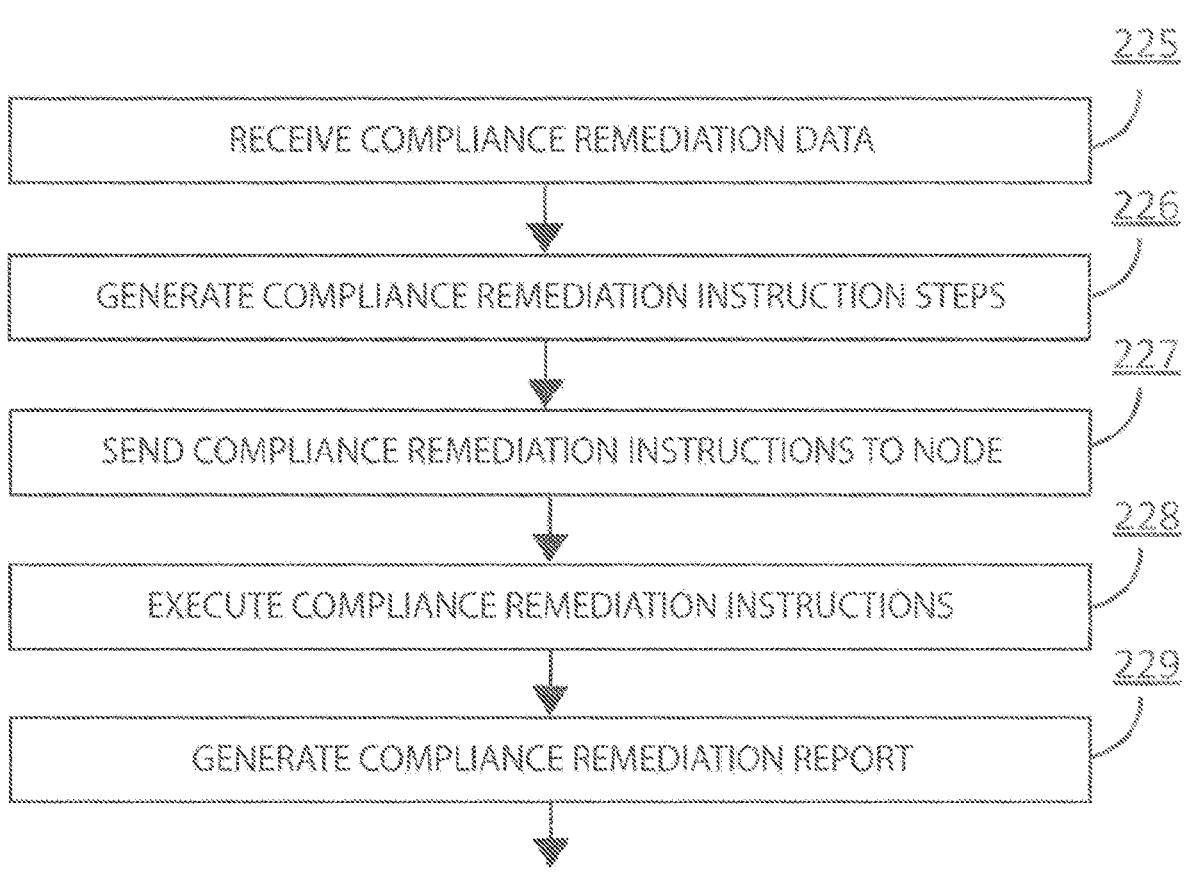
FIG. 9 shows an example high-level process flow for activities related to automating cyber security remediation actions.

FIG. 9 shows an exemplary process flow for which cyber security or IT compliance remediation operations can be automated. First, the system 100 receives compliance remediation data 225. Remediation data could include security technical implementation guides (STIG), specifically the "fix text" data included within a STIG. Remediation data could also be contained within a compliance or vulnerability scan report, security requirements guide (SRG), checklist, manual, vulnerability lists, or any other cyber security or IT document or process that contains information about a cyber security or IT vulnerability or compliance configuration. Next, the system 100 would work collaboratively with the compliance NLP 193 to generate compliance remediation instruction steps 226 based off of the remediation data analyzed by the compliance NLP 193. After that, the cyber security and IT system 100 would send the compliance remediation instructions to a node 227 that needs to be remediated for compliance. Then, the compliance AI 180 and the agent/service 170 would work collaboratively to execute the compliance remediation instructions 228 on the node 150. Finally, either the compliance AI 180, compliance NLP 193, or the combination of both, would generate a compliance remediation report 229, wherein the compliance remediation report contains information about the remediation steps performed on the node 150 and the node's 150 updated compliance status.

FIG. 9 illustrates a sophisticated process flow focused on automating cyber remediation operations, providing a systematic approach to addressing vulnerabilities and reinforcing system security. The initial block in the flow diagram is tasked with receiving remediation data, encompassing aspects such as misconfigurations, flaws in code, or identification of patches needed, serving as the foundation for the subsequent remediation process.

Upon receipt of this critical data, the system engages an advanced AI model to analyze the identified vulnerabilities meticulously. The AI model demonstrates its prowess by generating precise and tailored instructions aimed at addressing the specific issues detected, showcasing the adaptability and accuracy of the automated remediation process.

Following the generation of remediation instructions, these are conveyed promptly to the designated node for execution, exemplifying the system's efficiency and responsiveness. This execution phase is pivotal in actualizing the remediation measures, thereby mitigating the vulnerabilities and enhancing the system's security posture.

Concluding the process, a comprehensive remediation report is generated, providing detailed insights into the remediation activities undertaken and the vulnerabilities addressed. This report serves as a valuable resource for stakeholders, offering transparency and facilitating informed decision-making.

Additionally, FIG. 9 denotes that in certain embodiments, the system may incorporate regression testing post-remediation. This step is designed to verify system functionality post-application of configurations or patches, ensuring that the remediation measures do not inadvertently compromise system operations. Regression testing can be executed in either a testing environment or directly within production, providing flexibility and adaptability to different operational contexts.

In summary, FIG. 9 outlines an intelligent and holistic approach to automating cyber remediation operations, emphasizing the role of AI in analyzing vulnerabilities and generating remediation instructions, the seamless execution of these instructions, the generation of insightful remediation reports, and the potential integration of regression testing to validate system functionality post-remediation.

In some embodiments, the compliance NLP 193 would generate the machine-level code, from the compliance remediation data, for the compliance AI 180 to perform collaboratively with the agent/service 170 on the node A 150. In other embodiments, the compliance NLP 193 generates both natural language compliance remediation instruction steps and machine-level code compliance remediation instruction steps. In even more embodiments, the compliance AI 180 generates machine-level code from the natural language compliance remediation instruction steps.

In some embodiments, the compliance NLP 193, compliance AI 180, compliance service 161, and agent/service 170 work collaboratively to automate cyber security or IT compliance remediation operations. In other embodiments, any singular component or variant of components have the capability to automate cyber security or IT compliance remediation operations.

The system 100 is capable of performing remediation and scanning operations on various computing devices including but not limited to desktops, laptops, servers, virtual machines, switches, routers, firewalls, embedded systems, and various others. The cyber security and IT system 100 is capable of performing remediation and scanning operations on various operating systems including but not limited to Windows®, Linux®, Unix®, Mac OS®, IOS®, Android®, Real-Time OS, Chrome® OS, and many others. The cyber security and IT system 100 is capable of performing remediation and scanning operations on various software applications including databases, application suites, or any other application that has an associated STIG or SRG.

Figure 10:
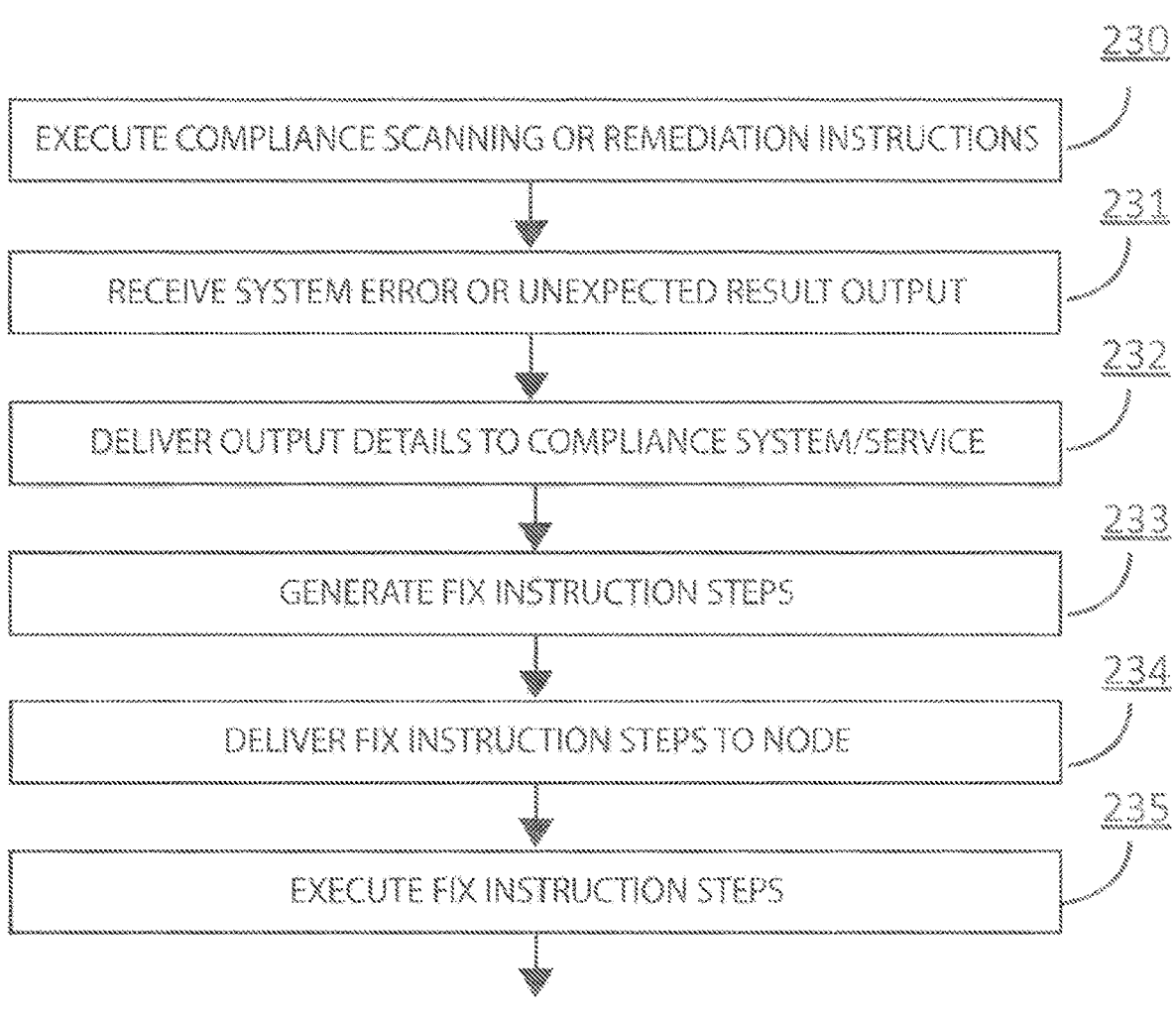
FIG. 10 shows an example high-level process flow for activities related to automating cyber security remediation actions.

FIG. 10 shows an exemplary process flow for which execution troubleshooting of cyber security or IT compliance operations can be automated. In this example, the compliance NLP 193 and the compliance AI 180 communicate continuously by sending and receiving instruction steps and output derived from said instruction steps, until the desired scanning or remediation outcome is achieved. First, the compliance AI 180 and agent/service 170 would execute the compliance scanning or remediation instructions 230 on the node 150. Next, the compliance AI 180 or agent/service 170 receives a system error message or an unexpected result output 231 after executing a scanning or remediation operation. After that, the agent/service 170 or compliance AI 180 would deliver the output details 232 to the system 100. Then, the compliance NLP 193 would generate fix or remediation instruction steps 233 that would possibly solve the system error or unexpected result being output. After that, the compliance service 161 would deliver the fix or remediation instruction steps to the node 234. Finally, the compliance AI 180 and agent/service 170 would execute the fix or remediation instruction steps 235 on the node. This troubleshooting process could continue on until the system error or unexpected result is resolved, or it could halt execution after a certain timeframe, amount of attempts, or user initiated halt is commanded.

FIG. 10 illustrates a detailed process flow focusing on the automation of compliance/vulnerability scanning or remediation instructions through the system. The initial block represents the execution phase, where scanning or remediation instructions are activated. Upon execution, the system is vigilant in monitoring the outcomes, particularly focusing on the reception of any system errors or unexpected output results that may arise.

Should such discrepancies emerge, the system swiftly delivers the output details to an AI model designated for comprehensive analysis. This AI model, endowed with advanced analytical capabilities, scrutinizes the received details and generates instructional steps aimed at rectifying the identified error. This pivotal step underscores the system's adaptability and responsiveness in addressing and mitigating issues in real-time.

Subsequent to the AI model's generation of corrective instructions, these newly formulated steps are dispatched to the affected node for immediate execution. This phase exemplifies the system's efficacy in implementing corrective measures, fostering a conducive environment for error resolution.

Intriguingly, FIG. 10 delineates that this cycle harbors the potential for continuation until the error at hand is thoroughly resolved. This iterative nature of the process ensures persistent efforts in troubleshooting and problem-solving, highlighting the system's relentless pursuit of operational excellence and error-free functionality.

In essence, FIG. 10 encapsulates a robust and adaptive process flow, emphasizing the automation of scanning or remediation instructions, the analytical prowess of the AI model in error resolution, and the iterative approach adopted to ensure the comprehensive rectification of any identified errors.

In some embodiments, the compliance NLP 193 and the compliance AI 180 could communicate with each other without the need of other services such as the compliance service 161.

In some embodiments, the system 100 logs all of the remediation steps and configuration changes made on a system. This data is saved within the compliance store 135 so that an administrator, developer, or the cyber security and IT system 100 can revert any changes made if necessary.

In some embodiments, program instructions exist on the node 150 that direct the agent/service 170 or compliance AI 180 to listen for instructions from the cyber security or IT compliance system 100. Furthermore, the program instructions direct the agent/service 170 or compliance AI 180 to perform the instructions delivered from the cyber security or IT compliance system 100.

In some embodiments, the system 100 is capable of automatically generating or auditing systems engineering or anti-tamper artifacts including but not limited to requirements, data flows, attack trees, or system diagrams. In these example embodiments, the compliance NLP 193 and compliance AI 180 could be trained on a business or institution's private data that included previous artifacts for requirements, data flows, attack trees, ports, protocols, and service matrix, or system diagrams.

Figure 11:
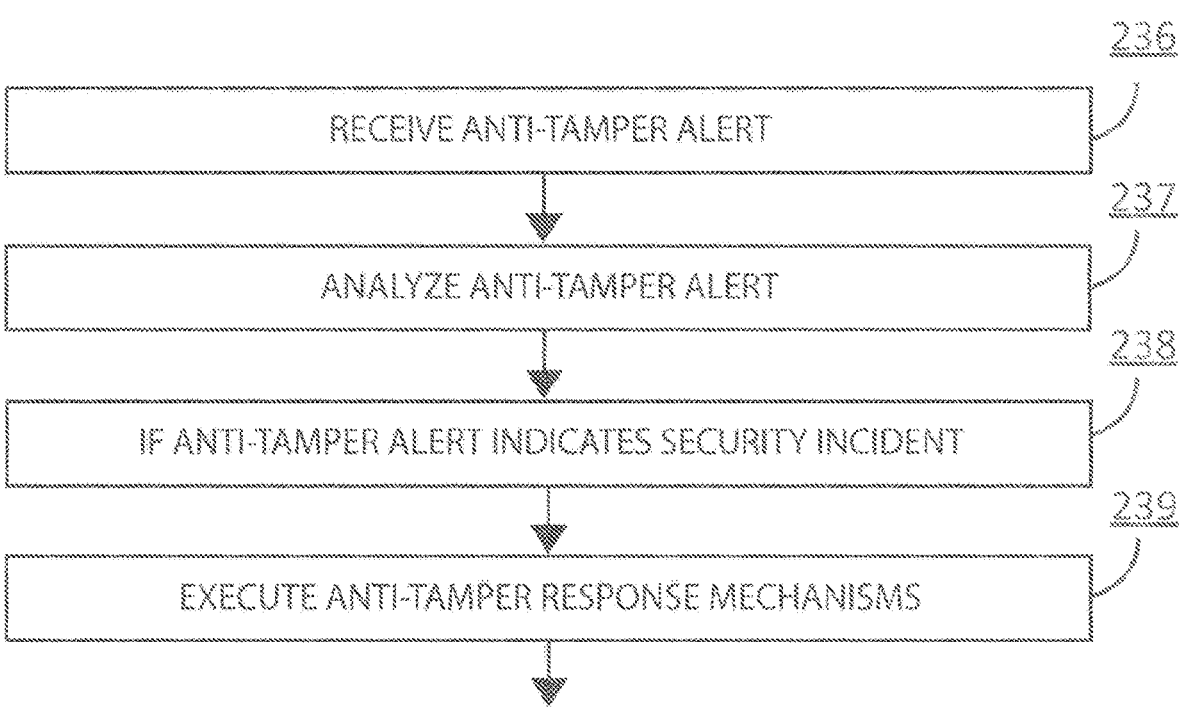
FIG. 11 shows an example high-level process flow for activities related to automating cyber security anti-tamper actions.

Referring to FIG. 11, a diagrammatic representation illustrates a process flow pertaining to anti-tamper automated responses. In the illustrated embodiment, the initial block 236 represents the reception of an Anti-Tamper (AT) alert.

Upon receiving the alert, the system engages an Artificial Intelligence (AI) model as depicted in block 237, which conducts a detailed analysis of the alert to discern the nature and severity of the potential security incident. The AI model utilizes advanced algorithms and learning mechanisms to efficiently identify and categorize the alert, distinguishing genuine threats from false positives. If a security incident is accurately identified by the AI model 238, the process advances to block 239, wherein an AT response mechanism is executed. This mechanism comprises a series of pre-defined actions and adaptive strategies, tailored to mitigate the identified threat effectively and safeguard the system's integrity. The automated responses can include system isolation, encryption of sensitive data, alteration of access controls, and initiation of data removal protocols, ensuring a comprehensive and robust defense against malicious tampering activities. This streamlined and automated process significantly enhances the system's resilience, allowing for rapid and efficient responses to potential security threats, thereby minimizing potential damages and maintaining system security.

Figure 12:
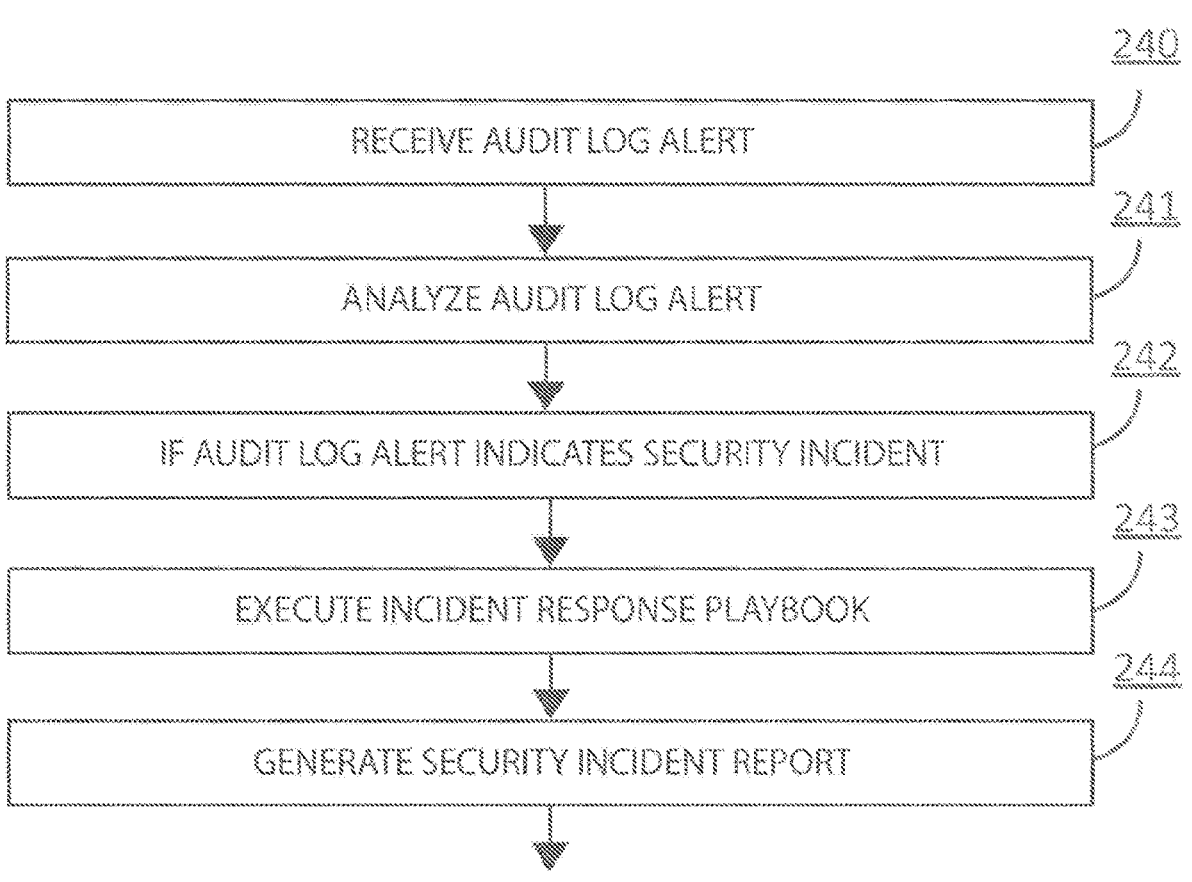
FIG. 12 shows an example high-level process flow for activities related to automating cyber security auditing actions.

In reference to FIG. 12, a schematic representation elucidates a process flow focused on the automation of responses to audit log alerts. The commencement of this process is depicted in block 240, where the system receives an audit log alert. This alert is an immediate signal of potential discrepancies or unusual activities within the system. Following the reception, the alert undergoes a rigorous analysis facilitated by an Artificial Intelligence (AI) model, represented in block 241. This model is equipped with sophisticated algorithms capable of scrutinizing the alert, distinguishing between false alarms and authentic security incidents by comparing the alert patterns against a comprehensive database of known security incidents. Upon the identification of a genuine security incident 242, the process escalates to block 243, where an incident response playbook is promptly executed. This playbook consists of a well-orchestrated sequence of actions and protocols designed to effectively counteract the identified threat and secure the system's vulnerabilities. The execution of these strategies is adaptive, ensuring the mitigation efforts are tailored to the specific nature of the incident. Concluding the process, block 244 illustrates the generation of an incident response report. This comprehensive document details the nature of the incident, the actions undertaken, the outcomes of those actions, and recommendations for future preventive measures. The automated response process delineated in FIG. 12 exemplifies a proactive approach to system security, ensuring swift, effective, and documented responses to audit log alerts, thereby bolstering the overall security posture of the system.

Figure 13:
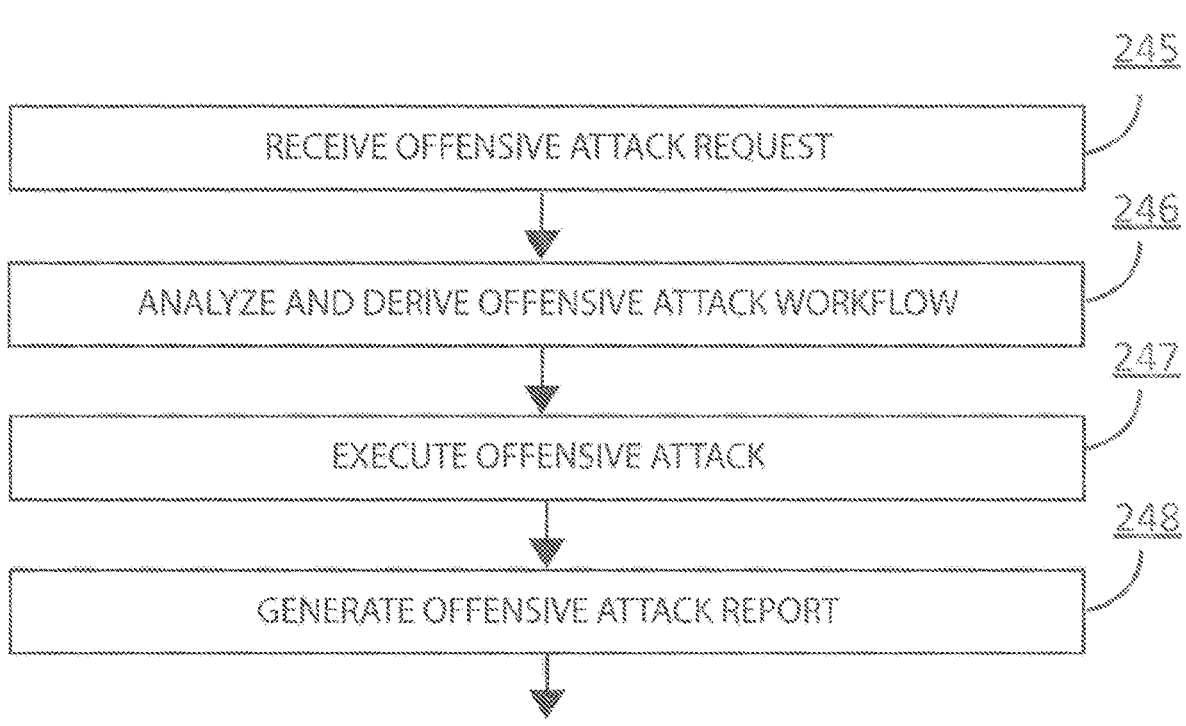
FIG. 13 shows an example high-level process flow for activities related to automating cyber security ethical hacking actions.

In FIG. 13, the detailed illustration maps out a sophisticated process flow concentrating on automating offensive attacks within the boundaries of ethical hacking. The journey commences with block 245, where the system is alerted by receiving an offensive attack request. This initial interaction is vital as it triggers the consequential actions, outlining the perimeters and objectives of the ethical hacking endeavor. Subsequent to the initial request, block 246 depicts the pivotal phase of analyzing the received request. The system 100 delves into the intricacies of the request, meticulously identifying the appropriate actions, applications, and scripts that are best suited to facilitate the desired attack. This selection process is informed by the nature and specifics of the request, ensuring the assembled arsenal is aptly aligned with the goals of the ethical hacking attack.

Progressing to block 247, the system 100, armed with the identified tools and strategies, initiates the execution of the attack. This stage is marked by the harmonious collaboration of the chosen applications and scripts, each playing a vital role in navigating the digital terrain, probing for vulnerabilities, and simulating offensive actions in a controlled and ethical manner. The culmination of this process is represented in block 248, where an exhaustive attack report is generated. This document is a compilation of detailed insights, encapsulating every aspect of the attack—from the strategies employed, the vulnerabilities uncovered, to the potential ramifications and proposed countermeasures. FIG. 13, in its entirety, provides a panoramic view of an automated, ethical hacking offensive attack, underlining the systematic approach, the tactical execution, and the insightful documentation that collectively contribute to enhancing the resilience and security of the system under scrutiny.

Figure 14:
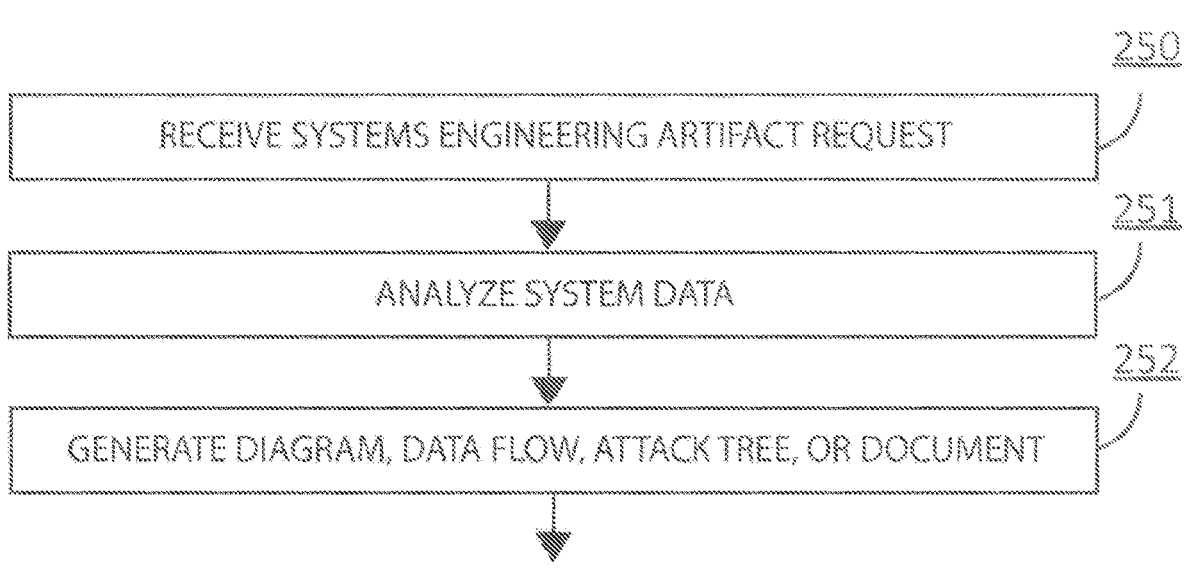
FIG. 14 shows an example high-level process flow for activities related to automating systems engineering actions.

In FIG. 14, a comprehensive process flow is delineated, illuminating the automation of tasks within the realm of systems engineering. The procedure is initiated at block 250, where the system is greeted with a systems engineering request. This request serves as the catalyst, sparking the sequence of actions that will unfold. Subsequent to receiving the request, the system transitions to block 251, where a thorough analysis of the request takes place. This involves a meticulous examination of the specifications and requirements detailed in the request to discern the requisite actions, applications, and scripts that are instrumental for its execution.

Following the analysis, the system advances to block 252, embarking on the generation of a diagram or document. This is a pivotal phase where the conceptualization of the request materializes into a tangible form. Depending on the nature and specifics of the initial request, the resulting diagram can embody various forms, such as a system architecture, a data flow diagram, an attack tree, or other pertinent systems engineering documents. The versatility showcased at this stage underlines the adaptability of the system to cater to a diverse array of systems engineering needs.

In essence, FIG. 14 lays out a systematic, automated approach to systems engineering tasks. It elucidates the seamless transition from receiving a request to the analytical phase, leading to the generation of a variety of informative diagrams, thereby enhancing the efficiency and efficacy of systems engineering endeavors.

Figure 15:
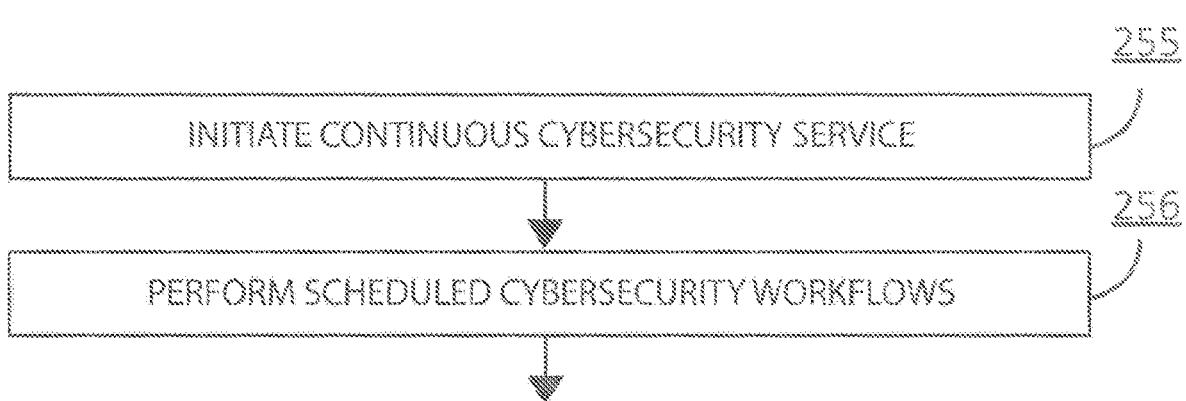
FIG. 15 shows an example high-level process flow for activities related to fully automating cyber security actions.

In FIG. 15, the depiction outlines an advanced process flow that epitomizes the pinnacle of automation in cyber security or IT operations. The journey commences when the system service is initiated 255. This phase acts as the heartbeat of the system, ensuring a perpetual and uninterrupted operation, continuously running and vigilantly poised to spring into action.

Upon the initiation of the system service 255, the flow progresses to the second block, 256, which unveils the multifaceted nature of the automated cyber security or IT system 100. Herein, an ensemble of cyber security or IT workflows is performed with adept precision and meticulous attention to detail. The gamut of workflows includes, but is not confined to, scanning, remediation, continuous monitoring, and process analysis, exemplifying the system's 100 versatility and comprehensive capabilities.

This dynamic spectrum of workflows ensures that every facet of cyber security or IT is addressed and fortified, embodying a holistic approach to safeguarding digital assets. The ability of the system 100 to receive and seamlessly execute scheduled tasks further accentuates its autonomous nature, epitomizing a self-sustained model of operation.

In summary, FIG. 15 elegantly encapsulates the essence of a fully automated cyber security or IT system 100, illustrating the continuous initiation of services and the adept execution of a diverse range of cyber security or IT workflows. This representation underscores the system's 100 proficiency in fostering a secure digital environment through automation, showcasing its capacity to adeptly handle a myriad of tasks and challenges in the ever-evolving landscape of cyber security or IT.

Figure 16:
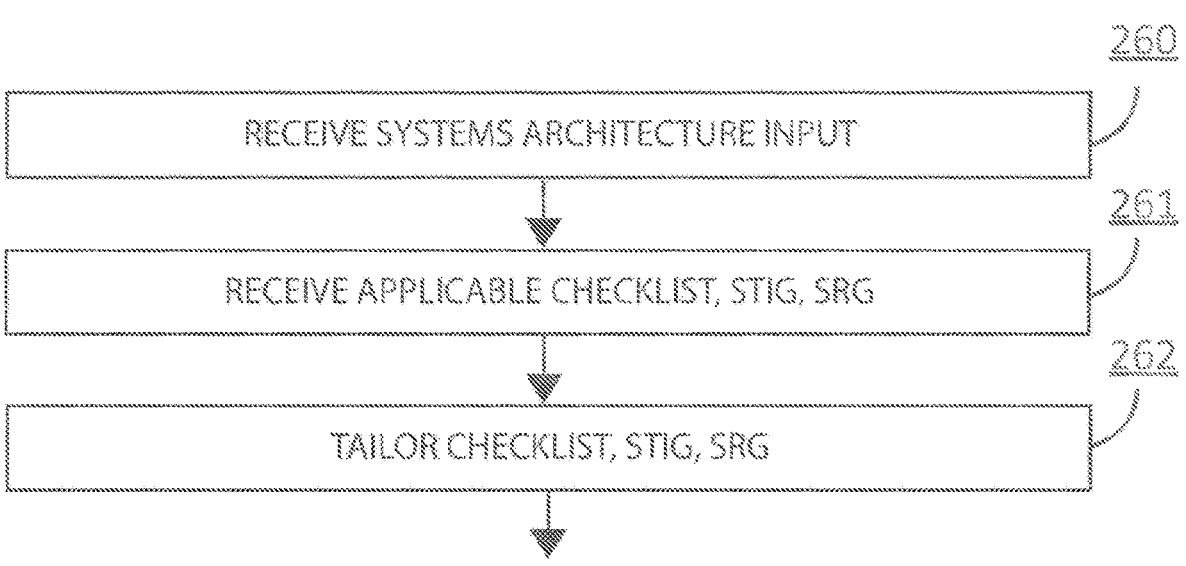
FIG. 16 shows an example high-level process flow for activities related to automating cyber security checklist tailoring actions.

In FIG. 16, we are introduced to a sophisticated process flow that is dedicated to the customization of a cyber security or IT checklist, STIG (Security Technical Implementation Guide), or SRG (Security Requirements Guide) tailored specifically to a system that is set to undergo an audit by an engineer. This illustration begins with the pivotal activity of receiving system architecture input 260 as an input.

Following the reception of the system architecture input 260, the flow advances to the responsibility of acquiring an applicable cyber security or IT checklist, STIG, or SRG 261. This phase is vital, ensuring that the relevant security guidelines and requirements are identified, aligning with the specific architecture and characteristics previously provided by the user.

Upon acquiring the pertinent checklist, STIG, or SRG, the process culminates at the concluding stage, wherein the system 100 meticulously tailors a customized checklist, STIG, or SRG 262. This tailored document is generated with precision, ensuring it is perfectly suited for the user to employ in auditing the specific system. The customization takes into account the unique attributes of the system 100, ensuring that the final output is not only comprehensive but also highly relevant and effective in facilitating a thorough and accurate audit.

In essence, FIG. 16 eloquently illustrates a user-centric and detail-oriented process aimed at delivering a customized cyber security or IT auditing tool. The flow from receiving intricate system architecture details, through acquiring relevant guidelines, to the generation of a tailored checklist, STIG, or SRG, exemplifies a meticulous approach to enhancing the efficiency and accuracy of system audits conducted by engineers.

FIG. 17A shows an example Compliance Data Store 130 housing exemplary data to support a system for automating cyber security and IT software actions. The Compliance Data Store 130 table serves as a repository for a plethora of compliance data essential in maintaining robust cyber security or IT protocols. This table is meticulously structured, featuring columns [902, 903, 904] designed for distinct data types to ensure the orderly storage and management of information. Each row 901 of the table represents a unique record, embodying diverse compliance data artifacts such as STIG (.ckl) PPS scans, .Nessus files, Reports (POA&M, SSP, SC™), Log data, remediation fixes, and CVEs, each housed within its respective cell under the appropriate column.

A notable Field 902 within this table is the CompID or Compliance Identification, which acts as a primary key, assigning a unique identifier to every record. This feature facilitates the efficient retrieval and manipulation of data, allowing the system to pinpoint and interact with specific compliance artifacts seamlessly. Other Fields 902 such as ScanType and ScanResults hold valuable information regarding the type of scans conducted and their outcomes, thereby enabling the system to assess the security posture of the network effectively.

Interaction between the system 100 and this table is intricate yet seamless. The system 100 is designed to query this table dynamically, extracting pertinent information as and when needed. For instance, the system can pull data from the Compliance Data Store 130 table to assess the compliance status of different nodes, identify vulnerabilities, and recommend remediation strategies.

FIG. 17B shows an example AI action data store 135 housing exemplary data to support a system for automating cyber security and/or IT software actions. The AI Action Store 135 table is meticulously structured to accommodate diverse AI actions and related data points. It features columns such as Action ID 905, Access 906, Scripts 907, Code 908, Models 909, and Actions 910, each designed to store specific types of data. Every row 911 of this table represents a unique AI action, identified by a distinct Action ID 905, acting as the primary key for each record.

The Access 906 column stores tokens or keys that grant access to different application APIs, facilitating interaction between the system and various applications. The Scripts 907 column is dedicated to storing different scripts that can be executed for automating tasks or triggering specific actions, while the Code 908 column holds links or references to repositories containing the source code of applications or scripts.

Another vital column, Models 909, is designated for storing AI models and neural networks that are utilized by the system 100 for processing and analyzing data. The Actions 910 column is used to record different IT or cyber security actions that can be enacted by the system 100, such as blocking IPs or encrypting data.

The system's 100 interaction with this table is dynamic and multifaceted. It can retrieve application API access tokens to interact with different applications, execute scripts for automation, access source code for modification or analysis, utilize AI models and neural networks for data processing, and enact IT cyber actions for enhancing security as needed. The comprehensive and organized structure of the AI Action Store 135 table enables the system 100 to efficiently access and utilize a vast array of AI actions, thereby enhancing its versatility and capability.

Concurrently, the system 100 interacts with the system nodes to gain insights into the vulnerability landscape of the network. It retrieves data on the vulnerability count for each node, enabling the system to allocate resources judiciously and enact security measures effectively, thus fortifying the network's security framework.

The synergy between the system 100 and these tables is pivotal in automating responses to emerging threats, ensuring real-time threat detection and resolution, and facilitating a dynamic and robust cyber security or IT environment. The structured organization and detailed categorization of data within these tables empower the system 100 to make informed decisions, adapt to evolving threats, and uphold the integrity and security of the network.

FIG. 18 shows an example user interface 400 for which a user-operator can interact with the system 100. In other examples, different user interfaces can exist and either more or less functionality can also exist. In this example, the user interface 400 is accessed via a web browser application. The screen currently shows an existing software action in which the user-operator is viewing. Within the instruction status panel 410, the user-operator can view data in reference to users, instruction set, and status 420 of the instruction. The user-operator can also view data in reference to the node(s) and NLP module(s) in which the software actions were performed on 430. The user interface 400 provides functionality for a user-operator to generate a new software action request 450, cancel an existing software action request 460, undo an existing software action 470, and finalize or complete an existing software action 480.

Figure 19:
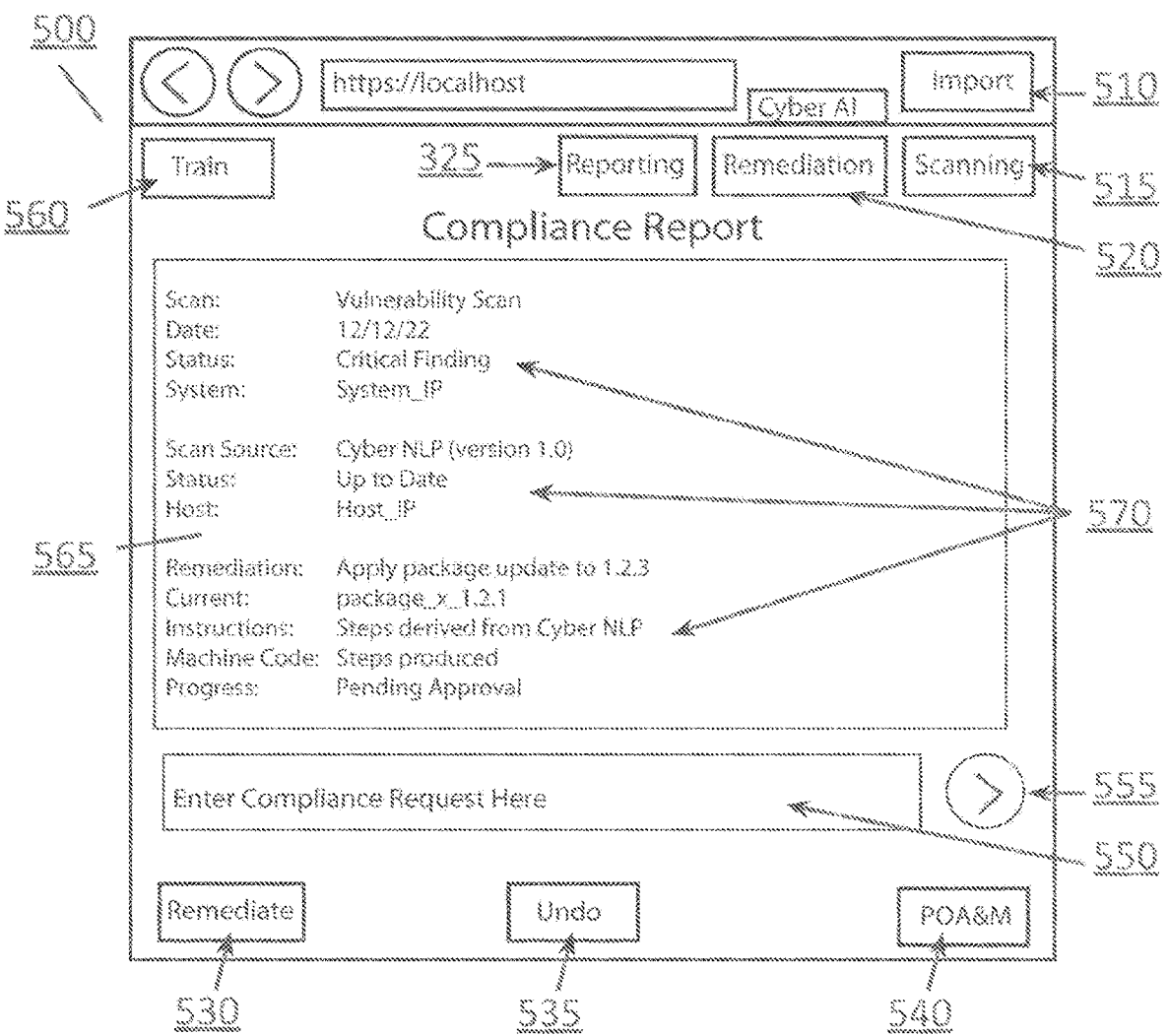
FIG. 19 shows an example user interface that can initiate automated cyber security software actions.

In FIG. 19, a user interface (UI) 500 is vividly illustrated, showcasing system access through a web browser or web application, focusing on a user's interaction with a cyber security or IT compliance report. This interface 500 presents a robust main menu, from which the user can navigate through various cyber security or IT functionalities. The user has the ability to retrain or import new AI models 560, enhance the system's capabilities by importing cyber artifacts 510, and seamlessly navigate to sections dedicated to cyber reporting 325, cyber remediation 520, and cyber scanning 515.

A distinct feature of this interface 500 is a prompt 550 where users can enter cyber requests, facilitating direct communication for the system 100 to execute specific commands or actions. This feature underscores the system's 100 responsiveness and adaptability to user-generated requests, enhancing the overall user experience.

The central focal point of FIG. 19 is the detailed compliance report pane 565, providing an in-depth view into cyber security or IT scanning results and corresponding remediation recommendations 570. This pane serves as a comprehensive dashboard, offering insightful details and actionable intelligence for the user to assess the cyber security or IT posture effectively.

Furthermore, the interface 500 is equipped with interactive buttons, empowering the user to initiate remediation actions directly 530. This direct engagement feature enhances the system's 100 efficiency, allowing immediate response to identified vulnerabilities. In instances where a remediation action is deemed unnecessary or incorrect, the user has the flexibility to undo 535 such actions, ensuring the integrity and accuracy of the remediation process.

Additionally, for vulnerabilities that require further attention or documentation, the user interface 500 provides an option to forward the specific vulnerability details to a Plan of Actions & Milestones (POA&M) report 540. This feature facilitates streamlined documentation and management of vulnerabilities, enabling users to prioritize and address cyber security or IT risks effectively.

FIG. 19 shows an example user interface 500 for which a user-operator can interact with the system 100. In other examples, different user interfaces can exist and either more or less functionality can also exist. In this example, the user interface 500 is accessed via a web browser application. The screen currently shows an example cyber security compliance report in which the user-operator is viewing. Within the compliance data pane 565, the user-operator can view data 570 in reference to an imported or saved cyber security compliance report, including a remediation, vulnerability scan, or compliance scan report. The user-operator could also view any imported cyber security compliance artifact. In the upper portion of the user interface 500, there is provided functionality for a user-operator to import compliance artifacts 510, execute a scanning operation 515, execute a remediation operation 520, execute a reporting operation 525, and train NLP/AI models or neural network 560, wherein the training includes importing additional compliance artifacts for the NLP/AI models or neural network to analyze. In the bottom portion of the user interface 500, there is provided functionality for a user-operator to directly interact with data that is currently loaded within the user interface 500. In this example, the data currently loaded is a vulnerability scan including remediation fixes to said vulnerability. The user-operator can direct the processing system 100 to remediate 530, undo the remediation 535 if the remediation has already been applied, or save this vulnerability to a plan of action & milestones report (POA&M), wherein the POA&M contains vulnerabilities that have yet to be remediated.

The example in FIG. 19 further shows the capability for a user-operator to interface with the system 100 via prompt 550. The prompt 550 would allow a user-operator to enter natural language instructions in relation to cyber security compliance operations. Examples of valid prompts that could be entered within the command prompt 550 include "Perform vulnerability scan on node 20", "Execute software patch remediation on node 20", or "Generate compliance report on node 20". In this example node 20 is one of many nodes within a system that the user-operator is maintaining a hardened security posture on. These command prompt 550 examples could be rephrased in many ways as long as they included the core functions of the cyber security compliance operations mentioned herein. After the user-operator entered a prompt, they could execute the command through an interactive button 555. This button would initiate the process of analyzing the prompt through either the compliance NLP 193 or the compliance AI 180.

In some embodiments, the system 100 has the capability to automate log, network, and local host traffic analysis in real time to identify malicious activity. In these embodiments, the system 100 could work collaboratively with a log analysis tool such as Splunk, a network analysis tool such as SolarWinds, or a host based application such as ESS/HBSS. The data from these tools could be fed into the cyber security and IT system 100 for automated analysis. This capability could aid in instruction detection and prevention, data loss prevention, and denial-of-service prevention.

In some embodiments, the system 100 has the capability to automate ethical hacking processes and techniques. In these embodiments, the system 100 could work collaboratively with ethical hacking applications such as Metasploit perform ethical hacking processes and techniques. The system 100 could also receive instruction steps from documentation or applications and perform said instructions, including troubleshooting processes until an ethical hacking operation was completed.

In conclusion, FIG. 19 depicts a sophisticated and user-friendly interface 500 for system 100 access, integrating diverse functionalities and features that allow for dynamic interaction with cyber security or IT compliance reports, enabling users to manage and respond to cyber security or IT risks efficiently and effectively.

An example of a software action that can be automated with this system includes but is not limited to a system administrator performing a user account password reset. In this example, a system administrator receives an email message from a user who needs their password reset. The system administrator first connects to the system 100 via user interface 190 that is accessible via his personal work computer. Secondly, the administrator inputs into a command prompt "reset the password for user X and deliver an email notification once completed", wherein user X is the username of the user who requested their password be reset via email. The System 100 then receives the natural language instruction 111, translates said instruction into an instruction set, via receiver NLP 110, that is applicable with the software in which the administrator is utilizing, delivers the instruction set to a domain controller node that hosts a domain user application such as Active Directory, a performer NLP 170 module, and an agent, user, or service 180. The performer NLP 170 module translates the instruction steps into machine level instructions 113 and performs the password reset with access to Active Directory via the agent, user, or service 180. After that, the agent, user, or service 180 receives confirmation that user X's password was reset and delivers the confirmation data to the System 100. Finally, both the administrator and user X receive an email notification that user X's password was reset. It is contemplated and included within the scope of the invention the system 100 may be any type of system as disclosed herein, including the systems shown in FIGS. 1-3.

In some embodiments, the system 100 connects to an online or internal NLP module via network 140. In this example, the NLP module can be an industry standard such as GPT-1, GPT-2, GPT-3, ChatGPT, or any other variant developed by a trusted source such as OpenAI. In this example the NLP module represents at least the receiver NLP 110.

In some example embodiments, the system 100 is fine tuned to execute cyber security tasks including but not limited to scanning, remediation, reporting, and ethical hacking. In this embodiment, the AI model(s) or neural network(s) are trained on at least information technology configurations and rules in regards to cyber security and IT.

In some example embodiments, the system 100 works in conjunction with an operating system. In this example, a prompt can be accessed through the operating system and it allows an end-user to input command requests in which to perform on said operating system. These requests can be specific to the operating system or to applications installed on said operating system. In this example, the AI model or neural network is trained on at least the operating system commands, source code, or functionality. Further training can include applications that are applicable to said operating system.

The process flow for an end-user to perform a task on an operating system with a built in AI prompt can be exemplified by the following steps. First, the end-user would input a natural language command request into the prompt. Next, the AI model or neural network would translate the natural language command request into machine code or system commands. After that, the machine code or system commands would be executed via a service, application, script, system account, agent, or kernel.

In some example embodiments, the prompt is compatible with applications installed on the operating system.

In some example embodiments, the natural language processing model or neural network generates or modifies application or script source code to perform the requested action specified by the end-user via prompt and executes the application or script to perform said instructions. This process can be continuously done with the same or new application or script files. In the case where the same application or script file is being used, the previous source code gets continuously rewritten to accommodate new end-user command requests.

In some example embodiments, the operating system prompt could be accessed via text-to-speech technology. This would allow an end-user to speak into a microphone connected to or embedded with the system to input prompt requests.

Figure 20:
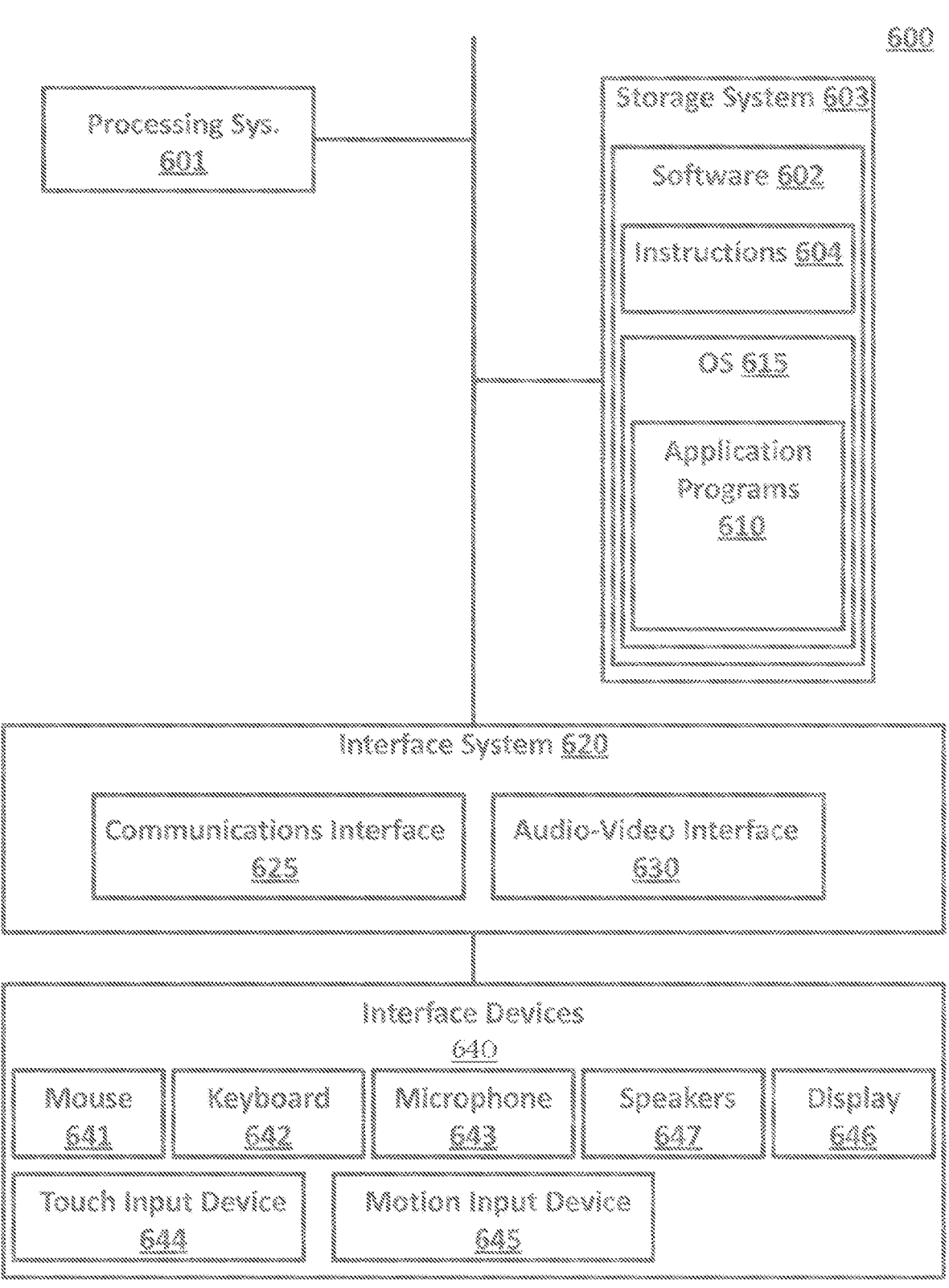
FIG. 20 shows a block diagram illustrating components of a computing device or system used in some embodiments of techniques and systems to support the automation of cyber security and Information Technology software actions.

FIG. 20 shows a block diagram illustrating components of a computing device or system used in some embodiments of techniques and systems for facilitating data analysis and application of classification markings. Any component utilizing a computing system or device herein, or any other device or system herein may be implemented on one or more systems as described with respect to system 600. System 600 can be used to implement myriad computing devices, including but not limited to a personal computer, a tablet computer, a reader, a mobile device, a personal digital assistant, a wearable computer, a smartphone, a laptop computer (notebook or netbook), a gaming device or console, a desktop computer, or a smart television. Accordingly, more or fewer elements described with respect to system 600 may be incorporated to implement a particular computing device.

System 600 can itself include one or more computing systems or devices or be distributed across multiple computing devices or sub-systems that cooperate in executing program instructions. The hardware can be configured according to any suitable computer architecture such as Symmetric Multi-Processing (SMP) architecture or Non-Uniform Memory Access (NUMA) architecture.

The system 600 can include a processing system 601, which may include one or more processors or processing devices such as a central processing unit (CPU), a graphics processing unit (GPU), a tensor processing unit (TPU), a quantum processing unit (QPU), a photonic processing unit (PPU) or microprocessor and other circuitry that retrieves and executes software 602 from storage system 603. Processing system 601 may be implemented within a single processing device but may also be distributed across multiple processing devices or sub-systems that cooperate in executing program instructions.

Examples of processing system 601 include general-purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general-purpose CPU.

Storage system 603 may comprise any computer-readable storage media readable by processing system 601. Storage system 603 may include volatile and nonvolatile, removable and nonremovable media implemented in any method or technology for storage of information, such as computer readable instructions, data structures, program modules, or other data. Examples of storage media include random access memory (RAM), read only memory (ROM), magnetic disks, optical disks, write-once-read-many disks, CDs, DVDs, flash memory, solid state memory, phase change memory, 3D-XPoint memory, or any other suitable storage media. Certain implementations may involve either or both virtual memory and non-virtual memory. In no case do storage media consist of a transitory propagated signal. In addition to storage media, in some implementations, storage system 603 may also include communication media over which software 602 may be communicated internally or externally. Storage system 603 may be implemented as a single storage device but may also be implemented across multiple storage devices or sub-systems co-located or distributed relative to each other. Storage system 603 may include additional elements capable of communicating with processing system 601.

Storage system 603 is capable of storing software 602 including, e.g., program instructions 604. Software 602 may be implemented in program instructions and, among other functions, may, when executed by system 600 in general or processing system 601 in particular, direct system 600 or processing system 601 to operate as described herein. Software 602 may provide program instructions 604 to perform the processes described herein. Software 602 may implement on system 600 components, programs, agents, or layers that implement in machine-readable processing instructions 604 the methods and techniques described herein.

Application programs 610, OS 615 and other software may be loaded into and stored in the storage system 603. Application programs could include AI/ML software such as a neural network, models, or training software. Device operating systems 615 generally control and coordinate the functions of the various components in the computing device, providing an easier way for applications to connect with lower level interfaces like the networking interface. Non-limiting examples of operating systems include Windows® from Microsoft Corp., IOS™ from Apple, Inc., Android® OS from Google, Inc., Windows® RT from Microsoft, and different types of the Linux OS, such as Ubuntu® from Canonical or the Raspberry Pi OS. It should be noted that the OS 615 may be implemented both natively on the computing device and on software virtualization layers running atop the native Device OS. Virtualized OS layers, while not depicted in this Figure, can be thought of as additional, nested groupings within the OS 615 space, each containing an OS, application programs, and APIs.

In general, software 602 may, when loaded into processing system 601 and executed, transform system 600 overall from a general-purpose computing system into a special-purpose computing system customized to facilitate the processes described herein. Indeed, encoding software 602 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage. Software 602 may include software-as-a-service (SaaS) loaded on-demand from a cloud service. Software 602 may also include firmware or some other form of machine-readable processing instructions executable by processing system 601. Software 602 may also include additional processes, programs, or components, such as operating system software and other application software.

System 600 may represent any computing system on which software 602 may be staged and from where software 602 may be distributed, transported, downloaded, or otherwise provided to yet another computing system for deployment and execution, or yet additional distribution. System 600 may also represent other computing systems that may form a necessary or optional part of an operating environment for the disclosed techniques and systems.

An interface system 620 may be included, providing interfaces or connections to other computing systems, devices, or components. Examples include a communications interface 625 and an audio-video interface 630, which may be used to interface with components as described herein. Other types of interface (not shown) may be included, such as power interfaces.

A communications interface 625 provides communication connections and devices that allow for communication between system 600 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here. Transmissions to and from the communications interface may be controlled by the OS 615, which informs applications and APIs of communications events when necessary.

It should be noted that many elements of system 600 may be included in a system-on-a-chip (SoC) device. These elements may include, but are not limited to, the processing system 601, a communications interface 625, audio-video interface 630, interface devices 640, and even elements of the storage system 603 and software 602.

Interface devices 640 may include input devices such as a mouse 641, trackpad, keyboard 642, microphone 643, a touch device 644 for receiving a touch gesture from a user, a motion input device 645 for detecting non-touch gestures and other motions by a user, and other types of input devices and their associated processing elements capable of receiving user input.

The interface devices 640 may also include output devices such as display screens 646, speakers 647, haptic devices for tactile feedback, and other types of output devices. In certain cases, the input and output devices may be combined in a single device, such as a touchscreen display, which both depicts images and receives touch gesture input from the user. Visual output may be depicted on the display 646 in myriad ways, presenting graphical user interface elements, text, images, video, notifications, virtual buttons, virtual keyboards, or any other type of information capable of being depicted in visual form. Other kinds of user interfaces are possible. Interface devices 640 may also include associated user interface software executed by the OS 615 in support of the various user input and output devices. Such software assists the OS in communicating user interface hardware events to application programs 610 using defined mechanisms.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Figure 21:
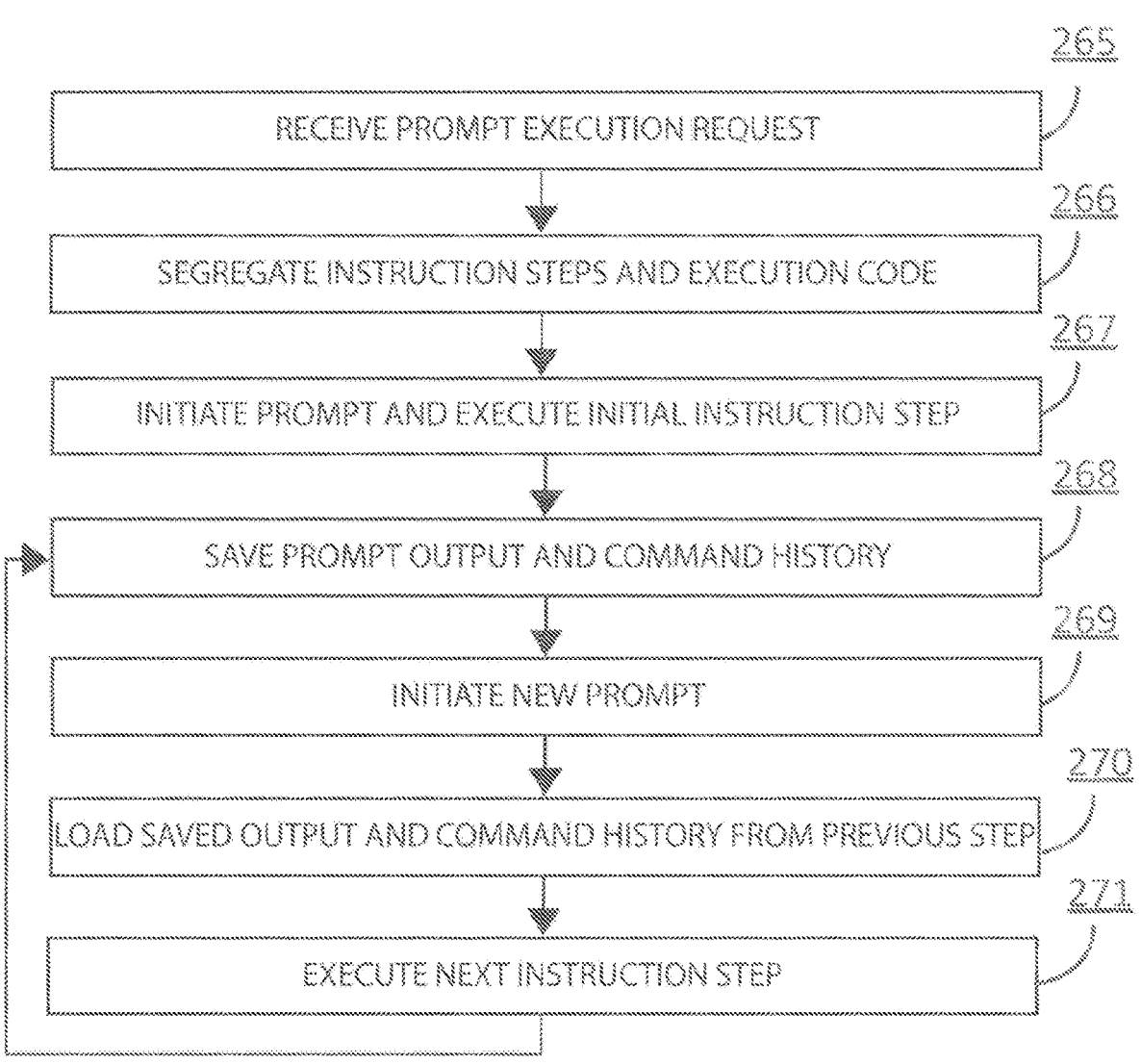
FIG. 21 depicts a process flow for hallucination mitigation in AI models and agents, detailing steps from receiving prompts to executing tasks with periodic refreshes and history tracking to ensure accurate and focused completion.

FIG. 21 illustrates a detailed process flow designed to mitigate the risk of hallucination in AI models and agents, ensuring they remain focused and accurate during task execution. The diagram outlines a series of steps that systematically process and execute prompts while maintaining the integrity and relevance of the actions performed.

The process begins with block 265, Receive prompt execution request, where the system receives an execution request either through an embedded prompt or a chatbot interface. This step facilitates initiating the task processing sequence.

Moving to the second block 266, Segregate instruction steps and execution code, the system dissects the task into individual instruction steps, with each step being assigned specific executable code. This segregation is vital for clarity and precision in task execution.

In block 267, Initiate prompt and execute initial instruction step, the system starts processing the prompt. It translates the natural language input into software actions or executable code and executes the initial step of the instruction sequence.

The fourth block 268, Save prompt output and command history, involves storing the output data from the prompt, along with the history of commands executed and their respective outputs or log data. This storage is critical for maintaining a record of the process flow, facilitating continuity in the subsequent steps.

The flow then progresses to block 269, Initiate new prompt, where the system resets the prompt to prevent prolonged processing that might lead to hallucination or deviation from the task objective.

Block 270, Load saved output and command history from the previous step, involves retrieving the stored data from block 268. This step ensures that the new prompt is aware of the previous context and command history, maintaining a coherent and continuous task execution flow.

The final block in the sequence, 271 Execute next instruction step, is where the system processes the subsequent step in the instruction list, building upon the previous step's completion. This block loops back to block 268, creating a cyclical process that continues until all instruction steps are completed, and the task is finalized.

This looping mechanism, central to FIG. 21, ensures that each step of the task is processed accurately and coherently, with continual refreshes to avoid any potential drift or hallucination in the AI's processing. The methodology outlined in this figure effectively addresses the challenge of maintaining AI agent focus and reliability over complex, multi-step tasks.

Figure 22:
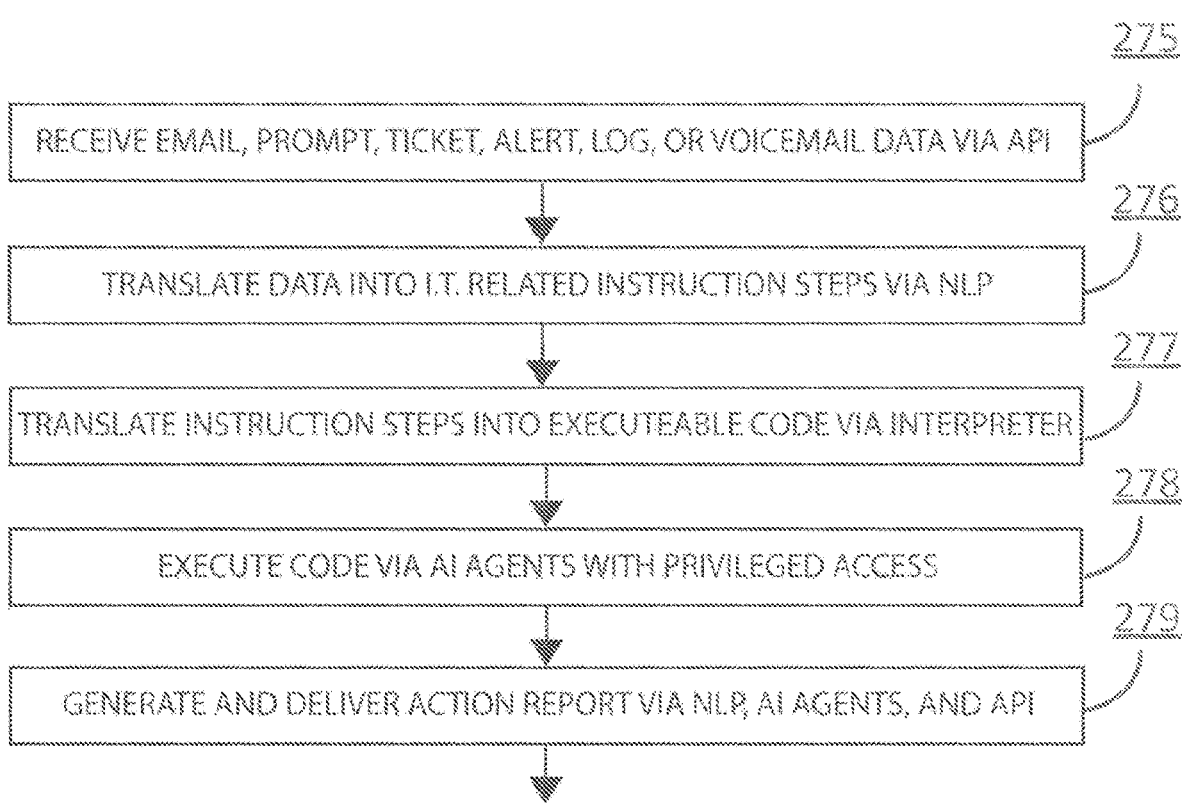
FIG. 22 presents a process flow diagram illustrating the steps from receiving IT-related data via API module, through translating and executing instructions with AI agents, to generating and delivering an action report.

FIG. 22 illustrates a comprehensive process flow for handling and executing IT-related tasks within the system, starting from the initial data reception and culminating in the delivery of an action report. The diagram effectively captures the sequential steps involved in processing various types of IT requests and executing the required actions through a series of interconnected modules.

The first block in the flow chart, Receive email, prompt, ticket, alert, log, or voicemail data via API module 275, represents the initial phase where the system receives input data. This data can be in various forms, such as emails, system prompts, support tickets, security alerts, log files, or voicemails. The API module 275 serves as the entry point for this data, facilitating its collection from diverse sources.

The subsequent block, Translate data into IT-related instruction steps via NLP Module 276, depicts the system's capability to process and interpret the received data. The NLP Module 276 analyzes the content, extracting relevant information and translating it into structured IT-related instructions. This step facilitates understanding the user's requirements or the nature of the issue presented in the input data.

Following this, the process flow moves to Translate instruction steps into executable code via code interpreter

277. This step occurs within the NLP module, where the instruction steps are further refined and converted into a format that can be executed by the system. The code interpreter 277 plays a vital role in this translation, ensuring that the instructions are in a suitable form for subsequent execution.

The fourth block, Execute code via AI agents with privileged access 278, illustrates the execution phase of the process. In this step, AI agents equipped with the necessary privileged access execute the prepared code. This execution can take place either on the local system or on a remote node, depending on the requirements of the task.

The final block, Generate and deliver action report via NLP module, AI Agents, and API 279, marks the completion of the task. This stage involves the generation of a detailed report outlining the actions taken by the system. The NLP module, AI Agents, and API work in tandem to compile this report and deliver it to the appropriate recipients, providing a comprehensive account of the task execution and its outcome.

In summary, FIG. 22 provides a clear and detailed representation of the system's process for handling and executing IT tasks, from the initial data reception to the final report generation, showcasing the integrated and automated capabilities of the system's various modules.

Figure 23:
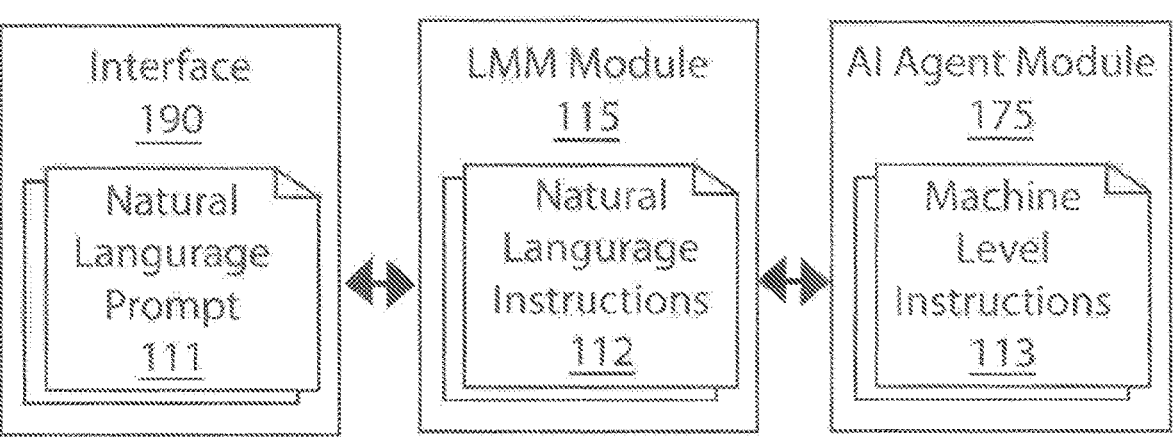
FIG. 23 depicts a high-level data flow diagram showing the process of translating natural language prompts into executable machine-level instructions.

FIG. 23 presents a high-level data flow diagram that illustrates the interaction between different modules of the system to process and execute tasks. The diagram is organized into three primary blocks, representing distinct modules within the system, and showcases the flow of data from one module to another.

The first block in the diagram is labeled Interface 190. This block is the entry point for input data into the system. It contains Natural Language Instruction 111, which represents the user's input in a human-readable, natural language format. This could be a query, a command, or any instruction inputted by the user. The interface is designed to accept these prompts and feed them into the system for processing.

The data from Interface 190 flows bi-directionally to the middle block, which is labeled "LMM Module," representing the Large Multi-Modal Module. This module is a critical component of the system as it processes the natural language prompts received from Interface 190. The LMM Module translates the Natural Language Instruction 111 into Natural Language Steps 112. This translation process involves interpreting the user's input, understanding the context and intent, and converting it into a structured format that is actionable by the system.

The output from the LMM Module, which is now in the form of structured natural language instructions, then flows bi-directionally to the final block in the diagram, labeled AI Agent Module 175. This module is where the actionable instructions are further processed and converted into Machine Level Instructions 113. These machine-level instructions are the executable code that the system will use to perform the task.

The AI Agent Module 175 is versatile and capable of generating various types of machine-level instructions. These can range from high-level code, suitable for software applications, to low-level code that interacts directly with hardware. This flexibility allows the system to handle a wide range of tasks, from simple software functions to complex operations that require hardware-level control.

In summary, FIG. 23 demonstrates a streamlined and efficient process flow, starting from user input in natural language and culminating in the execution of machine-level instructions. The bi-directional arrows between the blocks indicate a dynamic interaction, allowing for feedback and iterative processing to ensure accurate translation and execution of user commands. This design highlights the system's capability to bridge the gap between human input and machine execution, showcasing the sophisticated integration of various modules within the system.

FIG. 24 presents a block diagram of the example components constituting the system described in this invention. The diagram breaks down the system's architecture into its fundamental components, each playing a significant role in the system's overall functionality.

The main block, System/Service 100, encapsulates all the system components, acting as the central unit that governs the operation of the entire system. It integrates various functionalities and processes, ensuring a cohesive and efficient operation.

Within the System/Service 100, the Computer-Readable Storage Media 101 represents a block which could be system memory, such as RAM. This storage media is pivotal as it houses the Program instructions to receive, translate, and execute natural language instructions 182. These instructions are the backbone of the system, enabling it to process user inputs and translate them into actionable tasks.

The Processing System block 103 is another integral component, which could encompass one or several processing units like CPUs, GPUs, or other specialized processors. This block is responsible for computing the NLP model and executing software actions, forming the computational heart of the system.

The Interface System block 104 facilitates connectivity, possibly comprising a network interface such as a NIC or virtual NIC, or any other communications interface that interlinks nodes. This ensures seamless interaction and data exchange across different components of the system.

The API Module 105 serves as the software module that bridges the System/Service with external applications. It includes sub-components like an Email Server/Client 166 for email access, SIEM 107 for managing alerts and logs, and a Ticketing System 109 for accessing tickets that detail requested actions. This module plays a key role in expanding the system's capabilities and integrating it with other platforms and services.

The LMM Module 115, or Large Multi-Modal Model, is a sophisticated block that houses a Code Interpreter 116, capable of translating natural language into executable code. It also contains a Chatbot 117 for user interaction and an Embedded Prompt 118 capability, which allows customization of user prompts to consistently yield desired results.

Lastly, the Compliance Data Store 130 block is a repository that contains various data types critical to the system's operation. This includes Prompt History 131 with records of previous prompts and their outputs, System Information 132 detailing IP Addresses, Operating Systems, Applications/Software installed, and Routing information, Knowledge Files 133 encompassing specialized knowledge aiding in complex tasks, and Source Code/Scripts 134 which contain previously executed, successful scripts or source code for future reuse and modification.

In conclusion, FIG. 24 offers a comprehensive view of the system's architecture, illustrating the interconnected nature of its components and their respective roles in ensuring the system's functionality and efficiency in automating tasks, particularly in the realms of IT and cyber security.

Figure 25:
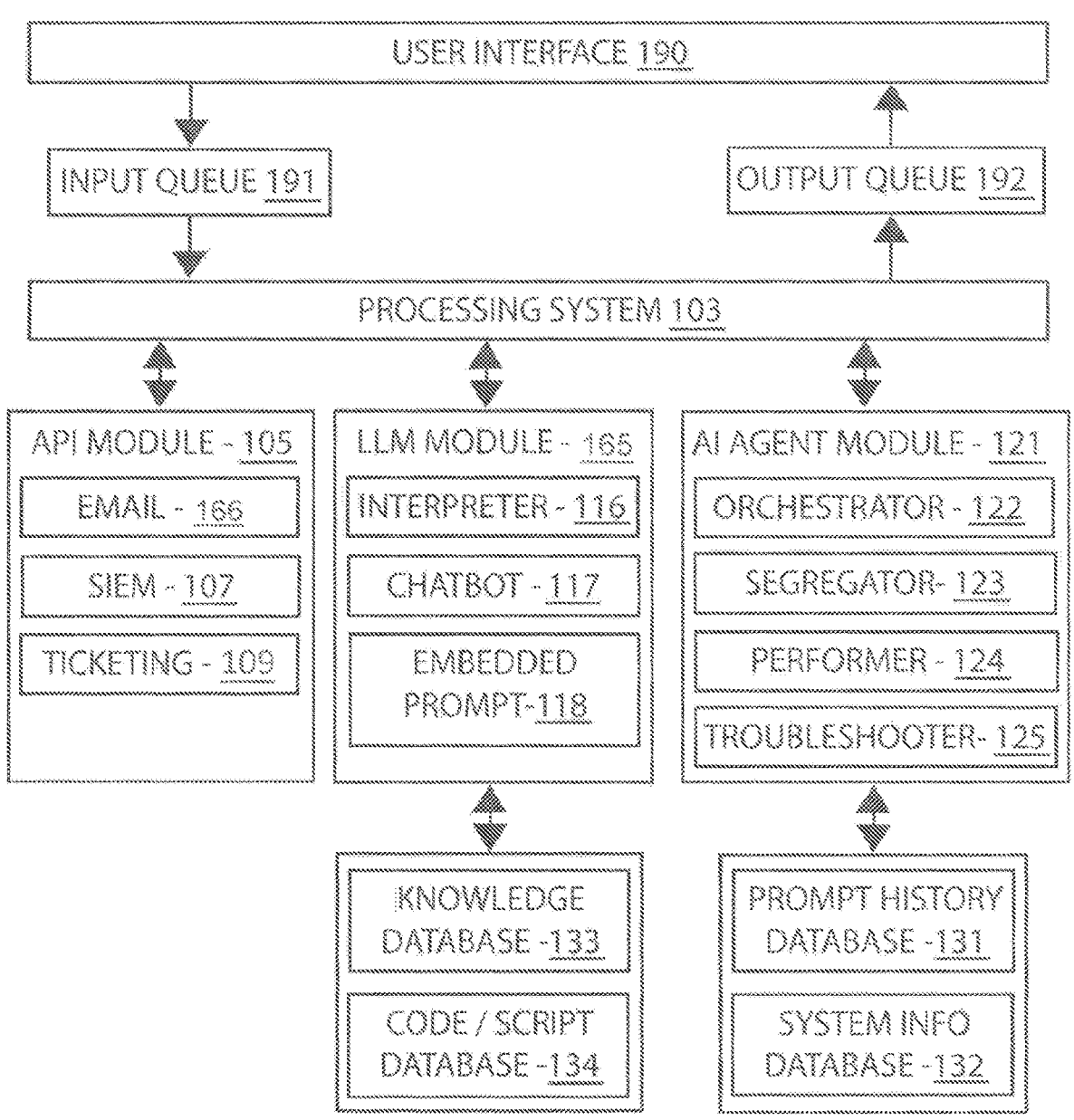
FIG. 25 is a sequence diagram showing example system operational processes.

In FIG. 25, a sequence diagram is presented, providing an illustrative example of the system's operational process. The diagram begins with the User Interface 190, representing the point of interaction where users engage with the system, primarily through chatbot prompting or direct software execution. This user interaction leads into the Input Queue 191, which serves as a repository for all actionable prompts or software actions awaiting processing. Parallel to the Input Queue, the Output Queue 192 is depicted, holding data that has been processed and is ready for user consumption.

At the core of the operational process lies the Processing System 103, interconnected with various modules through bi-directional arrows. On one side, it links to the API Module 105, which further branches into sub-components including Email 166, SIEM 107, and Ticketing 109. This suggests a robust integration, allowing the system to access and interact with email, SIEM, and ticketing applications through API connectivity, orchestrated by the API Module.

Centrally located, the bi-directional arrows connect the Processing System 103 to the LLM Module 165. This module houses the Interpreter 116 responsible for converting natural language into executable software actions, the Chatbot 117 enabling user-system interaction, and the Embedded Prompt 118 for implementing prompt engineering to ensure consistent quality in data output.

Adjacent to the LLM Module is the AI Agent Module 121, a critical component comprising various agents: the Orchestrator Agent 122, which manages and coordinates tasks among other agents; the Segregator Agent 123, tasked with separating instruction steps and associated code; the Performer Agent 124, executing code for each instruction step; and the Troubleshooter Agent 125, which addresses any errors or incomplete tasks. This configuration exemplifies one possible deployment of agents, with flexibility in the number and types of agents utilized based on specific operational needs.

The final data plane of the diagram details the system's data storage components. The Knowledge Database 133, connected to the LLM module, houses essential knowledge files related to the system and task execution. The Code/Script Database 134 stores source code and scripts, aiding in further automation due to proven past successes. Additionally, the AI Agent Module connects to two key databases: the Prompt History Database 131, which archives past prompts and their outcomes, and the System Info Database 132, containing vital information about the system's computing components.

In essence, FIG. 25 offers a comprehensive view of the system's sequence of operations, highlighting the interconnected nature of its components, from user interface interactions to data processing, API integration, and agent-based task execution, all converging to facilitate an efficient and dynamic operational workflow.

Figure 26:
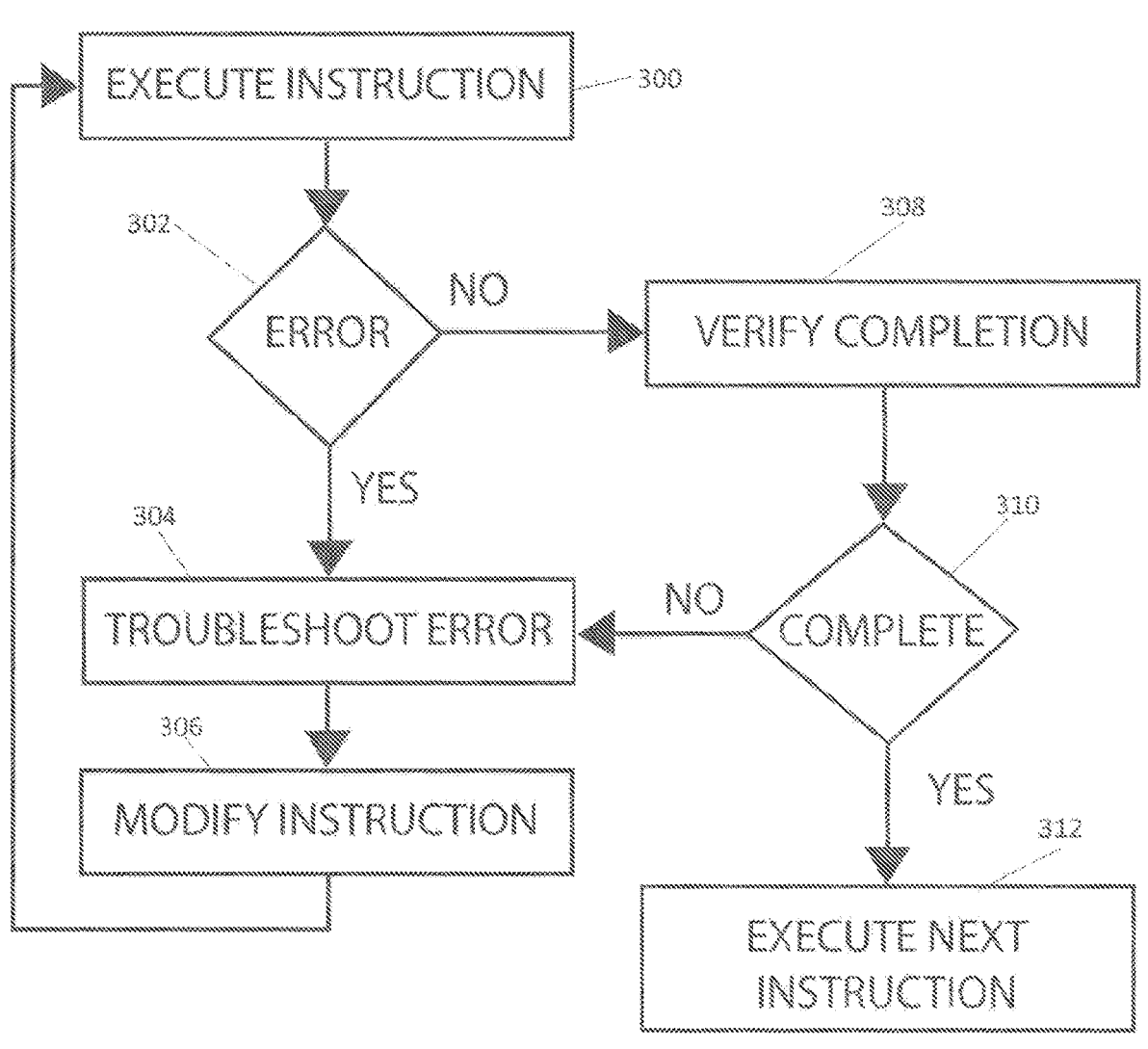
FIG. 26 illustrates a process flow depicting the execution of software instructions, encompassing decision points for error detection, instruction modification, completion verification, and troubleshooting, all facilitated by an LMM/LLM and agents, ensuring efficient task execution and error resolution.

FIG. 26 presents a process flow with two critical decision points, delineating the steps involved in executing, verifying, and troubleshooting software code instructions. The flow begins with the "Execute Instruction" block 300, where a software code instruction is initiated. This sets the stage for the system's operational process, focusing on the execution of specific software tasks.

The process then progresses to the first decision point, labeled "Error" 302. Here, the system assesses whether the executed instruction has encountered a software error or execution error. This decision point is pivotal in determining the subsequent course of action. If the answer is "Yes", indicating that an error has occurred, the flow redirects to the "Troubleshoot Error" block 304. The LMM/LLM, in conjunction with various agents, engages in troubleshooting the identified issues. The system leverages its knowledge base files and training data during this phase, utilizing this rich repository of information to aid in the troubleshooting process and steer the task towards successful completion.

The information generated in the "Troubleshoot Error" block 304 may be applied in the "Modify Instruction" block 306. This block represents the system's capability to modify or adjust the instruction in response to the identified error, aiming to rectify the issue. Upon modification, the instruction loops back to the initial "Execute Instruction" block for re-execution.

If the first decision point yields a "No" result, suggesting that no error occurred during execution, the process advances to the "Verify Completion" block 308. In this stage, an agent within the system is tasked with verifying that the code has been fully and correctly executed. This verification facilitates ensuring the integrity and completeness of the task.

Following the verification, the process encounters the second decision point, "Complete" block 310. Here, the system determines whether the task or instruction has been completed satisfactorily. If the outcome is "Yes," the process flows to the final block, "Execute Next Instruction" block 312, indicating the readiness of the system to proceed with the subsequent task or instruction in the queue.

Conversely, if the "Complete" block 310 decision point results in a "No", indicating incomplete or unsatisfactory task execution, the process diverges to the "Troubleshoot Error" block 304 and subsequently to the "Modify Instruction" block 306 as described above.

In summary, FIG. 26 effectively maps out a systematic approach to executing software instructions, with built-in mechanisms for error detection, correction, and verification. The incorporation of the LMM/LLM and agents in this process underscores the system's sophisticated ability to autonomously manage, adapt, and resolve challenges in software task execution, ensuring accuracy and efficiency in its operations.

FIG. 27 illustrates an advanced process flow that demonstrates how two or more AI agents collaborate with a Large Language Model (LLM) or Large Multi-Modal Model (LMM) and a service to efficiently handle and execute software action requests. This process includes steps for error troubleshooting and resolution to ensure task completion. The initial block of the process flow 280 highlights the "listening service receiving software action request," where a user inputs a request for the system to perform a specific software action. Subsequently, block 281 details the translation of this request into step-by-step instructions and corresponding executable code by an agent in conjunction with an LLM. This translation is essential for converting the user's natural language request into a format that can be processed by the system.

In block 282, an "Agent receives instructions/code via service," indicating the role of a system service in facilitating the transfer of processed data (instructions and code) to the agent. This step facilitates ensuring that the agent receives the accurate data required to execute the task. Following this, block 283 describes how the "Agent executes software for host access and connects to the host," employing remote access tools like RDP, SSH, TELNET, or similar applications to establish a connection to the target host.

Block 284 "Agent executes code on host" represents the stage where the agent actively runs the code to perform the instruction set on the host. This execution can be achieved through various methods, including CLI inputs, script execution, or software code execution. Then, in block 285, the process addresses error handling: "If error, agent copies error data and delivers the error data to a separate agent." This step ensures that any execution error is captured and communicated for further analysis.

Subsequently, block 286 "Separate agent analyzes error, generates instructions/software code for error resolution, and delivers instructions/software code to agent" illustrates the critical role of a dedicated error analysis agent. This agent's responsibility is to scrutinize the error, develop a corrective instruction set and software code, and relay this information back to the executing agent.

The process then moves to block 287, where "Agent executes error resolution code on host." Here, the agent applies the revised code to rectify the error and proceed with the task. Block 288, "If error resolved, agent proceeds to next instruction step," ensures that upon successful error resolution, the agent continues with the subsequent steps of the instruction set. In case of new errors, the process iterates the troubleshooting steps for resolution.

The final stage of the process involves saving all executed instruction steps and software code or commands to a log file and generating a report. Additionally, a notification is sent to the user upon the successful completion of the task. This comprehensive process flow, as depicted in FIG. 27, exemplifies the system's capability to handle complex software actions efficiently, with robust mechanisms for error detection and resolution, ensuring reliable and accurate task completion.

Figure 28:
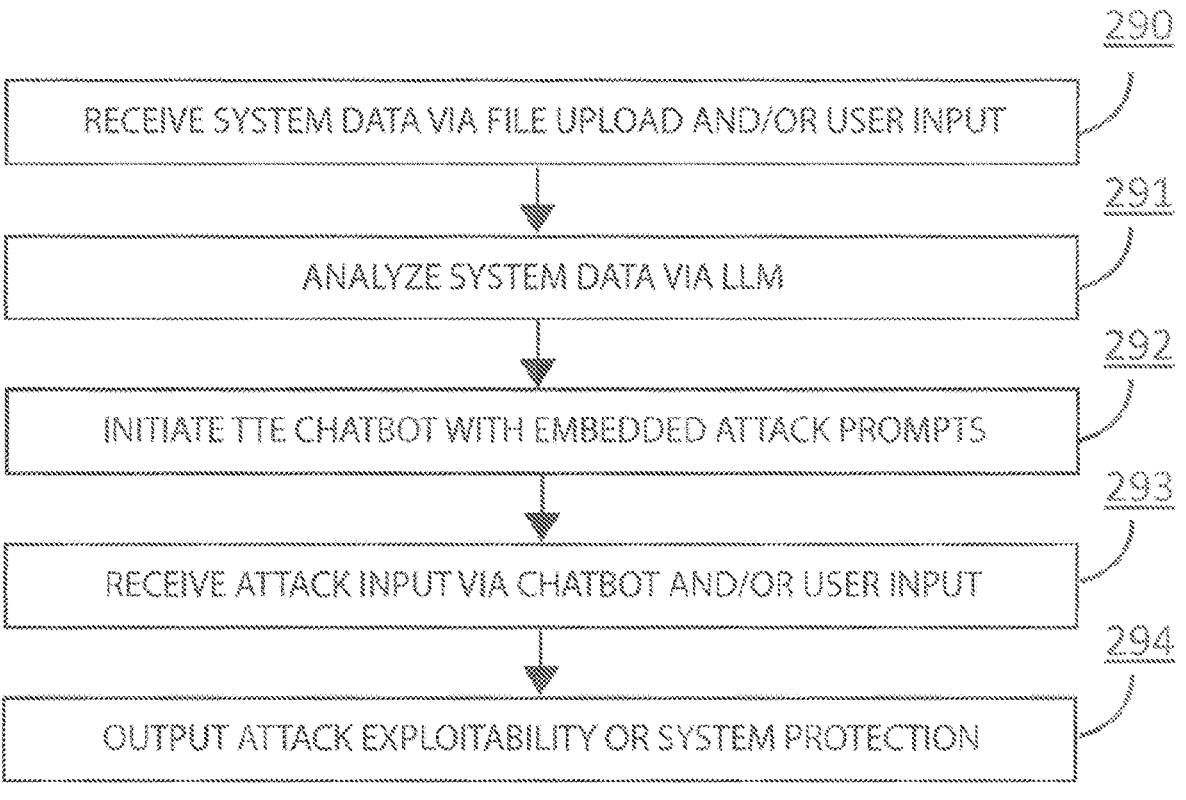
FIG. 28 illustrates a process flow depicting a method of conducting a cyber security interactive scenario assessment.

FIG. 28 illustrates a process flow for conducting a Table-Top Exercise (TTE), a cyber security or IT interactive scenario assessment can be useful for organizations aiming to enhance their preparedness against potential cyber threats. TTEs are instrumental in identifying vulnerabilities and reinforcing security measures through simulated cyber attack scenarios. The first block of the process flow 290 "Receive system data via file upload and/or user input," highlights the system's capability to ingest essential cyber security or IT data. Users can upload files containing cyber security or IT scans, reports, and critical system information such as IP addresses or system protections. Additionally, the system offers a chatbot interface for real-time user interaction, allowing the input of new data not present in the uploaded documentation and the introduction of cyber attacks not pre-programmed into the application.

The subsequent block 291, "Analyze system data via LLM," details the use of a Large Language Model (LLM) to thoroughly review and understand the uploaded or input data. This analysis is pivotal in comprehensively grasping the system's current cyber security or IT posture. In block 292, "Initiate TTE chatbot with embedded attack prompts," the system enables user interaction through chatbot prompts or by selecting predefined cyber attack functions. These functions, accessible via user interface elements like buttons, simulate various cyber threats such as DDOS attacks, SQL injections, or remote code executions.

Block 293, "Receive attack input via chatbot and/or user input," processes the user's inputs and decisions made during the TTE. This step is essential for customizing the exercise based on the specific threats and scenarios relevant to the user's system. Following this, in block 294, "Output attack exploitability or system protection," the system calculates and presents the exploitability of the attack on the assessed system. It highlights how specific vulnerabilities might impact system functionality or, alternatively, how existing system protections effectively mitigate these vulnerabilities. For instance, the system might illustrate that a well-configured firewall effectively neutralizes certain port attacks.

This process flow, as depicted in FIG. 28, underscores the system's innovative approach to conducting TTEs, combining automation, realistic cyber attack simulations, and interactive learning. By providing dynamic scenario assessments, detailed vulnerability analysis, and actionable remediation suggestions, the system significantly enhances the efficiency and effectiveness of cyber security or IT preparedness exercises.

Figure 29A:
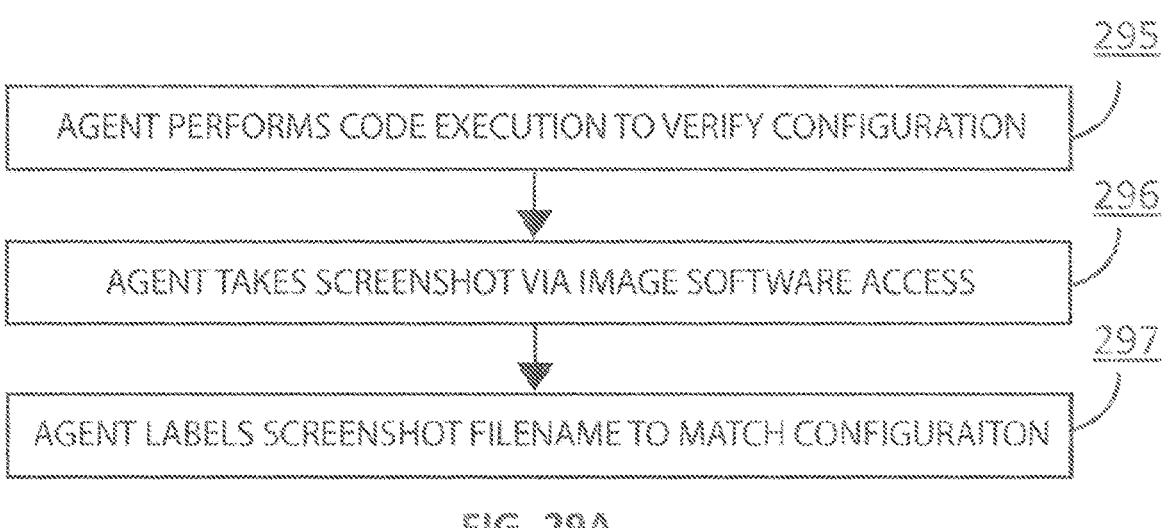
FIGS. 29A and 29B illustrate process flows depicting the automation of cyber security and IT operations.
Figure 29B:
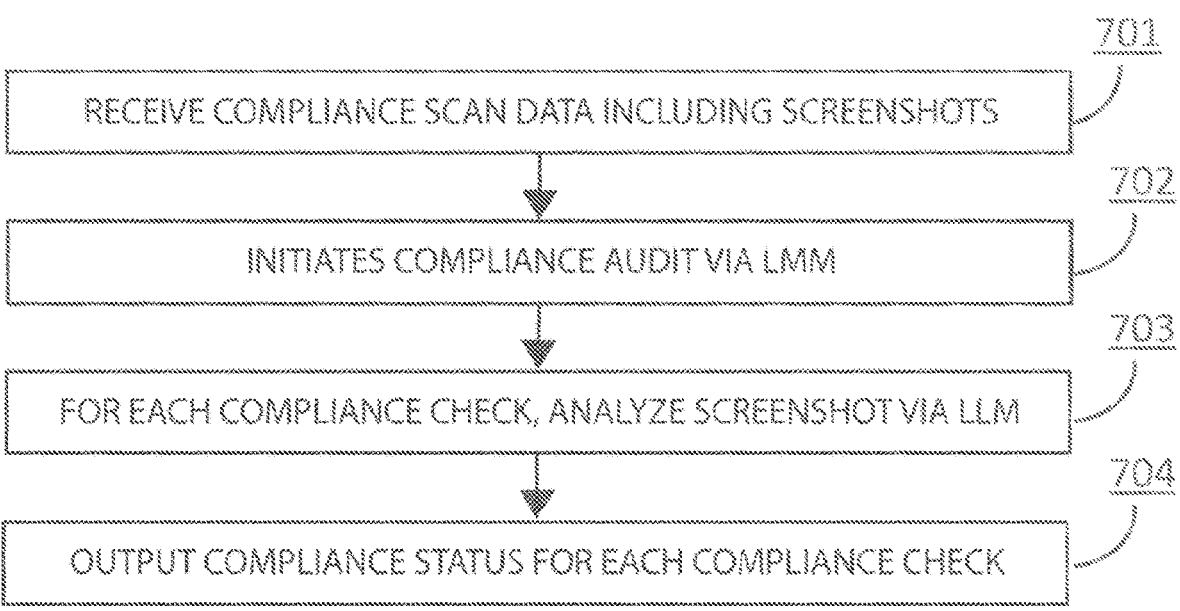

FIG. 29A and FIG. 29B represent two integral process flows within the system, detailing the automation of cyber security or IT compliance scans and audits, respectively. In FIG. 29A, the process commences with block 295, "Agent performs software code execution to verify system configuration." Here, an AI agent is utilized to execute commands on a host system, verifying if its configuration adheres to compliance standards. The subsequent block 296, "Agent takes screenshot via image software access," involves the Large Multi-Modal Model (LMM) employing computer vision. It captures screenshots immediately following a system command execution, serving as evidence for compliance verification.

The final step in FIG. 29A's process flow, block 297, "Agent labels screenshot filename to match configuration," sees the system intelligently naming the screenshot files to correspond with the specific system configuration being assessed, thereby streamlining the compliance audit process.

Moving to FIG. 29B, the process flow initiates with block 701, "Receive compliance scan data including screenshots." In this stage, the system gains access to the data generated from the cyber security or IT compliance scans, encompassing the screenshots taken during the scan. This data forms the basis for the subsequent audit process. Block 702, "Initiates compliance audit via LMM," then depicts the commencement of the audit process, wherein the system leverages the LLM's computer vision capabilities for scrutinizing the compliance-related screenshots.

Continuing to block 703, "For each compliance check, analyze screenshot via LLM," the system methodically processes each screenshot. It verifies the compliance criteria set for system configurations and matches these against the visual evidence provided in the screenshots. The process culminates in block 704, "Output compliance status for each compliance check." This stage involves the system assigning a status-compliant, non-compliant, or not applicable—to each compliance check based on the thorough analysis of all available data.

These two figures, FIG. 29A and FIG. 29B, together illustrate the advanced capabilities of the system in automating and streamlining the intricate processes of conducting cyber security or IT compliance scans and audits. By integrating AI agents with LMM and leveraging computer vision, the system enhances the accuracy and efficiency of compliance verification, making it a pivotal tool for organizations aiming to bolster their cyber security or IT posture.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

Certain features that are described in this disclosure in the context of separate embodiments can also be implemented in combination in a single embodiment. Conversely, various features that are described in the context of a single embodiment can be implemented in multiple embodiments separately or in various suitable subcombinations. Also, features described in connection with one combination can be excised from that combination and can be combined with other features in various combinations and subcombinations. Various features can be added to the example embodiments disclosed herein. Also, various features can be omitted from the example embodiments disclosed herein.

When "or" is used herein, it is intended to be used according to its typical meaning in logic, in which both terms being true (e.g., present in an embodiment) also result in configurations having an affirmative truth value. If the "XOR" meaning is intended (in which both terms being true would result in a negative truth value), "xor" or "exclusive or" will be explicitly stated.

Similarly, while operations are depicted in the drawings or described in a particular order, the operations can be performed in a different order than shown or described. Other operations not depicted can be incorporated before, after, or simultaneously with the operations shown or described. In certain circumstances, parallel processing or multitasking using separate processes or threads within an operating system may be used. Also, in some cases, the operations shown or discussed can be omitted or recombined to form various combinations and subcombinations.

This invention provides many novel and useful technological capabilities including:

Integration with Generative AI Models: A distinctive feature of the disclosed system is the employment of advanced AI models such as Llama, ChatGPT, and BARD. These models, when harnessed within the realm of cyber security or IT, enable unprecedented intelligence and processing capabilities, paving the way for enhanced security protocols.

Dual NLP Models: The patent application describes a system with two separate NLP models or neural networks-a receiver and a performer. This distinction allows for specialized processing where one model interprets the instructions and the other executes the actions.

Inter-Model Communication: The system features communication between the receiver and performer models via a communications interface, enabling a form of collaboration or division of labor between the models for completing tasks.

Iterative Troubleshooting: The system has provisions for back-and-forth communication between the receiver and performer models to troubleshoot when an instruction is not completed correctly, implying some level of iterative refinement or error correction.

Administrative Actions: The performer model can exist in the form of an administrative user on a node and perform any administrative actions on said node, suggesting a wide range of capabilities and potentially higher-level administrative functions.

AI Agents: The inclusion of AI agents on nodes to aid in cross-communication between the NLP models indicates an additional layer of complexity and functionality, possibly to ensure smooth and efficient communication or to facilitate more advanced collaborative behaviors.

Rule-based and ML Processing: The NLP models can use either rule-based processing or machine learning algorithms to identify actions, indicating flexibility in approach and adaptability to different kinds of tasks and instructions.

Translation into Executable Actions: The performer model translates natural language instructions into executable software actions, bridging the gap between human-readable instructions and machine-executable tasks.

Dynamic Action Automation: The system showcases a remarkable distinction between rule-based and machine learning algorithms. This unique combination ensures that the system can adeptly process instructions and subsequently trigger appropriate cyber security or IT actions, ensuring versatility and robustness in security automation.

Continuous Code Modification: A leap in automation is observed with the system's capability to dynamically modify the source code of apps or scripts. Such modifications, made in real-time based on user instructions, significantly enhance system adaptability and responsiveness.

Multi-modal Neural Network: The described system embodies the capacity to process diverse data types. Specifically, it can concurrently analyze textual and visual data. This multi-modal capability is indispensable when interpreting system diagrams, data flows, and other visual representations in conjunction with textual inputs.

Simulated Cyber security or IT Environment: The system offers an innovative virtual platform that allows users to simulate potential cyber-attacks on their infrastructure. By replicating real-world conditions, users can proactively identify system vulnerabilities, thus enhancing their preparedness against potential breaches.

Holistic Software Vulnerability Analysis: In contrast to conventional systems that rely solely on checking software against STIGs or CVEs, the described system delves deeper. It also scrutinizes software vendor documentation, making its vulnerability assessment exceptionally comprehensive and thorough.

AI-Enhanced Dynamic Reports: One of the groundbreaking features of the system is its ability to generate dynamic reports. With a focus on reports like POA&M, the system can automatically refresh, update, and incorporate fresh data, eliminating the restrictions of traditional static reporting mechanisms.

Automated Response to Log Alerts: Integrations are at the heart of this system. By interfacing with SOAR systems, ACLs, and firewalls, the system is designed to automate threat responses, ensuring that potential threats are swiftly and efficiently neutralized.

API Integration: Ensuring real-time threat detection and response is made possible through the system's seamless integration capabilities with SIEM, SOAR, and endpoint management applications. This feature underscores the importance of interoperability in enhancing cyber security or IT measures.

Anti-Tamper Alert Handling: The system exhibits a proactive stance against security threats with its ability to automate responses to Anti-Tamper alerts. Advanced techniques such as system isolation, encryption, and data removal are employed, ensuring the utmost protection of user data.

Agentless Functionality: The disclosed system emphasizes flexibility, allowing users to access system functions through diverse avenues. Whether through config management applications, dedicated software apps, or neural networks, users are ensured an uninterrupted and versatile system experience.

Environment Flexibility: Versatility extends to the system's operational environments as well. Capable of functioning in both on-premises and cloud-based environments, the system also provides insightful discussions on the specific security implications inherent to each setting.

Automated Cyber Artifact Auditing: A notable innovation introduced in this system is the facility for users to upload cyber artifacts directly. Once uploaded, the system initiates an AI-driven audit on these artifacts. By leveraging advanced artificial intelligence techniques, the system can rapidly identify potential vulnerabilities, compliance gaps, or other security concerns within the artifacts. Subsequently, an in-depth audit report is generated, vastly expediting what was previously a time-intensive manual audit process. This feature not only enhances the speed of the audit but also ensures that the produced reports are comprehensive, accurate, and tailored to address potential security threats.

Technological term definitions mentioned herein related to artificial intelligence include: Machine Learning: A subset of AI that allows computers to learn and make decisions from data without being explicitly programmed. It involves training models using large sets of data and algorithms that give them the ability to learn how to perform a task; Neural Network: Algorithms intended to recognize patterns. They interpret sensory data through a kind of machine perception, labeling, or clustering of raw input; Multi-modal Neural Network: A type of artificial neural network designed to process multiple types of data, such as text and images, at the same time; NLP (Natural Language Processing): A field at the intersection of computer science, artificial intelligence, and linguistics. Its goal is to enable computers to understand, interpret, and generate human language in a way that is valuable; Generative AI Models: Artificial intelligence models, such as Llama, ChatGPT, and BARD, that are capable of generating new content and augmenting the functionality of cyber security or IT operations; Prompt Engineering: The process of designing and optimizing prompts or input queries to elicit desired responses or behaviors from a machine learning model, particularly natural language processing (NLP) models. This technique facilitates interacting with models that generate responses based on the input they receive, as the quality and specificity of the prompt can significantly influence the quality of the output.

Technological term definitions mentioned herein related to cyber security or IT include: STIG (Security Technical Implementation Guides): A configuration standard for various software tools and systems for maintaining the security of information systems in the cyber realm; SRGs (Security Requirements Guides): Guides that provide security requirements for specific types of information and information systems; CVEs (Common Vulnerabilities and Exposures): A dictionary-type list of names for publicly known cyber security or IT vulnerabilities, allowing for a standardized method of referring to vulnerabilities; POA&M (Plan of Action and Milestones): A document outlining vulnerabilities identified, actions to be taken to remediate them, and timelines for completion; SOAR (Security Orchestration, Automation, and Response): A solution that allows organizations to collect data about security threats from multiple sources and respond to low-level security events without human assistance; ACLs (Access Control Lists): A list of rules that are used to better the security of a device or network by controlling the movement of traffic in and out of the network; SIEM (Security Information and Event Management): Provides real-time analysis of security alerts generated by hardware and software in an organization; Endpoint Management Applications: Software applications that allow for centralized control over the devices (endpoints) on a network, ensuring they meet specific standards for security and functionality; Anti-Tamper Technology: Techniques or technology used to prevent unauthorized access to a system or modification of its components; Vulnerability Scan: A scan to identify security vulnerabilities in a system, application, or network; Compliance Scanning: A process where the compliance of a node or system is assessed against certain standards or requirements; Mitigation Statements: Statements derived from compliance report analysis, indicating the steps taken or planned to reduce the impact of identified vulnerabilities; Ethical Hacking: Legally breaking into computers and devices to test an organization's defenses. It's among the most exciting IT jobs any person can be involved with and also called penetration testing or white-hat hacking; Security Compliance Application Protocol (SCAP): A suite of specifications that use extensible markup language (XML) to express and manipulate security-related information; Cyber Security Artifacts: Documents or data, such as scan results and cyber security or IT policies, used in assessing cyber security or IT compliance; Compliance Remediation Data: Refers to data detailing the steps or actions needed to bring a system or application into compliance with cyber security or IT standards or regulations; Vulnerability Details: Specifics about security vulnerabilities, often including information on potential impacts and resolutions;

Technological term definitions mentioned herein related to general information technology include: API (Application Programming Interface): A set of tools and protocols that allows different software entities to communicate with each other. In this context, it allows cyber security or IT tools and solutions to connect and share data or commands; Software-as-a-Service (SaaS): A software licensing and delivery model in which software is provided over the Internet, typically on a subscription basis and is centrally hosted; Virtualization: The act of creating a virtual (rather than actual) version of something, including virtual computer hardware platforms, storage devices, and computer network resources; User-Operator: An individual who interacts with a system or application to perform tasks or operations. Machine Code or System Commands: Instructions that can be executed directly by a computer's central processing unit. They are typically in binary form and are specific to a particular computer architecture; Kernel: The core component of an operating system, managing the system's resources and the communication between hardware and software components; Agent, User, or Service: Entities within a system that can perform actions or tasks, such as executing instructions or managing data; Agentless Functionality: Refers to systems or solutions that don't require installing additional software (agents) on the target system to function; On-Premises: Refers to software and hardware that is installed in the same building or campus as the user. Contrasts with cloud-based systems where the main components reside on remote servers.

Technological term definitions mentioned herein related to system implementation examples include: Frontend Interface/Web Application: This is the user interface of the application, responsible for user interactions and rendering of the UI. It's built using a web framework which facilitates dynamic updates and interactions between the user and the system; Component-Based Architecture: A software design technique where functionalities of a system are divided into interchangeable and reusable components. These components represent higher-level services, and their interchangeable nature allows for dynamic updates and customizability of the application; Backend Framework: This refers to the server-side part of a software application that handles business logic, database interactions, authentication, and authorization. It provides APIs for the frontend interface and is responsible for processing user requests and returning responses; Natural Language Processing (NLP) Module: A component of the system designed to understand, interpret, and generate human-like text. This module converts user input in natural language into machine-readable commands or code; Dynamic Action Automation (DAA): This is the process of interpreting machine-readable commands using a combination of rule-based algorithms and machine learning, and activating corresponding software tasks or functions based on the interpreted commands; Continuous Code Modification: A functionality that allows the system to dynamically adjust or modify the source code of an application or script based on received user input or requirements. This functionality enables adaptability and responsiveness in various IT scenarios; Command Input & Execution Module: This module is responsible for receiving user commands or instructions, processing and interpreting them, and executing corresponding software actions or tasks based on the processed and interpreted commands; Middleware and APIs: These are software components that enable communication and data management between different parts of a software application. They facilitate modular interaction and connectivity within the system; Security and Session Management: This refers to the mechanisms implemented to authenticate users, manage user sessions, and ensure the security of user data and interactions with the application; Continuous Integration and Deployment (CI/CD): This is a set of practices that involve automatically testing and deploying the applications. The main aim is to improve the development workflow by ensuring that code changes are automatically tested and deployed; Hosting and Cloud: This relates to the platforms and services used to host the application and its components. Cloud services provide scalable hosting, storage, and additional services such as machine learning; Containerization: This is a lightweight form of virtualization that helps to deploy and run distributed applications without launching an entire virtual machine for each app. Containers are isolated from each other and from the host system; Orchestration of Containerized Applications: This involves managing the life cycles of containers, especially in large, dynamic environments. It includes deploying containers, scaling them as appropriate, managing their health, replacing failed containers, and scheduling their work on available machines; Real-Time Search Functionality: This feature allows users to retrieve information from the database instantly and efficiently and facilitates logging and searching through large amounts of data in real-time; Third-Party Integrations and Permissions: The ability of the system to connect with and utilize services, features, or data from external sources or services. This includes managing permissions and ensuring secure interactions with these third-party entities; Natural Language Processing (NLP) Module: A specialized component designed for processing written instructions in natural language and converting them into machine-level code, enabling execution of operations associated with cyber security or IT compliance.

Technological term definitions mentioned herein related to system implementation examples further include: Service or Agent Program: A software component responsible for executing identified actions based on instructions translated by the NLP module; Cyber security or IT Compliance Operations: A set of procedures aimed at ensuring that various types of systems, including networks, servers, workstations, and mobile devices, adhere to cyber security or IT standards and regulations; System Architecture: A structured framework used to conceptualize software elements, relationships, and properties, comprising multiple components including a processing system, computer-readable storage media, and an interface system; Compliance AI Model or Neural Network: A form of artificial intelligence designed to perform actions and operations related to cyber security or IT compliance based on machine-level instructions generated by the NLP module; Output Data: Information generated as a result of executing received instructions, which can be in various formats such as reports and log files; AI Agents on Nodes: Software agents located on network nodes that facilitate real-time communication and ensure synchronized information and instruction exchange between different system components; On-Premises and Cloud-Based Deployment: Methods of deploying the system either within the organization's premises for heightened security or on the cloud for scalability and integration with other cloud services; Continuous Modification Capability: The ability of the AI to dynamically modify the source code of applications or scripts based on user instructions; Anti-Tamper Measures: Strategies such as system isolation, encryption, and data removal employed to safeguard valuable data; Modular Architecture: A design approach that divides a system into smaller parts (modules) that can be independently created and then used in different systems; Computer Program, User Account or Service: Software components that are part of the system and are responsible for executing identified actions; Rule-Based Processing and Machine Learning Algorithms: Techniques used by the NLP module to identify and translate instructions into corresponding actions, where rule-based processing utilizes predefined rules, and machine learning algorithms learn from large datasets; Communications Interface: Used to provide communications between systems over a wired or wireless network; Machine Level Instructions: Instructions that are in a form that can be executed directly by a computer's central processing unit (CPU); Compliance AI Model/Neural Network: A component designed to generate output data based on the execution of received instructions, playing a role in maintaining compliance in cyber security or IT systems; AI Agents: Software agents configured to monitor and facilitate communication and exchange of information and instructions between different models or networks in the system; Natural Language Instruction: Instructions given in human language which are then translated into software actions or machine-level code.

Technological term definitions mentioned herein related to system specific figure implementation examples include: System: Refers to an automated system designed to perform various cyber security or IT computing tasks across different operating systems or software applications to increase efficiency and reduce manual workload; User Interface: A platform or point of interaction where users can access and input new software action requests and view historical data related to past requests; AI Action Store: A data store that contains all data related to any given software action request, including specific actions, action output results, associated users, and the computing systems on which the actions were performed; Receiver NLP Module: Contains programming instructions used to identify and translate written instructions into software actions; Performer NLP: Receives instruction steps, translates them into machine mode, performs software actions, and relays the output data back to the system 100; Software/User: Represents any system user account or service that can be utilized by the performer NLP 170 to execute software actions; Network: A medium used for data exchange between system 100 and any system node 150, 160, which can include various types of networks such as LAN, WAN, Wi-Fi, Bluetooth, etc; Processing System:

May include one or more processors, memory, and other components for executing instructions and performing various operations; Computer-Readable Storage Media: Includes one or more storage devices for storing data and instructions, such as hard drives, solid state drives, etc; Data Input/Output Service: A service responsible for delivering instruction steps to the designated node; Execution Status: Indicates the status of the software actions that were performed, communicated back to the system; Cyber Security Compliance System: A system designed to ensure adherence to cyber security or IT standards, capable of generating, auditing, and analyzing various cyber security or IT compliance reports and documentation; Compliance NLP (Natural Language Processing) 193: A component of the system responsible for analyzing and interpreting human language (natural language) related to compliance remediation; Compliance AI: An artificial intelligence component responsible for executing and possibly generating machine-level code for compliance remediation; Agent/Service: A software agent or service that can execute tasks, such as compliance remediation instructions, on a node; Node: Refers to a computing device or system on which remediation or scanning operations are performed; Compliance Remediation Report: A report generated after remediation steps are performed, detailing the actions taken and the updated compliance status of the node; Compliance Service: Another component of the system, possibly managing communication and delivery of instructions between different elements of the system; Compliance Store: A storage component where logs of remediation steps and configuration changes are saved; User Interface: A graphical interface through which a user can interact with the system, execute operations, and view reports; Machine-Level Code: Low-level code that can be directly executed by the computer hardware.

In certain embodiments, the system may incorporate the capabilities of a Language Model with Multimodality or Large Multimodal Model (LMM), enabling it not only to process and understand text but also to interpret and analyze images. The integrated vision capability of the LMM provides the system with a unique advantage of reading images, converting them into a textual format, or even directly translating them into software instructions and subsequent software actions.

For instance, a user could upload or provide a flowchart image that visually depicts a software process. The LMM, equipped with its vision capability, interprets this image, converts the visual elements and symbols into software-relevant instructions, and can then automate the described process without manual translation of the image content by the user.

Further enhancing the system's versatility is the screen share capability, which allows the LMM to access and view a node's screen in real-time. This feature is particularly beneficial when troubleshooting or providing solutions in real-time scenarios. By viewing the node's screen, the LMM can directly interpret the visual data, execute software instructions, and read the outcomes instantaneously. This facilitates a seamless interaction where the LMM can respond to real-time changes and challenges efficiently.

While users have the option to provide specific inputs or guide the LMM during the screen share session, the system can also function autonomously. In autonomous mode, once given initial permission to view and interact with the screen, the LMM can carry out troubleshooting, perform tasks, or execute operations without requiring continuous user input. Its ability to interpret both textual and visual data on the screen ensures that it can adapt and respond to a wide range of scenarios.

The combination of vision capability and real-time screen access opens up a plethora of applications. For example, in a software development setting, if a developer encounters an error or a bug that is visually represented on their Integrated Development Environment (IDE), they could share their screen with the system. The LMM can then view the error, analyze it in real-time, and either guide the developer with corrective steps or autonomously implement the fix, all while interpreting both the textual error messages and any visual anomalies.

Furthermore, the potential of this embodiment is not limited to technical scenarios. In creative domains, such as design or digital arts, users can share visual drafts or concepts with the system. The LMM, with its vision capability, can offer feedback, suggest improvements, or even autonomously implement design changes based on its interpretation of the shared visuals.

In essence, the integration of an LMM with vision capabilities, combined with real-time screen share functionality, augments the system's ability to interact with, interpret, and act upon a broader spectrum of data sources. This ensures a more comprehensive and adaptive response mechanism, catering to a diverse range of user requirements and scenarios.

In specific embodiments, the system may leverage the capabilities of code-interpreters to provide a bridge between the natural language instructions received and the actual software actions or code execution. Code-interpreters are specialized software components that read and execute instructions written in a particular programming language, directly translating them into actions without the need for compiling the instructions into machine code.

When the system receives a user's written instructions, it can, after interpreting the intent via the LMM, relay these instructions to the relevant code-interpreter. This interpreter then deciphers the translated instructions, converting them into immediate software actions. This real-time translation and execution mechanism significantly enhances the responsiveness of the system, providing users with instantaneous feedback or outcomes based on their instructions.

For instance, a user might input a directive related to data analysis in a natural language format. The system, after understanding the intent via its LMM, can translate this directive into a series of Python commands, given Python's prominence in data analysis tasks. These commands are then relayed to a Python interpreter, which immediately executes the commands, resulting in the desired data analysis action without the need for a separate compilation process.

Moreover, by incorporating multiple code-interpreters, the system can cater to a myriad of programming languages, thereby broadening its versatility and application spectrum. Whether it's managing databases with SQL commands, performing web tasks using JavaScript, or handling data science operations with R, the presence of relevant interpreters ensures that the system can seamlessly handle tasks across various domains.

The utilization of code-interpreters also enhances the system's educational and collaborative capabilities. For users who are in the process of learning a new programming language or those collaborating on coding projects, real-time code interpretation provides a dynamic platform for experimentation, immediate feedback, and collaborative problem-solving. As users input code snippets or instructions, they can instantly observe outcomes, making the learning process more interactive and engaging.

In conclusion, the integration of code-interpreters in the system's architecture offers a fluid and efficient mechanism to bridge the gap between natural language instructions and direct software actions. This capability not only accelerates task execution but also enriches user experience by offering a dynamic, real-time interaction platform for various software-related operations.

In certain embodiments, the system can integrate with cloud-based automation services to further optimize and streamline its operational capabilities. Cloud platforms have been at the forefront of offering scalable, efficient, and flexible solutions, and leveraging their automation services can immensely boost the system's performance and responsiveness.

For instance, integrating with services like AWS® Lambda™ allows the system to execute functions in response to specific events without the need for a persistent server infrastructure. A user can, through natural language directives, trigger Lambda functions which can run code in response to changes in data, system state, or in reaction to other specific events. This serverless architecture ensures that the system is not only efficient but also cost-effective, as resources are utilized only when functions are executed.

Similarly, when interfaced with Microsoft® Azure® Automation Service, the system can harness a suite of automation capabilities, from managing operating systems to handling cloud resources. Azure Automation, through its runbooks, provides a mechanism to define and execute system tasks, which the system can tap into. Users can provide instructions, which, after being processed, can be translated into specific runbook operations, ensuring that tasks are carried out seamlessly in the Azure environment.

Integration with Google® Cloud automation services offers another dimension of capabilities. Whether it's using Google Cloud Functions to execute lightweight, single-purpose functions or tapping into Google Cloud Composer for more intricate, workflow orchestration tasks, the system can ensure that user instructions are translated into actionable, automated tasks within the Google Cloud ecosystem.

One notable advantage of integrating with these cloud-based automation services is the inherent scalability they bring. As user demands grow or the complexity of tasks increases, these services can automatically scale to handle the load, ensuring consistent performance. Furthermore, they come equipped with a suite of monitoring and logging tools, ensuring that all executed tasks are appropriately tracked, and any issues or anomalies are promptly identified.

In summary, by interfacing with cloud-based automation services, the system significantly enhances its operational horizons. Users gain the advantage of harnessing the power, flexibility, and efficiency of cloud platforms, ensuring that their natural language directives are not only accurately interpreted but also executed in the most optimized manner, irrespective of scale or complexity.

In specific embodiments, the system can be expanded by integrating with agent-based applications known for automating a vast range of IT and cyber security tasks. These applications bring with them specialized capabilities and toolsets which, when combined with the system's core functionalities, can lead to a more refined and nuanced execution of automated actions.

These applications are known for their robust capability to execute code based on user input and can be harnessed by the system to turn the natural language instructions into precise code executions. This translates to a direct bridge between a user's command in everyday language and a specific code-based task in real-time, whether it's for cyber security routines or general IT operations.

These applications can be deployed within the system framework to streamline the generation of scripts and automations based on user prompts. Their inherent ability to auto-generate code snippets or scripts ensures that when a user provides a directive related to a cyber security or IT task, the system can rapidly produce the necessary code to execute the task, further enhancing speed and accuracy.

Integrating these applications allows for a conversational interface designed to trigger specific IT actions, and assist the system in providing users with an intuitive, dialogue-based platform for issuing commands. This can be particularly valuable for users unfamiliar with technical jargon, allowing them to converse with the system naturally and get the desired cyber security or IT task executed without having to provide precise technical directives.

The synergy of the system with agent-based applications results in a highly adaptive and responsive automation platform. Users benefit from an enriched interface, more extensive toolsets, and a more extensive range of executable actions. By harnessing the unique strengths of each agent-based application, the system ensures that the spectrum of IT and cyber security tasks it can handle is not only diverse but also executed with unparalleled precision and efficiency.

In a particular embodiment, the system has been engineered to operate as an automated Managed Service Provider (MSP), encompassing a comprehensive suite of IT services and cyber security functions. This embodiment is designed to revolutionize traditional MSP models, where manual intervention is predominant. By transitioning to an automated framework, businesses can achieve scalability, rapid response times, and a high degree of accuracy in service delivery.

The concept of automating Tech Support tasks is a cornerstone of this embodiment. Picture a scenario where a customer sends an email requesting a password reset. Instead of routing this to a helpdesk agent and awaiting their availability, the system can instantly process this email. The agent within the system, utilizing its deep learning capabilities, can analyze the request, understand its context, and autonomously execute the necessary steps to reset the password, all within moments of receiving the email. Similarly, more complex tasks like setting up a new server in cloud platforms like AWS can be automated. A request delineating server specifications can be translated by the system into a series of actionable steps, which are then executed to provision the server as per the customer's requirements.

Cloud migration and cloud IT services further exemplify the system's prowess. Migrating business data and applications to the cloud, historically a manual and time-intensive process, can be largely automated. By analyzing the source and target environments and understanding the interdependencies, the system can create an optimal migration pathway. This ensures data integrity, minimal downtime, and a seamless transition to the cloud. Once in the cloud, routine management tasks, from scaling resources based on demand to implementing backup and disaster recovery protocols, can be automated, ensuring optimal performance and resilience.

Cyber security and IT services automation within this MSP model is also paramount. Proactive threat detection, real-time monitoring, patch management, and incident response can all be automated to a significant extent. By constantly analyzing network traffic, system logs, and integrating with threat intelligence feeds, the system can autonomously detect and respond to threats, often before they manifest into tangible issues.

One of the most transformative aspects of this embodiment is the potential for scaling MSP operations. Traditionally, scaling required hiring more staff, often in a linear correlation with the number of clients. With automation, an MSP can handle a significantly higher number of clients without a proportional increase in staff. This not only translates to cost savings but also ensures consistent service quality irrespective of client volume.

The presence of an administrative oversight mechanism ensures that there's a human validation checkpoint, especially for critical tasks. This hybrid approach, combining automation with human judgment, ensures that while the system operates with high efficiency, there's always a provision for human intervention to ensure quality and address complex scenarios beyond automation scope.

AI agents, as utilized in this invention, represent a significant advancement in the realm of artificial intelligence and software automation. AI agents are designed to be highly interactive and capable of executing complex tasks, a notable enhancement from traditional software agents. They possess the ability to engage in conversations with both their human counterparts and other AI agents, demonstrating a level of interaction that mimics human-like communication.

A distinct feature of these AI agents is their operational versatility. They can function in various modes that incorporate a blend of large language models (LLMs), human inputs, and specialized tools. This multifaceted approach enables the agents to adapt to a wide range of scenarios and requirements.

Furthermore, AI agents are adept at writing and executing code to solve tasks, a feature that significantly extends their utility. Traditional software agents, in contrast, are defined as computer programs that act on behalf of a user or another program in a relationship of agency. These agents are characterized by their ability to perform various actions continuously and autonomously, thereby aiding individuals or organizations in automating routine or predefined tasks. For example, a traditional software agent may be programmed to archive files or retrieve electronic messages based on a set schedule.

Traditional software agents, while functional and effective within their scope, are generally more limited in capabilities. They operate based on predefined rules and lack the ability to comprehend or generate human-like text. These agents do not possess the capability to make decisions based on contextual understanding and do not exhibit learning from their interactions.

In conclusion, both AI agents and traditional software agents serve the purpose of performing tasks autonomously. However, AI agents, as used in this invention, offer additional benefits, such as understanding and generating human-like text, making decisions based on context, and the ability to learn and adapt over time. This makes them inherently more versatile and capable of handling a broader spectrum of tasks. The invention leverages the strengths of both AI agents and traditional agents, utilizing them individually or in combination, to achieve enhanced efficiency and effectiveness in various applications.

The invention encompasses a wide range of IT-related actions, significantly enhancing the scope and efficiency of system administration, maintenance, deployment, and integration tasks. For instance, it can automate complex tasks associated with Active Directory Users and Computers, such as user additions, deletions, and password resets. The AI agents are designed to interact with Active Directory, making changes as necessary, while adhering to organizational policies and security protocols.

Further, the system is adept at handling Group Policy Object (GPO) modifications and formulation. It can automatically analyze the existing GPO settings, suggest optimizations, and implement changes to improve system performance and security. This capability ensures that the network remains compliant with the latest standards and best practices.

In the realm of cloud computing, the invention is capable of managing tasks such as Virtual Private Cloud (VPC) deployment, creation, and maintenance. It can autonomously handle cloud resources, optimizing them for efficiency and cost-effectiveness. The system can make real-time adjustments based on workload demands, ensuring optimal performance and resource utilization.

The invention also revolutionizes help desk operations by automating tasks such as email processing. For instance, the AI agent can receive an email, analyze the problem described, execute the necessary steps to resolve the issue, and then respond to the email sender confirming the completion of the task. This process significantly reduces the time and effort required for help desk operations, improving response times and customer satisfaction.

Similarly, the invention can be deployed in a chatbot format for real-time problem resolution. Users can interact with the AI agent via chat, describing their issues. The AI agent, using its advanced understanding and problem-solving capabilities, engages in a conversation with the user, providing solutions until the problem is resolved.

Another critical feature of the system is its ability to respond to logs or system alerts from Security Information and Event Management (SIEM) systems. Upon receiving an alert, the AI agent can analyze the issue, take appropriate remedial action, and log the response. This capability facilitates maintaining system security and addressing potential threats promptly.

Furthermore, the invention seamlessly integrates with ticketing systems. The AI agent can review tickets, respond appropriately, and close the ticket once the issue is resolved. This feature streamlines ticket management, reducing the workload on IT personnel and ensuring that user issues are addressed efficiently and effectively.

In summary, the invention provides a comprehensive solution for automating a wide array of IT-related tasks. From system administration to cloud computing and help desk operations, the AI agents within the system are capable of executing tasks with a high degree of efficiency and accuracy. The invention's ability to interact with various IT systems and tools, understand and resolve issues, and learn from its interactions makes it an invaluable asset in modern IT operations.

A key aspect of the functionality of the AI agents within this invention is their ability to operate under different levels of access, tailored to the specific tasks they are programmed to perform. For routine tasks that require minimal access, the agents can be granted limited permissions. This ensures that they function within a secure and controlled environment, minimizing risks associated with broader access rights.

For more complex tasks that necessitate administrative privileges, the AI agents can be provisioned with the necessary higher-level access. However, this elevated access is managed under stringent security protocols. The system is designed to ensure that such access is granted only when absolutely necessary and is closely monitored to prevent any unauthorized activities.

To maintain a balance between automation efficiency and security, the invention incorporates a 'human-in-the-loop' mechanism. This mechanism allows for human oversight in situations where the AI agent requires additional access beyond its standard permissions. In such scenarios, a qualified human operator can intervene to grant the necessary access. This intervention could be in the form of manual approval of the access request or a review of the actions to be taken by the agent.

Additionally, the human operator overseeing the agent's activities has comprehensive control over the tasks being executed. The operator can halt any ongoing task, pause operations to review the actions, or completely undo changes made by the AI agent if deemed necessary. This level of control facilitates ensuring that the actions of the AI agents align with the organization's policies, security standards, and operational goals.

The system also offers the functionality to continue a task after it has been paused or reviewed. This feature is particularly useful in scenarios where a paused task needs to be resumed after adjustments or approvals are made. It ensures that the workflow is not disrupted and that tasks are completed efficiently.

In essence, the invention provides a flexible and secure framework for AI agent operations. By granting varying levels of access based on the task requirements and incorporating human oversight when needed, the system ensures that the AI agents operate effectively without compromising on security or control. The ability for human operators to interact with, oversee, and control the agents' activities adds an essential layer of security and accountability, making the system robust and trustworthy for managing a wide range of IT-related tasks.

With the appropriate access rights, the AI agents in this invention are capable of executing a wide range of actions through various interfaces and mechanisms. This versatility is central to the agents' effectiveness in managing diverse IT tasks. One of the primary modes of operation for these agents is through a command line interface or terminal. This enables the agents to execute a series of commands directly, allowing for efficient control and manipulation of system functions. The command line interface is particularly useful for tasks that require precise and granular control.

Script execution is another critical capability of these AI agents. They can run pre-written scripts to automate routine tasks, such as data backups, system updates, or configuration changes. The ability to execute scripts enhances the efficiency of the system, reducing the need for manual intervention and minimizing the potential for human error.

Furthermore, the agents are equipped to handle source code execution. This entails compiling and running code snippets or entire programs as required. This feature facilitates software development and testing processes, where rapid iteration and deployment of code is optionally beneficial.

The system also enables the AI agents to initiate and manage system service execution. This includes starting, stopping, and monitoring various system services, ensuring that essential services are always running optimally and troubleshooting any issues that arise.

In more advanced scenarios, the AI agents are capable of kernel-level code execution. This high-level access allows the agents to interact directly with the operating system's kernel, facilitating tasks that require deep system access.

However, such capabilities are tightly controlled and monitored, given the potential risks associated with operating at the kernel level.

The versatility of the AI agents extends to their ability to utilize whatever software-related resources are available to execute any given task for which they have been granted permission. This adaptability ensures that the agents can operate effectively in a wide range of environments and scenarios, leveraging the most suitable tools and resources for each specific task.

In summary, the AI agents in this invention are endowed with the capability to perform a broad spectrum of actions, from simple command line operations to complex kernel-level code execution. The level of access granted to these agents is commensurate with the task requirements and is always underpinned by robust security protocols. This combination of versatility, adaptability, and security makes the AI agents highly effective in managing diverse IT operations, significantly enhancing the efficiency and reliability of system administration and maintenance processes.

The processing system integral to this invention is designed to be highly adaptable and can function using a diverse range of both digital and analog processors. The system's architecture allows for the inclusion of various types of processors such as Central Processing Units (CPUs), Graphics Processing Units (GPUs), Tensor Processing Units (TPUs), Field-Programmable Gate Arrays (FPGAs), Digital Signal Processors (DSPs), Application-Specific Integrated Circuits (ASICs), and a variety of Analog Integrated Circuits. These analog components may include Operational Amplifiers, Comparators, Filters, Multipliers, Mixers, Oscillators, and Phase-Locked Loops. Additionally, cutting-edge technologies like Li-Fi (light fidelity) and neuromorphic computing elements can also be incorporated into the system.

The system described in this invention is versatile and capable of incorporating a wide range of machine learning algorithms, models, and neural networks to suit diverse computational and analytical needs. The flexibility of the system allows for the utilization of various machine learning approaches, including but not limited to: Linear Regression, a simple yet effective model for predicting outcomes based on continuous variables; Logistic Regression, suitable for classification tasks producing binary outcomes; Decision Trees, which create a hierarchical structure for decision-making based on feature values; Random Forests, an ensemble of decision trees to improve accuracy and prevent overfitting; and Support Vector Machines (SVMs), which are effective in classifying data into different categories based on feature sets.

Additionally, the system can employ k-Nearest Neighbors (k-NN) for classifying data points based on similarity measures, as well as more complex neural network architectures like Artificial Neural Networks (ANNs) for learning intricate patterns in large datasets. Convolutional Neural Networks (CNNs) are particularly useful for image and video processing tasks, while Recurrent Neural Networks (RNNs) excel in handling sequential data such as text or speech. Other innovative models such as Generative Adversarial Networks (GANs) can create realistic synthetic data, and Reinforcement Learning provides a framework for maximizing reward signals in decision-making tasks.

Furthermore, the system is also equipped to implement various Clustering Algorithms for grouping data points, and Dimensionality Reduction Techniques like Principal Component Analysis (PCA) for simplifying datasets without losing significant information. In addition to these models, Echo State Networks (ESNs) and Spiking Neural Networks (SNNs) can also be integrated, enhancing the system's capability to process and analyze data in a more biologically inspired manner. This wide array of machine learning techniques ensures that the system is adaptable and powerful enough to tackle complex data processing challenges across various domains.

Within this system, the implementation of an AI agent is a pivotal aspect, encompassing sophisticated mechanisms for control, access permissions, credentials management, and software interaction. The AI agent's workflow is intricately designed to ensure secure and efficient task execution. Initially, the AI agent receives an instruction set, which may include Command Line Interface (CLI) commands formatted as a script, provided by the Large Language Model (LLM) or Large Multi-Modal Model (LMM). This script represents the actionable tasks the agent is required to perform.

To facilitate the execution of these tasks, the AI agent is granted system access and the necessary permissions. This access is carefully controlled through preconfigured settings or authentication mechanisms that might include passwords, digital certificates, or other secure methods of verification. This step ensures that the agent operates within a defined scope and adheres to established security protocols.

Once authenticated and granted access, the AI agent proceeds to execute software that enables remote access into the designated system. This might involve using tools like Remote Desktop Protocol (RDP), Secure Shell (SSH), or similar remote access software. The agent, leveraging its intelligent capabilities, then copies the first instruction from the provided instruction set and accurately pastes it into the remote system's interface, typically via the CLI. The agent then executes this instruction.

This workflow exemplifies the AI agent's ability to interact with systems at both the command-line and graphical user interface levels, depending on the nature of the tasks and the configuration of the system it is engaging with. The agent's operations are marked by a high degree of precision and adherence to security requirements, ensuring that each action is executed accurately and safely. This AI agent workflow is integral to the system's overall functionality, contributing significantly to its ability to automate complex tasks and processes efficiently.

As outlined in the claims, the system's design incorporates an 'embedded prompt' or 'embedded chat prompt,' which is essential for enabling autonomous operation of the AI agent system, particularly in scenarios where pre-programmed tasks are executed on a continuous basis. This embedded prompt mechanism is designed to initiate and manage IT or cyber security-related tasks without requiring active user interaction, thereby facilitating a fully autonomous workflow. Such embedded prompts or instructions are integral to the system, as they allow for the seamless and uninterrupted execution of predefined tasks, which might include routine system checks, maintenance operations, cyber security monitoring, and automated responses to detected anomalies.

This autonomous functionality facilitates ensuring that the system remains operational and effective, even in the absence of direct user input. While users have the option to log in and interact with the system, their intervention is not necessary for the initiation or execution of these automated tasks. This design aspect not only enhances the efficiency and reliability of the system but also serves to protect claim 1 from becoming obsolete in the face of advancements toward fully autonomous systems.

The incorporation of such embedded prompts and instructions within the AI agent system underscores the system's advanced capabilities in automating complex processes. It reflects a sophisticated level of programming and system design that anticipates the need for operational autonomy, ensuring that the system remains at the forefront of technological innovation in the field of IT and cyber security. This approach allows the system to adapt to various operational requirements and maintain high performance even in situations where user interaction is minimal or absent.

The system incorporates an advanced heuristic process training approach, particularly applicable to IT and cyber security-related activities. This method involves capturing workflows through screen recordings while an administrator or a user performs specific tasks. By recording these sessions, the system can analyze and learn from the demonstrated workflows, thereby enabling the model to train on these processes. The implementation of computer vision technology is beneficial in this context, as it allows the system to interpret and understand the visual elements and actions captured during the screen recording. This visual understanding is instrumental in enabling the model to replicate and automate these tasks effectively.

In scenarios where computer vision is not utilized, the system is designed to learn from command-based inputs. As tasks are performed using CLI (Command Line Interface) commands or other input methods, these commands are recorded and used as training data for the model or agents. This allows the system to develop an understanding of the tasks based on command sequences and execution patterns, subsequently enabling it to automate these processes.

This dual approach of using both visual and command-based inputs for heuristic process training ensures that the system remains versatile and effective in a wide range of operational environments. Whether through analyzing screen recordings or interpreting command inputs, the system continuously evolves and adapts, enhancing its ability to automate complex IT and cyber security workflows. This capability significantly contributes to the efficiency and intelligence of the system, ensuring it can meet diverse operational needs and improve its performance over time.

What is claimed is:

1. A system for software action automation, comprising:
a processing system;
non-transitory computer-readable storage media;
a first natural language processing (NLP) module comprising a first machine learning AI model;
a second NLP module comprising a second machine learning AI model;
at least one automated software process configured to execute software actions in communication with at least one of the first NLP module or the second NLP module;
program instructions stored on the non-transitory computer-readable storage media that, when executed by the processing system, direct the processing system to:
at the first NLP module:
receive at least one user instruction;
translate the at least one user instruction, using the first machine learning AI model, into at least one of a plurality of natural language instructions or executable software actions;
transmit the at least one of the plurality of natural language instructions or executable software actions to the second NLP module; and
receive output data from the second NLP module;
at the second NLP module:

receive the at least one of the plurality of natural language instructions or executable software actions from the first NLP module;
if the plurality of natural language instructions is received from the first NLP module, then translating the plurality of natural language instructions into executable software actions using the second machine learning AI model; and
cause the at least one automated software process to execute the executable software actions to produce the output data; and
engage in bidirectional communication involving at least the first NLP module and the second NLP module by exchanging data between the first NLP module and the second NLP module, wherein the exchanged data includes at least one of output data, natural language instructions, or executable software actions, wherein the bidirectional communication includes communication from the first NLP module to the second NLP module and return communication from the second NLP module to the first NLP module.

2. The system of claim 1, wherein the first NLP module further comprises the at least one automated software process.

3. The system of claim 1, wherein the second NLP module further comprises the at least one automated software process.

4. The system of claim 1, wherein the computer program instructions that direct the processing system to engage in bidirectional communication comprise computer program instructions that direct the processing system to engage in bidirectional communication until execution of the at least one user instruction is completed.

5. The system of claim 1, further comprising an API module in communication with at least one of the first NLP module or the second NLP module, wherein the API module provides access to at least one external application.

6. The system of claim 1, wherein the program instructions further direct the processing system to:
receive failure notification data from the at least one automated software process indicating unsuccessful execution of the executable software actions;
analyze the failure notification data using at least one of the first machine learning AI model or the second machine learning AI model to identify a cause of the failure;
generate modified executable software actions to address the identified cause of the failure; and
cause the at least one automated software process to execute the modified executable software actions.

7. The system of claim 1, further comprising a troubleshooting agent configured to:
receive error data from the at least one automated software process;
analyze the error data to determine error resolution steps;
generate corrective executable software actions; and
transmit the corrective executable software actions to the at least one automated software process for execution.

8. The system of claim 1, wherein the program instructions further direct the processing system to generate at least one of source code or script code based on the natural language instructions and execute the generated source code to perform the software actions.

9. The system of claim 1, wherein the program instructions further direct the processing system to dynamically modify at least one of existing source code or script code based on the natural language instructions.

10. A method for software action automation for use with a system, the system comprising:

a processing system;

non-transitory computer-readable storage media;

a first natural language processing (NLP) module comprising a first machine learning AI model;

a second NLP module comprising a second machine learning AI model;

at least one automated software process configured to execute software actions in communication with at least one of the first NLP module or the second NLP module;

the method comprising executing program instructions stored on the non-transitory computer-readable storage media by the processing system to:

at the first NLP module:

receive an instruction, wherein the instruction comprises one or more user instructions;

translate the instruction, using the first machine learning AI model, into at least one of a plurality of natural language instructions or executable software actions;

transmit the at least one of the plurality of natural language instructions or executable software actions to the second NLP module; and receive output data from the second NLP module;

at the second NLP module:

receive the at least one of the plurality of natural language instructions or executable software actions from the first NLP module;

if the plurality of natural language instructions is received from the first NLP module, then translating the plurality of natural language instructions into executable software actions using the second machine learning AI model; and cause the at least one automated software process to execute the executable software actions to produce the output data; and engage in bidirectional communication involving at least the first NLP module and the second NLP module by exchanging data between the first NLP module and the second NLP module until execution of the instruction is completed, wherein the exchanged data includes at least one of output data, natural language instructions, or executable software actions, wherein the bidirectional communication includes communication from the first NLP module to the second NLP module and return communication from the second NLP module to the first NLP module.

11. The method of claim 10, wherein the first NLP module further comprises the at least one automated software process.

12. The method of claim 10, wherein the second NLP module further comprises the at least one automated software process.

13. The method of claim 10, wherein the system further comprises an API module in communication with at least one of the first NLP module or the second NLP module, wherein the API module provides access to at least one external application.

14. The method of claim 10, wherein the program instructions further direct the processing system to:

receive failure notification data from the at least one automated software process indicating unsuccessful execution of the executable software actions;

analyze the failure notification data using at least one of the first machine learning AI model or the second machine learning AI model to identify a cause of the failure;

generate modified executable software actions to address the identified cause of the failure; and cause the at least one automated software process to execute the modified executable software actions.

15. The method of claim 10, wherein the system further comprises a troubleshooting agent configured to:

receive error data from the at least one automated software process;

analyze the error data to determine error resolution steps;

generate corrective executable software actions; and transmit the corrective executable software actions to the at least one automated software process for execution.

16. The method of claim 10, wherein the program instructions further direct the processing system to generate at least one of source code or script code based on the natural language instructions and execute the generated source code to perform the software actions.

17. The method of claim 10, wherein the program instructions further direct the processing system to dynamically modify at least one of existing source code or script code based on the natural language instructions.

18. A system for software action automation, comprising:

a processing system;

non-transitory computer-readable storage media;

at least one natural language processing (NLP) module comprising at least one machine learning AI model and configured to perform first processing operations and second processing operations stored on the non-transitory computer-readable storage media; and at least one automated software process configured to execute software actions and in communication with the at least one NLP module;

wherein the first processing operations comprise:

receiving at least one user instruction;

translating the user instruction, using the at least one machine learning AI model, into at least one of a plurality of natural language instructions or executable software actions; and transmitting the at least one of the plurality of natural language instructions or executable software actions for second processing;

wherein the second processing operations comprise:

receiving the at least one of the plurality of natural language instructions or executable software actions from the first processing operations;

if the plurality of natural language instructions is received, then translating the plurality of natural language instructions into executable software actions using the at least one machine learning AI model; and causing the at least one automated software process to execute the executable software actions to produce output data; and further comprising program instructions stored on the non-transitory computer-readable storage media that, when executed by the processing system, direct the processing system to:

engage in bidirectional communication between the first processing operations and the second processing operations by exchanging data, wherein the exchanged data includes at least one of output data, natural language instructions, or executable software actions, wherein the bidirectional communication includes communication from the first processing operations to the second processing operations and return communication from the second processing operations to the first processing operations.

19. The system of claim 18, wherein the program instructions that direct the processing system to engage in bidirectional communication comprise program instructions that direct the processing system to engage in bidirectional communication until execution of the at least one user instruction is completed.

20. The system of claim 18, further comprising an API module in communication with the at least one NLP module, wherein the API module provides access to at least one external application.

21. The system of claim 18, wherein the program instructions further direct the processing system to:

receive failure notification data from the at least one automated software process indicating unsuccessful execution of the executable software actions;

analyze the failure notification data using the at least one machine learning AI model to identify a cause of the failure;

generate modified executable software actions to address the identified cause of the failure; and cause the at least one automated software process to execute the modified executable software actions.

22. The system of claim 18, further comprising a troubleshooting agent configured to:

receive error data from the at least one automated software process;

analyze the error data to determine error resolution steps;

generate corrective executable software actions; and transmit the corrective executable software actions to the at least one automated software process for execution.

23. The system of claim 18, wherein the program instructions further direct the processing system to generate at least one of source code or script code based on the natural language instructions and execute the generated source code to perform the software actions.

24. The system of claim 18, wherein the program instructions further direct the processing system to dynamically modify at least one of existing source code or script code based on the natural language instructions.

25. A method for software action automation for use with a system, the system comprising:

a processing system;

non-transitory computer-readable storage media;

at least one natural language processing (NLP) module comprising at least one machine learning AI model and configured to perform first processing operations and second processing operations stored on the non-transitory computer-readable storage media; and at least one automated software process configured to execute software actions and in communication with the at least one NLP module;

the method comprising executing program instructions stored on the non-transitory computer-readable storage media by the processing system to:

perform first processing operations comprising:

receiving at least one user instruction;

translating the user instruction, using the at least one machine learning AI model, into at least one of a plurality of natural language instructions or executable software actions; and transmitting the at least one of the plurality of natural language instructions or executable software actions for second processing;

perform second processing operations comprising:

receiving the at least one of the plurality of natural language instructions or executable software actions from the first processing operations;

if the plurality of natural language instructions is received, then translating the plurality of natural language instructions into executable software actions using the at least one machine learning AI model; and causing the at least one automated software process to execute the executable software actions to produce output data; and engage in bidirectional communication between the first processing operations and the second processing operations by exchanging data, wherein the exchanged data includes at least one of output data, natural language instructions, or executable software actions, wherein the bidirectional communication includes communication from the first processing operations to the second processing operations and return communication from the second processing operations to the first processing operations.

26. The method of claim 25, wherein the system further comprises an API module in communication with the at least one NLP module, wherein the API module provides access to at least one external application.

27. The method of claim 25, wherein the program instructions further direct the processing system to:

receive failure notification data from the at least one automated software process indicating unsuccessful execution of the executable software actions;

analyze the failure notification data using the at least one machine learning AI model to identify a cause of the failure;

generate modified executable software actions to address the identified cause of the failure; and cause the at least one automated software process to execute the modified executable software actions.

28. The method of claim 25, wherein the system further comprises a troubleshooting agent configured to:

receive error data from the at least one automated software process;

analyze the error data to determine error resolution steps;

generate corrective executable software actions; and transmit the corrective executable software actions to the at least one automated software process for execution.

29. The method of claim 25, wherein the program instructions further direct the processing system to generate at least one of source code or script code based on the natural language instructions and execute the generated source code to perform the software actions.

30. The method of claim 25, wherein the program instructions further direct the processing system to dynamically modify at least one of existing source code or script code based on the natural language instructions.

* * * * *